United States Patent
Zhang

(10) Patent No.: US 10,221,671 B1
(45) Date of Patent: Mar. 5, 2019

(54) MSE BASED DRILLING OPTIMIZATION USING NEURAL NETWORK SIMULATON

(71) Applicant: Wu Zhang, Morgantown, WV (US)

(72) Inventor: Wu Zhang, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 738 days.

(21) Appl. No.: 14/799,753

(22) Filed: Jul. 15, 2015

Related U.S. Application Data

(60) Provisional application No. 62/028,874, filed on Jul. 25, 2014.

(51) Int. Cl.
 *E21B 44/00* (2006.01)
 *G06N 3/08* (2006.01)
 *G06N 3/04* (2006.01)

(52) U.S. Cl.
 CPC .............. *E21B 44/00* (2013.01); *G06N 3/04* (2013.01); *G06N 3/08* (2013.01)

(58) Field of Classification Search
 None
 See application file for complete search history.

(56) References Cited

U.S. PATENT DOCUMENTS

| | | | | |
|---|---|---|---|---|
| 4,928,521 A | * | 5/1990 | Jardine | E21B 12/02 175/39 |
| 5,368,108 A | * | 11/1994 | Aldred | E21B 44/005 175/40 |
| 5,812,068 A | * | 9/1998 | Wisler | E21B 7/068 175/40 |
| 6,012,015 A | * | 1/2000 | Tubel | E21B 41/0035 702/6 |
| 6,424,919 B1 | * | 7/2002 | Moran | E21B 44/00 702/6 |
| 7,020,597 B2 | * | 3/2006 | Oliver | E21B 10/00 175/45 |

(Continued)

OTHER PUBLICATIONS

Dashevskiy, D. et al. (1999). "Application of Neural Networks for Predictive Control in Drilling Dynamics". Society of Petroleum Engineers. 9 pages. doi:10.2118/56442-MS (Year: 1999).*

(Continued)

*Primary Examiner* — Christian Chace
*Assistant Examiner* — Benjamin J Buss
(74) *Attorney, Agent, or Firm* — Timothy L. Harney; Jacob A. Heafner; Brian J. Lally

(57) ABSTRACT

The method disclosed receives a data stream from an MWD system and determines the response of a specific energy (SE) relationship and a rate of penetration (ROP) relationship respectively to variables controllable by the operator, in order to enable operation at a lowest SE, or a highest Rate-of-Penetration (ROP) to SE ratio. The method utilizes artificial neural networks trained by MWD data to deduce a depth-of-cut and torque based on relationships manifesting between the various data points collected, and an SE equation and a predicted ROP is evaluated over a series of probable operating points. The method continuously gathers and analyzes MWD data during the drilling operation and allows an operator to manage the controllable parameters such that operation at the lowest SE or highest ROP or ROP to SE ratio can be achieved during the drilling operation.

16 Claims, 16 Drawing Sheets

(56) References Cited

U.S. PATENT DOCUMENTS

| | | | |
|---|---|---|---|
| 7,243,735 B2 | 7/2007 | Koederitz et al. | |
| 7,366,616 B2* | 4/2008 | Bennett | E21B 49/00 702/7 |
| 7,412,331 B2* | 8/2008 | Calhoun | E21B 45/00 702/9 |
| 7,857,047 B2 | 12/2010 | Remmert et al. | |
| 7,938,197 B2 | 5/2011 | Boone et al. | |
| 8,636,086 B2* | 1/2014 | Hbaieb | E21B 44/02 175/24 |
| 2002/0120401 A1* | 8/2002 | Macdonald | E21B 44/005 702/6 |
| 2004/0256152 A1* | 12/2004 | Dashevskiy | E21B 44/00 175/25 |
| 2008/0156531 A1* | 7/2008 | Boone | E21B 7/06 175/27 |
| 2009/0114445 A1* | 5/2009 | Dashevskiy | E21B 44/00 175/45 |
| 2010/0252325 A1* | 10/2010 | Porche | E21B 49/003 175/40 |
| 2010/0314173 A1* | 12/2010 | Hbaieb | E21B 44/005 175/57 |
| 2011/0172923 A1* | 7/2011 | Van Os | E21B 45/00 702/9 |
| 2011/0220410 A1* | 9/2011 | Aldred | E21B 44/00 175/26 |
| 2011/0280104 A1* | 11/2011 | McClung, III | E21B 3/02 367/82 |
| 2013/0146358 A1* | 6/2013 | DiSantis | E21B 7/00 175/27 |
| 2014/0110167 A1* | 4/2014 | Goebel | E21B 44/00 175/24 |
| 2015/0081222 A1* | 3/2015 | Laing | E21B 49/003 702/9 |
| 2015/0275648 A1* | 10/2015 | Wang | E21B 44/00 702/9 |
| 2015/0308253 A1* | 10/2015 | Clark | E21B 33/085 175/24 |

OTHER PUBLICATIONS

Esmaeili, A. et al. (2012). "ROP Modeling using NeuralNetwork and Drill String Vibration Data". Society of Petroleum Engineers. 13 pages. doi:10.2118/163330-MS (Year: 2012).*

Fruhwirth, R. K. et al. (2006). "Hybrid Simulation Using Neural Networks to Predict Drilling Hydraulics in Real Time". Society of Petroleum Engineers. 8 pages. doi:10.2118/103217-MS (Year: 2006).*

Gidh, Y. K. et al. (2012). "Artificial Neural Network Drilling Parameter Optimization System Improves ROP by Predicting/ Managing Bit Wear". Society of Petroleum Engineers. 13 pages. doi:10.2118/149801-MS (Year: 2012).*

Guria, C. et al. (Jan. 24, 2014). "Multi-objective optimization of oil well drilling using elitist non-dominated sorting genetic algorithm". Pet.Sci.(2014)11:97-110. DOI 10.1007/s12182-014-0321-x (Year: 2014).*

Moran, D. P. et al. (2010). "Sophisticated ROP Prediction Technology Based on Neural Network Delivers Accurate Results". Society of Petroleum Engineers. 9 pages. doi:10.2118/132010-MS (Year: 2010).*

Al-Basman Al-Rashidi, A. (2011). "Application of Neural Networks to Evaluate Factors Affecting Drilling Performance". PhD Thesis . Imperial College London. 197 pages. (Year: 2011).*

Motahhari, H.R. et al. (2009). "Method of Optimizing Motor and Bit Performance for Maximum ROP". Petroleum Society of Canada. doi:10.2118/09-06-44-TB (Year: 2009).*

Rashidi, B. et al. (2008). "Real-Time Drill Bit Wear Prediction by Combining Rock Energy and Drilling Strength Concepts". Society of Petroleum Engineers. 9 pages. doi:10.2118/117109-MS (Year: 2008).*

Rashidi, B. et al. (2010). "Comparative Study Using Rock Energy and Drilling Strength Models". American Rock Mechanics Association. ARMA 10-254. 7 pages. (Year: 2010).*

* cited by examiner

MSE BASED DRILLING OPTIMIZATION USING NEURAL NETWORK SIMULATON

RELATION TO OTHER APPLICATIONS

This patent application claims priority from provisional patent application 62/028,874 filed Jul. 25, 2014, which is hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure relates to drilling operations and a method of determining optimized drilling parameters by collecting real time measurement while drilling (MWD) data and providing in time recommendations of the optimized values of weight-on-bit (WOB), rotational speed (RPM) of the bit, and hydraulic power (H) driving the drilling fluid. The optimization is performed with respect to achieving the optimal value of an elected drilling performance evaluating parameter (PE), such as specific energies (SE), rate of penetration (ROP), and the ratio of ROP to SE, where SE can be either mechanic specific energy or drilling specific energy.

BACKGROUND

Strictly speaking, controllable drilling parameters (WOB, RPM and H) are not optimized in the state of art drilling practices. Drillers operate within a range of the value of drilling parameters recommended by service companies or manufacture of bit or rig systems based on lab tests or previous field experience. Experienced drillers may drill faster and safer than less experienced ones, because of the choice of a more proper set of values of drilling parameters in response to drilling dynamic phenomenon observed while drilling. The efficiency of drilling matters a greater deal, and the cost difference between more and less efficient drilling can be enormous. Assuming the cost for facility time of one day being 1% of the capital investment of the rig, a $500 M rig can cost up to $5 M per day for the expense in facility time alone, regardless of drilling status. The difference in time spent on drilling is magnified when, as is typical, average down-hole time begins to increases exponentially with the true vertical depth (TVD) of the wells, due to the increased rock strength and the general association of a harsher environment, such as higher temperature and pressure. Correspondingly, rate of penetration (ROP) gets slower as drilling goes deeper and deeper. Reports indicate that drilling the last 10 percent of the hole can account for ~50% of the drilling cost. As a result, the difference in cost generated between higher and lower efficient drilling is more significantly different in deep drilling environments.

Although higher drilling efficiency is most evidently marked as achieving greater ROP, energy impact in drilling holds the constraint for drilling efficiency. If higher ROP is achieved at the cost of extremely high energy spending—resulting in adverse impacts on well bore stability, or low life time of bit and/or other rig components, or damage to the bottom hole assembly calling for frequent stoppage for parts replacement—the overall result can be less economical. As a result, drillers tend to evaluate the drilling performance in terms of not only ROP, but also the energy used in drilling, or the ratio of ROP to specific energy. In addition, energy consumption in drilling has found to be related to ROP in a way that an optimal condition may exists that can yield both high drilling efficiency while keep energy as low as possible.

The study of the effect of energy spending on drilling efficiency started about a half century ago and has continued as hydrocarbon resources in the shallow formations are depleted and gas and oil industries are forced to drill deeper for nonconventional resources. As early as 1965, Teale ("The Concept of Specific Energy in Rock Drilling," *Int. J. Rock Mech. Mining Sci.* 2 (1965)) defined a term called Mechanical Specific Energy (MSE) describing the energy spent in removing a unit volume of rock/formation mass. Based on energy balance, he developed an equation which expresses MSE as function of WOB, ROP, RPM, and Torque. In Teales' study, it is realized that in most cases, MSE decreases with increases in Depth of Cut (DOC), the increment of drilling depth per revolution of a drill bit. By definition, DOC equals the ratio of ROP to RPM. As a result, for given RPM, MSE decreases with an increase in ROP. This indicates that it is not in conflict to achieve higher ROP with lower MSE.

Teale's finding has been expended in improving drilling efficiency. It has been realized that within certain range, ROP can be increased, and at the same time MSE reduced by increasing WOB. Attempts have also been made to increase ROP by increasing RPM [Remmen, Stephen M., Witt, Joseph W., Dupriest, Fred E., Implementation of ROP Management Process in Qatar North Field, *SPE/IADC* 105521 (2007).)]. This will usually hold since ROP is the product of DOC and RPM, and therefore ROP should increase linearly with RPM as long as DOC is kept constant. However, it is not always the case, because one may not be able to keep DOC constant all the time while increasing RPM. On the other hand, increasing ROP solely through increasing RPM while keeping DOC constant does not necessarily result in decrease in MSE since, according to Teale's work, a decrease in MSE while increasing ROP is caused mainly by an increase in DOC. In other word, solely increasing RPM seems not on the right track to achieve drilling optimization.

Complicated situations do exist where ROP and MSE vary with WOB and RPM in a very different manner respectively. Such factors as vibration and formation heterogeneity contribute to the complication of drilling dynamics. Complicated drilling dynamics may be reflected as nonlinear or even adverse effect of stochastic nature in MSE~DOC and ROP~WOB, or even ROP~RPM relationship. One of the major factors causing the above complication is the balling or bottomhole jam phenomenon (Founder point). Greater WOB or RPM could generate more cuttings which changes the equilibrium of mass transfer in drilling dynamics, resulting in less DOC, and therefore less ROP and higher MSE. Increasing drilling fluid flow or temporally reducing WOB may sometimes efficiently remove excess amount of cuttings and bring the dynamic system to normal status at which the above mentioned relationship can be kept.

With the awareness of the role of hole cleaning effects of drilling fluid flow on drilling efficiency, a term of hydraulic power driving drilling fluid flow attracts attention in considering energy balance of drilling dynamics. Recently, Miguel Armenta [Miguel Armenta, SPE, Shell EPT-WT "Identifying Inefficient Drilling Conditions Using Drilling—Specific Energy", SPE 116667 paper presented at the 2008 SPE Annual Technical Conference and Exhibition held in Denver, Colo.] expended Teale's expression by including hydraulic power used to drive drilling fluid as an additional energy term, and the total specific energy is named Drilling Specific Energy (DSE), in distinguishing from the term of Mechanic Specific Energy (MSE). In this application, both MSE and DSE are referred to as Specific Energy (SE).

Along with the progress in fundamental understanding of drilling dynamics, drillers have been generally striving to developing methods aimed at the goal of keeping MSE as low as possible and Rate of Penetration (ROP) as high as possible, by varying Weight On Bit (WOB), rotational speed (RPM) of the bit, and mud flow within normal operating limits while a variety of tests are conducted to optimize performance. A common method is the drill rate test, where various weight on bit (WOB) and RPM settings are utilized and results are observed to determine a combination generating the highest ROP. Another method is the drill-off test where a drill string is anchored and WOB and ROP are measured to determine a founder point, which is taken as the optimum WOB. See e.g., U.S. Pat. No. 7,857,047 issued to Remmert, et al. Additionally, a number of real-time systems exist which display an MSE calculated, so that operators may respond to indications outside of desired MSE ranges. See e.g., U.S. Pat. No. 7,243,735 issued to Koederitz et al., and see U.S. Pat. No. 7,938,197 issued to Boone et al., among others. In these systems, generally, an MSE is determined based on various measured parameters and an indication that a pre-determined MSE limit has been exceeded is provided, and the operator is expected to adjust WOB and RPM in order to clear the limit. In practice, this treats the WOB, RPM, and other parameters impacting the MSE as essentially independent from one another.

It is apparent that, due to the lack of direct connection between MSE and ROP with using only controllable drilling parameters, the current technology remains largely a trial and error method in searching for optimal conditions.

The manner in which the MSE is determined in these systems limits the effectiveness of this after-the-fact corrections actions. One of the drawbacks of performing trial and error searches is that once the inevitable over adjustment occurs (where the system has passed the optimal point), bottom hole jam will be so severe that the drillers often fail to bring the system off the founder point by merely reducing the one or more of the over tuned controllable drilling parameters and the entire search process for the optimal point may have to reset to the original begin-to-search status. Another drawback with trial and error methods is that they are time consuming, while the whole purpose of drilling optimization is to save time, since it is precious in drilling as mentioned earlier. The third problem with the trial and error method is that, most of the time the process is operating under not optimized conditions, because all the judgment on the drilling status is based on comparison between tested conditions, and none knows whether the next change is a better move.

Clearly, a critical technology barrier for optimizing drilling condition is that no direct relations have been established that relate the performance evaluating parameters (SE, and ROP etc.) directly with drilling parameters that can be adjusted conveniently by the driller while drilling. WOB, RPM and hydraulic power, H, are such parameters.

Currently available equations all involve intermediate parameters such as DOC and Torque (Tor), which themselves are not a directly controllable but rather a dependent of controllable parameters. Teale's equation involves both DOC and Tor. The ROP expression contains DOC. However, a relationship between either DOC or Torque with the independently controllable drilling parameters, i.e., WOB, RPM, and H, has not be established, even though one can claim that at some fixed condition—such as in well controlled lab or field drill-off test—empirical relations could be provided to describe these relations, the relations are limited to given rock type, controlled drilling fluid flow and type, known bit status, and well controlled cutting removal status, etc. However, in most real drilling conditions, all the above conditions will only be maintained for very short period of time. As the result, the empirical relationship developed as such will become invalid. In fact, so far the instructive guidance on drilling conditions provided based on lab or previous field tests has been limited to giving applicable ranges of controllable drilling parameters rather than an optimal point of operation. Strictly speaking, the state of the art is unable to perform a real time optimization of controllable drilling parameters due to the lack of a global understanding of the needed relationships between MSE and ROP with controllable drilling parameters.

Provided here is a method for determining the values of the controllable parameters WOB, RPM, and H which generate a most favourable outcome of drilling performance as expressed in terms of the performance evaluating parameters as selected from either a SE, ROP or the ratio of ROP to a SE. The optimization is realized through establishment of in-situ and direct relationship between MSE and ROP to controllable drilling parameters (WOB, RPM and H) respectively for an expected depth of well to be reached within the valid range of the relationship. Being aware of the stochastic component in the response of the dependent parameters to controllable drilling parameters, the molded relationship is considered to be valid with acceptable error bar and for a short period of time during which drilling conditions have not varied beyond the valid range. The molded relationship grasps the transit and abrupt feature of drilling dynamics by timely updating the model parameters describing the model relationship. The updating of the parameters specifying the model is performed periodically, real time, along the drilling process. The method receives a data stream from a Measure-While-Drilling (MWD) system and determines the response of both the intermediate parameters, DOC and Torque, respectively, to the changes of controllable drilling parameters WOB, RPM and H at a targeted point of length to be drilled (LD). Artificial neural networks (ANN) are used to model the relationship between DOC and controllable drilling parameters and between Torque and controllable drilling parameters respectively. MSE is calculated using the Teale's equation, with known controllable parameters and intermediate parameters determined through ANN simulation. DSE is also calculated consequently using an equation slightly different from proposed in the literature. To ensure the accuracy and validation of the ANN models for DOC and Torque, in certain embodiments, data no longer representing current drilling conditions are identified and removed in timely manner from the list of data used to train the model.

The establishment of expressing performance evaluating parameters directly in terms of controllable drilling parameters allows computerized optimization to select the best set of controllable drilling parameter values that leads to the most favorable value of performance evaluating parameters, for example, a lowest SE, or a highest Rate-of-Penetration (ROP) to SE ratio, as selected by the driller. The apparatus and method provides a display indicating the relationship of SE and/or ROP to the controllable parameters, based on modeling of data groups relayed by the MWD system during the drilling operation. Continuous sampling and modeling of MWD data during the drilling operation makes it possible for an operator to maintain drilling in the most efficient and safe manner by adjusting the controllable parameters.

These and other objects, aspects, and advantages of the present disclosure will become better understood with reference to the accompanying description and claims.

SUMMARY

The apparatus and method disclosed utilizes signals generated during a drilling operation and reported by an MWD system in order to anticipate a drilling performance evaluating (PE) parameter over a plurality of possible operating points. The apparatus and method provides at least a weight-on-bit (WOB) and revolutions-per-minute (RPM) of the bit that produce an optimum PE parameter at a future point in time, such that an operator may adjust at least the controllable parameters WOB and RPM to approximate operation at the optimum PE parameter, such as a maximum ROP, a minimum SE, or a maximum ROP/SE ratio.

The apparatus and method utilizes a data processor receiving signals generated by an MWD system and indicating the parameters of at least length drilled (LD), WOB, RPM, torque (Tor), rate-of-penetration (ROP), standpipe pressure (S), and drilling fluid flow rate (F). The data processor periodically samples the signals and generates a plurality of filled data rows, where each filled data row holds the values of the LD signal, the WOB signal, the RPM signal, the Tor signal, the ROP signal, the S signal, and the F signal at the particular point in time where sampling occurred. The plurality of filled data rows comprises at least two, typically at least ten, and more typically at least 50 filled data rows.

The plurality of filled data rows is utilized to generate training input vectors for a first artificial neural network (ANN) and optionally a second ANN, depending on the optimum PE parameter to be evaluated. In all cases, during training, the first ANN receives a training input vector comprising WOB, LD, H, and RPM, where H equals S times F, and compares its output to a depth-of-cut DOC, where DOC is equal to ROP divided by RPM. At the conclusion of training, the trained first ANN is capable of receiving one or a number of input vectors comprising values of WOB, LD, H, and RPM and mapping specific input vectors to DOC values. For those cases where SE or SE/ROP is to be evaluated, during training the second ANN similarly receives a training input vector comprising WOB, LD, H, and RPM, and compares its output to Tor, such that at the conclusion of training, the trained second ANN is capable of receiving one or a number of input vectors comprising values of WOB, LD, H, and RPM and mapping specific input vectors to Tor values.

The apparatus and method additionally reviews the plurality of filled data rows to establish a plurality of ($WOB_{EQN}$, $RPM_{EQN}$, $H_{EQN}$) points in a WOB/RPM/H space. The plurality of ($WOB_{EQN}$, $RPM_{EQN}$, $H_{EQN}$) points are based on the respective values of those parameters experienced during creation of the plurality of filled data rows or based on the operations envelope of the corresponding parameters as determined by the rig manufacturer, and thus serve as possible operating points to approximate values of the controllable parameters likely to be utilized as the drilling operation continues.

The apparatus and method subsequently establishes a future value for LD, termed $LD_{EQN}$, and utilizes the $LD_{EQN}$ in conjunction with the plurality of ($WOB_{EQN}$, $RPM_{EQN}$, $H_{EQN}$) points to generate input vectors comprising values of $WOB_{EQN}$, $LD_{EQN}$, $H_{EQN}$, and $RPM_{EQN}$. These input vectors are applied to the trained first ANN to map a given ($WOB_{EQN}$, $RPM_{EQN}$, $H_{EQN}$) point to a $DOC_{EQN}$ value, and in certain embodiments additionally applied to the trained second ANN to map the given ($WOB_{EQN}$, $RPM_{EQN}$, $H_{EQN}$) point to a $Tor_{EQN}$ value. Subsequently, the $WOB_{EQN}$, $LD_{EQN}$, $H_{EQN}$, $RPM_{EQN}$, $DOC_{EQN}$, and $Tor_{EQN}$ values as applicable are utilized in an ROP equation or a representative MSE or DSE equation in order to evaluate the optimum PE parameter at the ($WOB_{EQN}$, $RPM_{EQN}$, $H_{EQN}$) point, where as stated the optimum PE parameter is based on ROP, SE, or SE/ROP. This is conducted for all ($WOB_{EQN}$, $RPM_{EQN}$, $H_{EQN}$) points in the plurality of ($WOB_{EQN}$, $RPM_{EQN}$, $H_{EQN}$) points. Following the evaluation at all ($WOB_{EQN}$, $RPM_{EQN}$, $H_{EQN}$) points, the apparatus and method identifies a specific ($WOB_{EQN}$, $RPM_{EQN}$, $H_{EQN}$) point which generates the optimum PE parameter. The apparatus and method provides at least a WOB and an RPM which produces the optimum PE parameter to an operator, so that the operator may adjust at least the controllable parameters WOB and RPM to approximate operation at the optimum PE parameter as the length drilled LD approaches the value of $LD_{EQN}$.

In certain embodiments, the coefficients constituting the ANN models are updated periodically, once a new batch of rig data is received (or any content of the training data set is changed) and the recommendation of optimized controllable drilling parameters are posted for a previously received data set. The plurality of filled data rows for training ANN models are generated based on data status. In these embodiments, only data rows of the most current data status are kept for training of the ANN models for the next loop of simulation.

One of the criteria for whether a data row belongs to a current data status is based on the prediction error of the simulation on the PE parameter selected, for example, MSE. Once measured values of DOC and Tor become available, they can be used to calculate MSE or any PE parameter selected according to conventional equations, and the calculated PE can be compared with that of the simulated PE based on ANN model trained from the last loop. The difference between the directly calculated and ANN simulated PE values can be used to determine simulation error. If the error is greater than a set criterion, the stored data rows can be purged off and only the latest arrived batch of data rows are kept for the future ANN training. Otherwise, the latest arrived batch of data rows are added to the existing storage and kept for future ANN training, since they are all believed to represent the current drilling status.

The novel process and principles of operation are further discussed in the following description.

DETAILED DESCRIPTION

Figure 1:
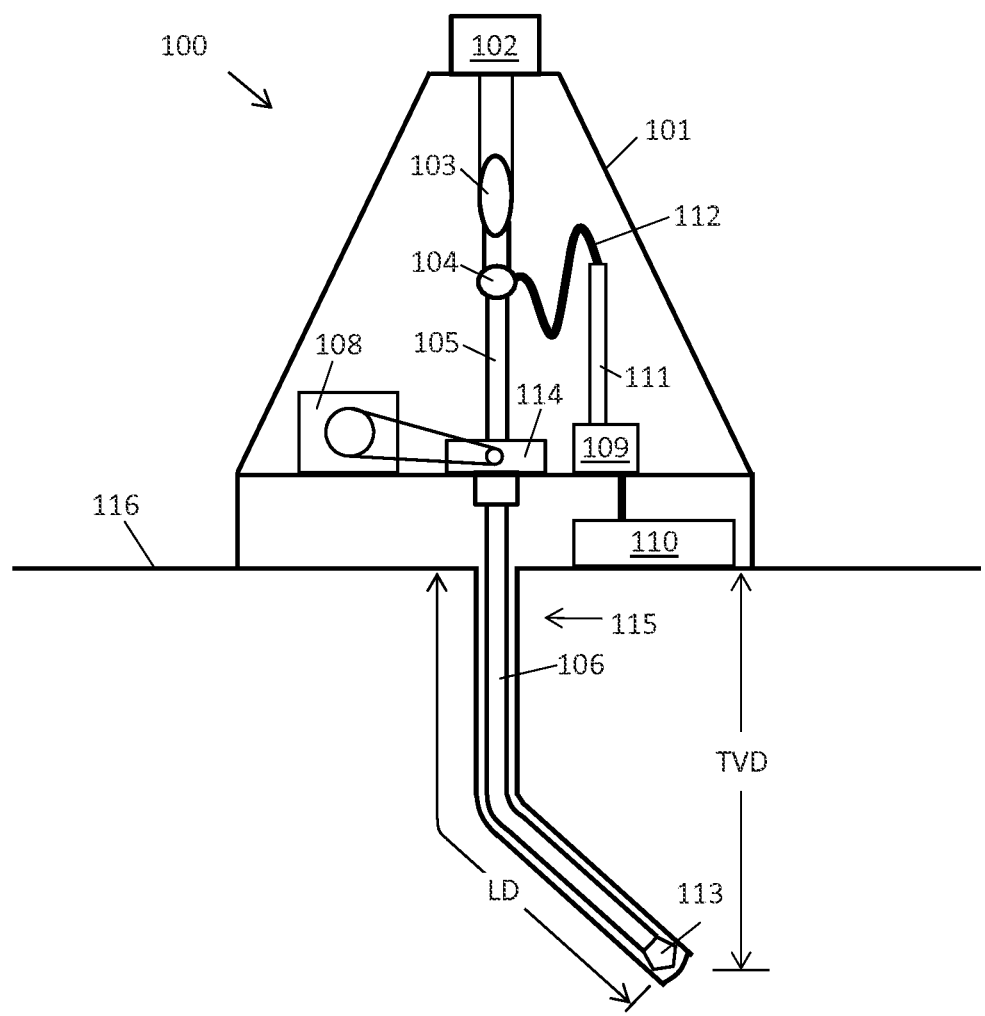
FIG. 1 is a schematic illustration of a drilling rig.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for the prediction of optimized controllable drilling parameters through the determination of an optimum PE parameter using measured data provided by an MWD system.

The method disclosed receives a data stream originating from an MWD system and determines the response of rate-of penetration (ROP) and specific energy (SE) relationships to variables controllable by the operator, in order to enable operation at an optimum PE parameter, such as the highest ROP, the lowest SE, or the highest ROP to SE ratio. The apparatus and method provides a display indicating the relationship of ROP and SE to the controllable parameters, based on analysis of and simulation on data groups relayed by the MWD system during the drilling operation. The method continuously gathers and analyzes MWD data during the drilling operation, and allows an operator to manage the controllable parameters such that operation at the optimum PE parameter can be achieved during the drilling operation. The method offers a significant improvement to the effective use of existing MWD systems utilized in current drilling operations The method provides an optimum PE parameter such as the highest ROP, lowest SE, or highest ROP to SE ratio applicable at a future point in time, when the length-drilled LD equals a value of $LD_{EQN}$. The value of $LD_{EQN}$ may be input directly or inputted using other parameters, such as a delineated input $\Delta t$. The method provides appropriate values of the variables controllable by the operator as $LD_{EQN}$ is reached in order to allow for both the computational time required and the necessary adjustment of the controllable parameters by the operator. This allows operation at the optimum PE parameter to be achieved by the operator in real-time, under current conditions. The optimization is made by first determining the predicted value of a PE for all possible conditions as represented by all possible combinations of values in the range of each of the three controllable drilling parameters, i.e., $WOB_{EQN}$, $RPM_{EQN}$, $H_{EQN}$, for a given $LD_{EQN}$. The conditions represented by the above combination of values of the controllable parameters may or may not have been achieved during the preceding drilling operation. The method then determines among all the possible combinations a combination that, according to the method, will yield the optimum PE parameter, which could be for example a minimum SE value, a maximum ROP, or a maximum ratio of ROP to SE. Because of the requirement to determine the above mentioned quantities needed for the optimization process within the short $\Delta t$ interval, implementation of the method using computerized means is a necessity.

A drilling apparatus and operation for which the method is intended is generally illustrated at FIG. 1. The drilling apparatus generally indicated at 100 is comprised of a derrick 101, draw works 102, pulley 103, swivel joint 104, Kelly joint 105, rotary table 114, drill string 106, and drill bit 113. Drill string 106 is made up of multiple sections of drill pipe that are secured to the bottom of the Kelly joint 105, and the rotary table 114 is used to rotate the drill string 106 while the draw works 102 is used to lower drill string 106 into well bore 115 and apply controlled axial compressive loads. A prime mover 108 such as an electric motor imparts rotary energy at some torque and revolution rate to drill string 106. Additionally, a drilling fluid (or drilling mud) is stored in mud tank 110 and pumped by mud pump 109, transporting the drilling fluid through standpipe 111, fluid line 112, and through swivel joint 104 and into the top of the drill string 106. At FIG. 1, well bore 115 extends over the length drilled LD, as indicated, and has a true vertical depth TVD beneath surface 116.

As is understood, an MWD system in data communication with a drilling rig such as drilling rig 100 can be utilized to provide indications of at least length drilled (LD) representing the well bore length of well bore 115, a weight-on-bit (WOB) representing the axial compressive load on drill bit 113, a revolutions-per-minute (RPM) representing the rate of rotation of drill bit 113, a torque (Tor) representing the rotary torque acting on drill bit 113, a rate-of-penetration (ROP) representing a rate at which the length drilled increases, a standpipe pressure (S) representing a pressure in the standpipe 111, and a flow rate (F) representing the flow rate of drilling fluid from mud tank 110. The indications provided by the MWD system may be from downhole sensors, surface based sensors, or some combination. The apparatus and method disclosed herein is intended to receive and operate on data from an MWD system in order to provide real-time indication of appropriate controllable parameters, and the manner in which an MWD system may generate the respective signals is not a limitation. Within this disclosure, an "MWD system" means a system intended to communicate with a drilling apparatus such as drilling rig 100 and provide an LD signal, a WOB signal, an RPM signal, a Tor signal, an ROP signal, an S signal, and an F signal.

As discussed, the operator of a drilling rig such as drilling rig 100 generally desires to maximize ROP, minimize expended specific energy, or maximize an ROP-to-specific energy ratio during the drilling operation. The specific energy (SE) expended is typically a function of at least the parameters WOB, RPM, Tor, ROP, and H (where H equals S times F). However, the operator of the drilling rig generally only has direct control over the controllable parameters WOB, RPM, and H, where the control over RPM may be exercised directly or through direct control of another parameter such as torque or rotary power, which is dependent on RPM. The apparatus and method disclosed herein provides a methodology whereby the indirect or intermediate dependent parameters Tor and DOC (where DOC equals ROP divided by RPM) may be quantified using the controllable parameters, in order that an optimum PE parameter may be predicted at a series of possible WOB, RPM, and H values at a future point in time. This allows PE to be expressed in terms that are directly controllable by the drilling operator, so that the operator can closely approach or achieve the maximum ROP, minimum SE, maximum ROP/SE ratio, or some other optimum PE parameter through adjustment of the controllable parameters WOB, RPM, and H.

Generally, the method utilizes data signals relayed by the MWD system and corresponding to length drilled (LD), weight-on-bit (WOB), revolutions per minute (RPM), rate of penetration (ROP), Torque (Tor), standpipe pressure (S), and mud flow rate (F) in order to generate a set of training input vectors, where each training input vector has an element comprised of at least WOB, LD, H, and RPM, and additionally has an associated output Tor and an associated output DOC, where DOC equals ROP/RPM. The training set is utilized to train at least a first Artificial Neural Network (ANN) to map input vectors comprised of at least WOB, LD, H, and RPM to an output DOC when a maximum ROP is the optimum PE parameters, and similarly to also train a second ANN to map the input vectors comprised of at least WOB, LD, H, and RPM to an output Tor, when minimum SE or maximum ROP/SE is the optimum PE parameter. As a result, and once trained, the first and second ANNs may predict DOC and Tor values based on the controllable parameters WOB, RPM, and H in conjunction with LD. This allows the method and apparatus to provide an expected ROP and/or PE for a given (WOB, RPM, H) operating point when length drilled is approximately equal to LD, and allows determination of the values of the controllable parameters WOB, RPM, and H which will realize an optimum PE parameter. Correspondingly, the operator of a drilling rig such as drilling rig 100 may adjust the controllable parameters WOB, RPM, and H as length drilled approaches LD, in order to achieve the optimum PE parameter, such as a highest ROP, a minimum SE, or highest ROP/SE, solely through manipulation of the directly controlled parameters.

Here, and as will be discussed, when an individual training vector has an element comprised of at least WOB, LD, H, and RPM, this means that within the individual training vector, some element of the training vector incorporates $WOB^{z1}$, $LD^{z2}$, $H^{z3}$, or $RPM^{z4}$, and that $WOB^{z1}$, $LD^{z2}$, $H^{z3}$, and $RPM^{z4}$ are all present within the training vector, where z1, z2, z3, and z4 are exponents. In an embodiment, z1, z2, z3, and z4 are equal to one. Further, the training vector may have more than one element comprised of WOB, LD, H, or RPM. For example, a training vector having the elements ($WOB^{z1}$, $WOB^{z1-2}$, $LD^{z2}$, $H^{z3}$, $H^{z3-2}$, $RPM^{z4}$) has an element comprised of at least WOB, LD, H, and RPM where some element of the training vector incorporates $WOB^{z1}$, $LD^{z2}$, $H^{z3}$, or $RPM^{z4}$, and where $WOB^{z1}$, $LD^{z2}$, $H^{z3}$, and $RPM^{z4}$ are all present within the training vector.

Additionally, within this disclosure, an "optimum PE parameter" means a parameter identified from plurality of PE parameters and based on an optimum PE criterion, where each PE parameter is determined using an expected PE value, and where the each expected PE value corresponds to a ($WOB_{EQN}$, $RPM_{EQN}$, $H_{EQN}$) point in a WOB/RPM/H space as defined and generated within this disclosure for a projected LD value, $LD_{EQN}$, and where the each expected PE value arises either through the use of values for at least a $WOB_{EQN}$, a $DOC_{EQN}$, and a $Tor_{EQN}$ in a representative MSE equation or a representative DSE equation or through the use of values for at least a $DOC_{EQN}$ in a representative ROP equation. Here, the $DOC_{EQN}$ is determined using a first trained ANN mapping an input vector comprised of at least the $WOB_{EQN}$, a $RPM_{EQN}$, a $LD_{EQN}$, and a $H_{EQN}$, and the $Tor_{EQN}$ is determined using a second trained ANN mapping an input vector comprised of at least the $WOB_{EQN}$, the $RPM_{EQN}$, the $LD_{EQN}$, and the $H_{EQN}$. For example, in an embodiment, the PE parameter for a given ($WOB_{EQN}$, $RPM_{EQN}$, $H_{EQN}$) point is equal to an expected SE value for the given ($WOB_{EQN}$, $RPM_{EQN}$, $H_{EQN}$) point. In another embodiment, the PE parameter for a given ($WOB_{EQN}$, $RPM_{EQN}$, $H_{EQN}$) point is equal to an ROP for the given ($WOB_{EQN}$, $RPM_{EQN}$, $H_{EQN}$) point divided by the expected SE value for the given ($WOB_{EQN}$, $RPM_{EQN}$, $H_{EQN}$) point.

Additionally, "optimum PE criterion" means any descriptive or mathematical criterion which identities a specific point on a line segment originating at an $x_0$ and terminating at an $x_M$, where the $x_0$ is equal to a first PE parameter in a plurality of PE parameters, where the first PE parameter has an absolute value less than or equal to the absolute values of every other PE parameter in the plurality of PE parameters, and where the $x_M$ is equal to a second PE parameter in the plurality of PE parameters, where the second PE parameter has an absolute value greater than or equal to the absolute values of every other PE parameter in the plurality of PE parameters. The optimum PE criterion may describe any specific point on the line segment originating at the $x_0$ and terminating at the $x_M$, however typically the optimum PE criterion utilizes a descriptive such as "minimum" to describe a point corresponding to the $x_0$ on the line segment, or "maximum" to describe a point corresponding to the $x_M$ on the line segment. For example, when the PE parameter is equal to the expected SE value and the optimum PE criterion is minimum, the optimum PE parameter identified from a plurality of PE parameters and based on the optimum PE criterion would equal a minimum expected SE value. Similarly, when the PE parameter is equal to an ROP/SE value and the optimum PE criterion is maximum, the optimum PE parameter identified from a plurality of PE parameters and based on the optimum PE criterion would return the maximum ROP/SE value. Similarly, when the PE parameter is equal to an ROP value and the optimum PE criterion is maximum, the optimum PE parameter identified from a plurality of PE parameters and based on the optimum PE criterion would return the maximum ROP value.

As stated, the method and apparatus determines an optimum PE criterion, where, for a given $LD_{EQN}$, the optimum PE criterion may be based on an expected ROP over the ($WOB_{EQN}$, $RPM_{EQN}$, $H_{EQN}$) points, an expected SE over the ($WOB_{EQN}$, $RPM_{EQN}$, $H_{EQN}$) points, or an expected SE/ROP over the ($WOB_{EQN}$, $RPM_{EQN}$, $H_{EQN}$) points. When the optimum PE criterion is based on an expected ROP, the expected ROP is based on a representative ROP equation such as the $RPM_{EQN}$ of the point multiplied by a $DOC_{EQN}$ expected at the point, where the $DOC_{EQN}$ is determined using a trained first ANN. Hence, within this apparatus and method, when the optimum PE criterion is based only on an expected ROP, the apparatus and method only utilizes a first ANN and generates a first trained ANN, in order to determine $DOC_{EQN}$ and expected ROP at each ($WOB_{EQN}$, $RPM_{EQN}$, $H_{EQN}$) point. Alternatively, when the optimum PE criterion is based on an expected SE. such as a minimum SE or maximum ROP/SE, the apparatus and method utilizes a first ANN and a second ANN and generates a first trained ANN and a second trained ANN, in order to determine $DOC_{EQN}$ and $Tor_{EQN}$, and expected SE or ROP/SE at each ($WOB_{EQN}$, $RPM_{EQN}$, $H_{EQN}$) point.

Figure 2:
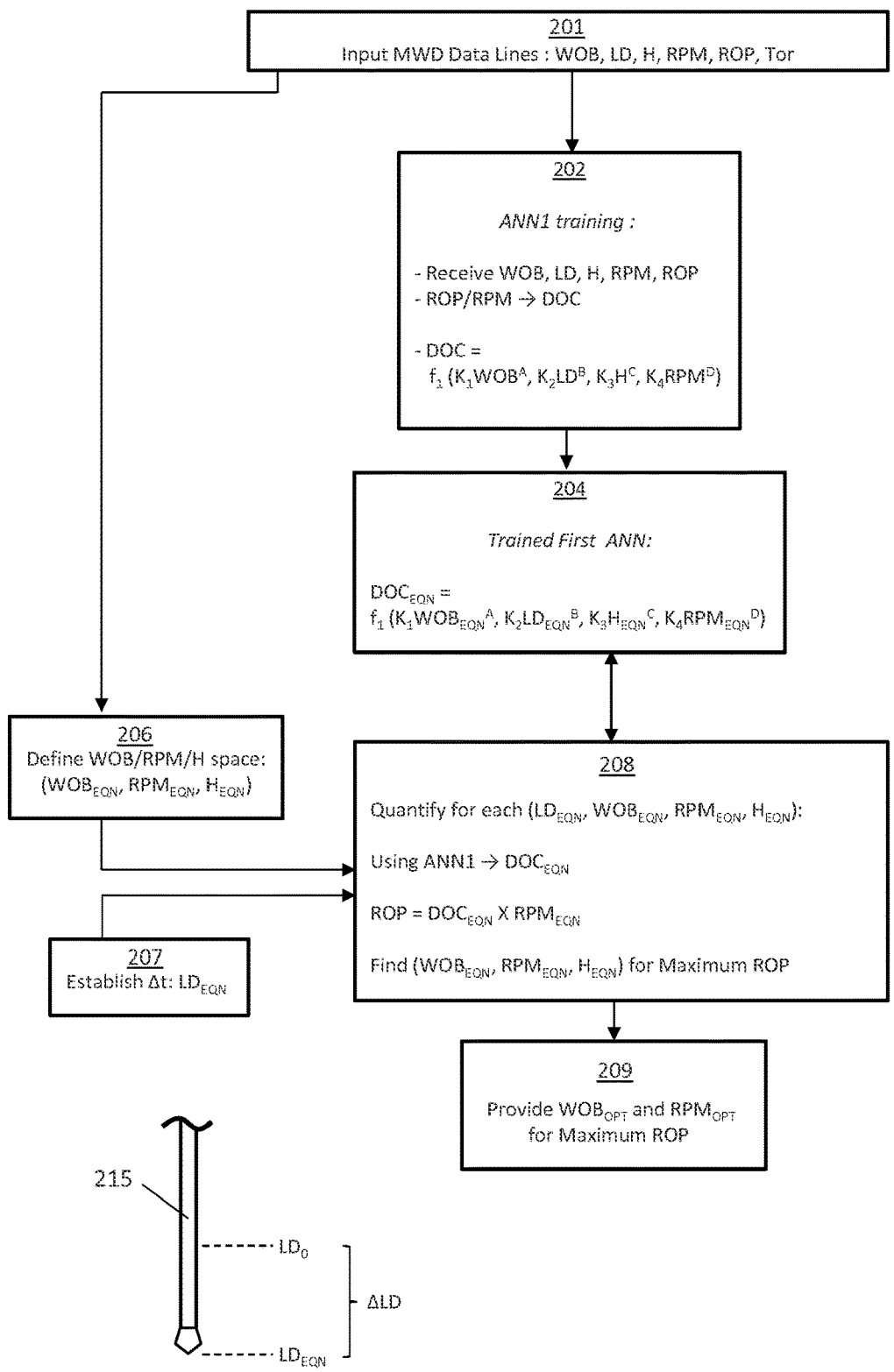
FIG. 2 illustrates a general flow path of an embodiment of the method disclosed.

Embodiments in Which ROP is the Optimum PE Criterion: Training of the First ANN and Determination of an Expected ROP:

A general overview of the process by which the disclosed method and apparatus determines an expected ROP is provided at FIG. 2. At 201, data from an MWD system provides a plurality of filled data rows, where each filled data row comprises at least a WOB data point WOB, an LD data point LD, an H data point H (where H is equal to an S data point multiplied by an F data point), an RPM data point RPM, an ROP data point ROP, and a Tor data point Tor. The plurality of filled data rows typically comprises at least 10 filled data rows, preferably at least 50 filled data rows. Each filled data row is generated by periodically sampling the WOB signal, the LD signal, the S signal, the F signal, the RPM signal, the ROP signal, and the Tor signal provided by the MWD system during a drilling operation in progress, and storing the respective values as a filled data row in a storage matrix.

The plurality of filled data rows generated is utilized to train a first artificial neural network AANN1 at 202. ANN1 is trained by selecting an individual filled data row having the WOB data point WOB, the LD data point LD, the H data point H (where H is equal to the S data point multiplied by the F data point), the RPM data point RPM, and the ROP data point ROP. The data points in the individual data row are utilized to generate a ANN1 training input vector comprising at least ($K_1 WOB^A$, $K_2 LD^B$, $K_3 H^C$, $K_4 RPM^D$) where $K_1$, $K_2$, $K_3$, and $K_4$ are constants and A, B, C, and D are exponents, and to determine a target DOC, where the target DOC is equal to the ROP divided by the RPM. As will be further discussed, a set of weights and a bias is established for each artificial neuron in ANN1, the ANN1 training input vector is applied to the input nodes of ANN1, an ANN1 output value is generated based on the ANN1 training input vector and the set of weights and the bias for each artificial neuron, the ANN1 output value is compared to the target DOC for the ANN1 training input vector, and an error is generated based on the difference between the ANN1 output value and the target DOC.

If the training is conducted as line-by-line training, as that term is used in the art, the sets of weights and biases within ANN1 are modified based on the error between the ANN1 output and the target DOC for the input vector, and a second filled data row is selected, and the process is repeated using the modified sets of weights and biases within ANN1. The process repeats until a certain termination criterion is met, such as the error between the ANN1 output and target DOC for the input vector becoming less than a set criterion. If the filled data rows have all been used once before the termination criterion is met, each of all the filled data rows can be reused again and again, in any order, to continue training and modifying the ANN model till certain termination criterion is met.

Alternatively, if the training is conducted as batch training, the error between the ANN1 output and the target DOC for the input vector is determined, a second filled data row is selected, and the process is repeated using the same sets of weights and biases within ANN1. As each filled data row is applied the resulting error is stored, and at the conclusion of applying all or some portion of the filled data rows, the stored resulting errors are utilized to modify the sets of weights and biases within ANN1. This repeats until a certain termination criterion is met, such as the error between the ANN1 output and target DOC for the input vector becoming less than a set criterion. If the filled data rows have all been used once before the termination criterion is met, each of all the filled data rows can be reused again and again, in any order, to continue training and modifying the ANN model till certain termination criterion is met. See e.g., Fukumizu, "Dynamics of Batch Learning in Multilayer Neural Networks," ICANN 98 Perspectives in Neural Computing, pp 189-194 (1998), among others.

At the conclusion of the training represented at 202, ANN1 has been trained to receive an input vector comprising at least ($K_1 WOB^A$, $K_2 LD^B$, $K_3 H^C$, $K_4 RPM^D$) and map that input vector to a specific DOC, represented as DOC=$f_1$($K_1 WOB^A$, $K_2 LD^B$, $K_3 H^C$, $K_4 RPM^D$) at FIG. 2. The trained first ANN is represented at 204.

Stated equivalently, the plurality of filled data rows is utilized to define a first set of training patterns $P_1$ consisting of ordered pairs ($p_1$, $t_1$), where the quantity of ordered pairs is equal to the quantity of filled data rows in the plurality of filled data rows, and where for each ordered pair in $P_1$, the training pattern $p_1$ includes $K_1 WOB_i^A$, $K_2 LD_i^B$, $K_3 H_i^C$, and $K_4 RPM_i^D$ and the teaching input $t_1$ is equal is to $DOC_i$, where $WOB_i$ is the WOB data point of the $i^{th}$ filled data row, $LD_i$ is the LD data point of the $i^{th}$ filled data row, $H_i$ is equal to the S data point of the $i^{th}$ filled data row times the F data point of the $i^{th}$ filled data row, $RPM_i$ is the RPM data point of the $i^{th}$ filled data row, $DOC_i$ is equal to the ROP data point of the $i^{th}$ filled data row divided by the RPM data point of the $i^{th}$ filled data row, and $K_1$, $K_2$, $K_3$, $K_4$, A, B, C, and D are as earlier defined. The input vectors of the first set of training patterns $P_1$ is applied to the input nodes of the first ANN in order to generate the trained first ANN.

At the conclusion of the operations represented at 202 and 203, trained ANN1 at 204 is capable of quantifying DOC based on an input vector formulated using quantified values of WOB, RPM, H and LD. In terms of the optimization process of FIG. 2 and stated differently, once ANN1 is trained, probable input vectors may be formulated from a probable condition ($WOB_{EQN}$, $RPM_{EQN}$, $H_{EQN}$) and a specified $LD_{EQN}$, and trained ANN1 may be utilized to map a quantified DOC, $DOC_{EQN}$, based on the quantified values of $WOB_{EQN}$, $RPM_{EQN}$, $H_{EQN}$, and $LD_{EQN}$. Additionally, and as will be discussed, trained ANN1 can additionally be utilized to map input vectors formulated using the WOB, RPM, H, and LD data points from a filled data line, in order to evaluate data status.

At 206, the apparatus and method generates such quantified values of $WOB_{EQN}$, $RPM_{EQN}$, and $H_{EQN}$ by defining a WOB/RPM/H space at 206, and defining an $LD_{EQN}$ value at 207. The WOB/RPM/H space is a defined space having dimensions of ($WOB_{MAX}-WOB_{MIN}$)×($RPM_{MAX}-RPM_{MIN}$)×($H_{MAX}-H_{MIN}$), where $WOB_{MAX}$, $WOB_{MIN}$, $RPM_{MAX}$, $RPM_{MIN}$, $H_{MAX}$ and $H_{MIN}$ are generally determined based on the range of WOB, RPM, and H that occur within the plurality of filled data rows or based on the operational envelope of the rig hardware as recommended by manufacturers, as will be discussed. In an embodiment, $H_{MAX}$ and $H_{MIN}$ are the same value, and the WOB/RPM/H space becomes two-dimensional. At 206, the WOB range from $WOB_{MIN}$ to $WOB_{MAX}$ is subdivided into a plurality of $WOB_{EQN}$ points, the RPM range from $RPM_{MIN}$ to $RPM_{MAX}$ is subdivided into a plurality of $RPM_{EQN}$ points, and the H range from $H_{MIN}$ to $H_{MAX}$ is either subdivided into or established as a set of $H_{EQN}$ points, where when $H_{MAX}$ is equal to $H_{MIN}$, the set of $H_{EQN}$ points has a single element representing the value of $H_{MAX}$ and $H_{MIN}$. At 206, a plurality of ($WOB_{EQN}$, $RPM_{EQN}$, $H_{EQN}$) points is established, where the plurality of ($WOB_{EQN}$, $RPM_{EQN}$, $H_{EQN}$) points is a set equal to the Cartesian Product ($WOB_N$×($RPM_N$×$H_N$)), where $WOB_N$ is a set consisting of the plurality of WOB markers, $RPM_N$ is a set consisting of the plurality of RPM markers, and $H_N$ is a set consisting of the set of H markers.

At 207, the apparatus and method generates a quantified value of $LD_{EQN}$. $LD_{EQN}$ reflects a value of LD to be achieved at a future point in time as the drilling operation continues. At 207, the apparatus and method may provide $LD_{EQN}$ by any means, provided that the $LD_{EQN}$ is greater than all LD data points in the plurality of filled data rows. For example, $LD_{EQN}$ may be a direct input provided by an operator, or may be provided at 207 as ($LD_0+\Delta LD$) illustrated for bit 215, where $LD_0$ is an LD data point from the latest filled data row, and $\Delta LD$ is a product of an input $\Delta t_{COMP}$ and $\overline{ROP}$, where the input $\Delta t_{COMP}$ is an elapsed time input by the operator and $\overline{ROP}$ is an average ROP over the plurality of filled data rows, or more practically the average value of ROP from the latest batch of rows. Alternatively, in an embodiment, the input $\Delta t$ may be based on a $\Delta t_{LOOP}$ plus a $\Delta t'$, where $\Delta t'$ maybe an estimated small time period, $\Delta t_{LOOP}$ is the loop time—the period of time required for the computer/data processor to complete a circle of process including an elapsed time required for the method and apparatus to gather data, train the ANNs, evaluate the PE, and provide an output to the operator. In an embodiment, the computer measures loop time as the time difference between two posts of recommended controllable drilling parameters, or two visits to the online MWD data rows which may be kept in memory 201. However, within this disclosure, the means in which $LD_{EQN}$ is provided at 207 is not a limitation, provided that $LD_{EQN}$ is greater than all LD data points in the plurality of filled data rows. At the conclusion of the processes represented by 206 and 207, quantified values of WOB, RPM, and H and a particular value of LD are available from the plurality of ($WOB_{EQN}$, $RPM_{EQN}$, $H_{EQN}$) points generated at 206 and the particular $LD_{EQN}$ generated at 207 respectively.

At 208, the apparatus and method evaluates an expected ROP for each ($WOB_{EQN}$, $RPM_{EQN}$, $H_{EQN}$) point in the plurality of ($WOB_{EQN}$, $RPM_{EQN}$, $H_{EQN}$) points generated at 206, at the particular $LD_{EQN}$ generated at 207. At each individual ($WOB_{EQN}$, $RPM_{EQN}$, $H_{EQN}$) point and using the particular $LD_{EQN}$, a DOC output is formulated as $f_1(K_1 WOB_{EQN}^A, K_2 RPM_{EQN}^B, K_3 LD_{EQN}^C, K_4 H_{EQN}^D)$, and quantified as $DOC_{EQN}$ for the individual ($WOB_{EQN}$, $RPM_{EQN}$, $H_{EQN}$) point at the particular $LD_{EQN}$. Having generated the $DOC_{EQN}$ for the individual ($WOB_{EQN}$, $RPM_{EQN}$, $H_{EQN}$) point at the particular $LD_{EQN}$, an expected ROP is determined for the each ($WOB_{EQN}$, $RPM_{EQN}$, $H_{EQN}$) point at 208 using a representative ROP equation, such as $DOC_{EQN}$ multiplied by $RPM_{EQN}$.

At 208, the apparatus and method determines the expected ROP for each ($WOB_{EQN}$, $RPM_{EQN}$, $H_{EQN}$) point in the WOB/RPM/H space at the particular $LD_{EQN}$, and provides the ($WOB_{EQN}$, $RPM_{EQN}$, $H_{EQN}$) condition at the specific $LD_{EQN}$ that generates the maximum ROP. The advantageous ($WOB_{EQN}$, $RPM_{EQN}$, $H_{EQN}$) is provided as ($WOB_{OPT}$, $RPM_{OPT}$, $H_{OPT}$).

At 209, the apparatus and method provides at least $WOB_{OPT}$ and $RPM_{OPT}$ to an operator. This allows an operator during a drilling operation to adjust the controllable parameters WOB and RPM as LD approaches $LD_{EQN}$, such that the $WOB_{OPT}$ and $RPM_{OPT}$ condition which generates the maximum ROP may be achieved. In an embodiment, the apparatus and method provides a $WOB_{OPT}$, a $RPM_{OPT}$, and an $H_{OPT}$ to the operator.

The operations of 201, 202, 204, 206, 207, 208, and 209 are repeatedly conducted based on refreshed stored data rows, based on newly arrived MWD data input, generated during the course of a drilling operation. This allows an operator to periodically adjust the values of controllable parameters WOB, RPM, and H and continue to approximate the advantageous PE conditions as LD continues to increase over the course of a drilling operation. In an embodiment, the apparatus compiles MWD data, trains the first ANN, defines the WOB/RPM/H space, and determines the WOB, RPM, H conditions representing the optimum PE over a period of time $\Delta t_{COMP}$ less than ten minutes, typically less than one minute, in order to provide frequent updates for a drilling operation in progress. The $\Delta t_{COMP}$ may and typically will be less than a period of time over which an operator may be able to execute each recommended adjustment, and application of all recommended adjustments is not a limitation within the disclosed method. However, the closer the recommended adjustment is followed, the more efficient the drilling may be. The complexity of the necessary data operations conducted over this short period of time establishes computerized implementation as a necessity.

Figure 3:
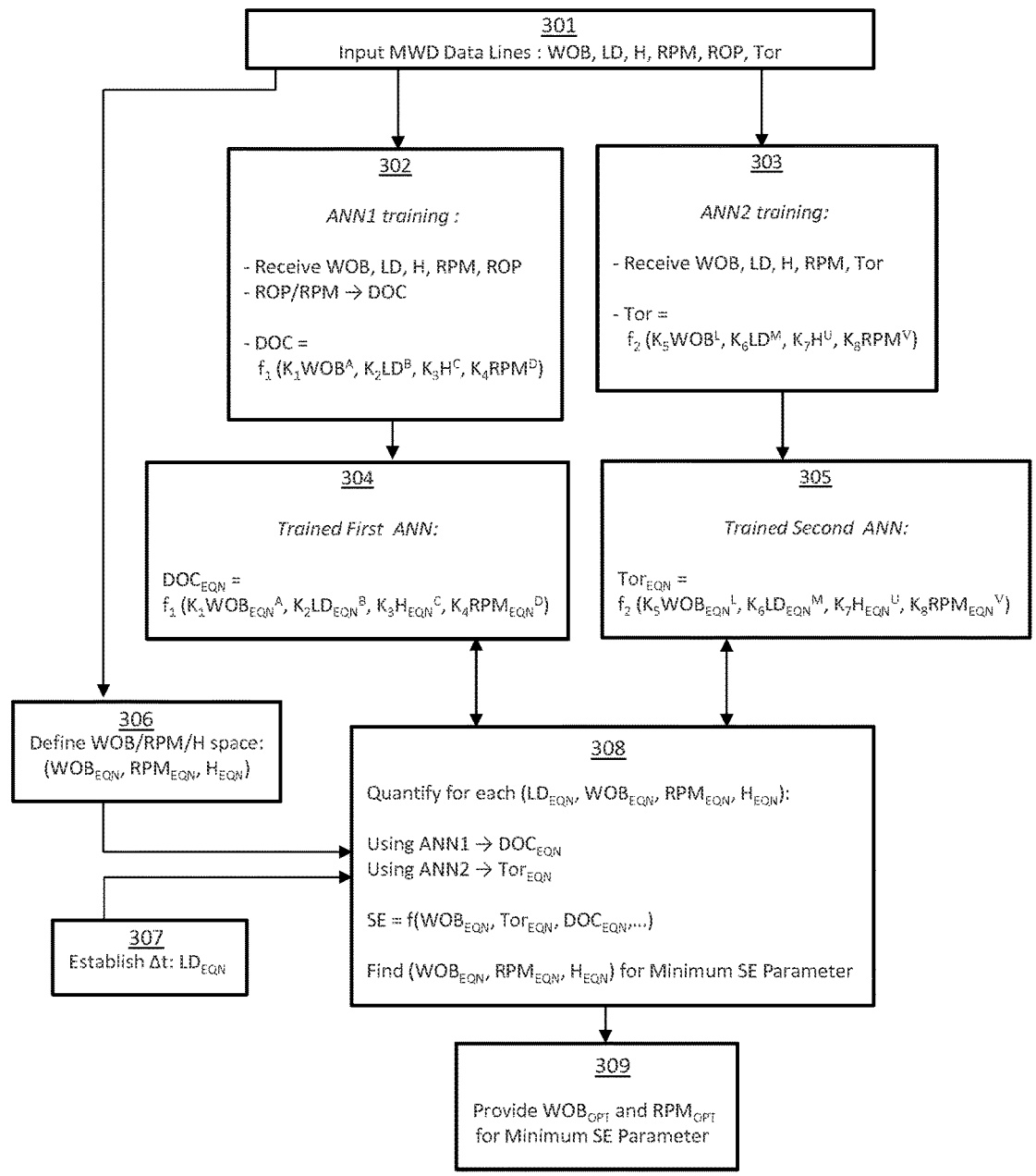
FIG. 3 illustrates a general flow path of another embodiment of the method disclosed.

Embodiments in Which SE or ROP/SE is the Optimum PE Criterion: Training of the Second ANN and Determination of an Expected SE:

A general overview of the process by which the disclosed method and apparatus determines an expected SE or ROP/SE using both a first trained ANN and a second trained ANN is provided at FIG. 3.

At 301, data from an MWD system provides a plurality of filled data rows as previously described for 201 of FIG. 2. As before, each filled data row is generated by periodically sampling the WOB signal, the LD signal, the S signal, the F signal, the RPM signal, the ROP signal, and the Tor signal provided by the MWD system during a drilling operation in progress, and storing the respective values as a filled data row in a storage matrix.

The plurality of filled data rows generated is utilized to train a first artificial neural network AAN1 at 302 in the same manner as described for 202 of FIG. 2, such that at the conclusion of the training represented at 302, ANN1 has been trained to receive an input vector comprising at least ($K_1 WOB^A$, $K_2 LD^B$, $K_3 H^C$, $K_4 RPM^D$) and map that input vector to a specific DOC, represented as $DOC=f_1(K_1 WOB^A, K_2 LD^B, K_3 H^C, K_4 RPM^D)$ at FIG. 3. The trained first ANN is represented at 304.

The plurality of filled data rows is similarly utilized to train a second artificial neural network ANN2 at 303. ANN2 is trained by selecting an individual filled data row and generating a ANN2 training input vector comprising at least ($K_5 WOB^L$, $K_6 LD^M$, $K_7 H^U$, $K_8 RPM^V$) where $K_5$, $K_6$, $K_7$, and $K_8$ are constants and L, M, U and V are exponents, and generating a target Tor, where the target Tor is equal to the Tor data point of the individual filled data row. For line-by-line training and similar to ANN1, a set of weights and a bias is established for each artificial neuron in ANN2, the ANN2 training input vector is applied to the input nodes of ANN2, an ANN2 output value is generated and compared to the associated target value, Tor, for the ANN2 training input vector, and the sets of weights and biases within ANN2 is modified, then a second filled data row is selected and the process is repeated using the modified sets of weights and biases within ANN2, and the process repeats until a certain termination criterion is met. Alternatively, if the training is conducted as batch training, the error between the ANN2 output and the target Tor for the input vector is determined, a second filled data row is selected, and the process is repeated using the same sets of weights and biases within ANN2. As each filled data row is applied the resulting error is stored, and at the conclusion of applying all or some portion of the filled data rows, the stored resulting errors are utilized to modify the sets of weights and biases within ANN1. This repeats until a certain termination criterion is met.

At the conclusion of the training represented at 303, ANN2 has been trained to receive an input vector comprising at least ($K_5WOB^L$, $K_6LD^M$, $K_7H^U$, $K_8RPM^V$) and map that input vector to a specific Tor, represented as Tor=$f_2$ ($K_5WOB^L$, $K_6LD^M$, $K_7H^U$, $K_8RPM^V$). The trained second ANN is represented at 305.

Stated equivalently, the plurality of filled data rows is utilized to define a second set of training patterns $P_2$ consisting of ordered pairs ($p_2$, $t_2$), where the quantity of ordered pairs is equal to the quantity of filled data rows in the plurality of filled data rows, and where for each ordered pair in $P_2$, the training pattern $p_2$ includes $K_5WOB_i^L$, $K_6LD_i^M$, $K_7H_i^U$, and $K_8RPM_i^V$ and the teaching input $t_1$ is equal is to $Tor_i$, where $WOB_i$ is the WOB data point of the $i^{th}$ filled data row, $LD_i$ is the LD data point of the $i^{th}$ filled data row, $H_i$ is equal to the S data point of the $i^{th}$ filled data row times the F data point of the $i^{th}$ filled data row, $RPM_i$ is the RPM data point of the $i^{th}$ filled row, $Tor_i$ is equal to the Tor data point of the $i^{th}$ filled data, and $K_5$, $K_6$, $K_7$, $K_8$, L, M, U, and V are as earlier defined. The input vectors of the second set of training patterns $P_2$ is applied to the input nodes of the second ANN in order to generate the trained second ANN.

At the conclusion of the operations represented at 302 and 303, trained ANN1 at 304 is capable of quantifying DOC based on an input vector formulated using quantified values of WOB, RPM, H and LD, and similarly trained ANN2 at 305 is capable of quantifying Tor based on an input vector formulated using quantified values of WOB, RPM, H and LD. In terms of the optimization process of FIG. 3 and stated differently, once ANN1 and ANN2 are trained, probable input vectors may be formulated from a probable condition ($WOB_{EQN}$, $RPM_{EQN}$, $H_{EQN}$) and a specified $LD_{EQN}$, and trained ANN1 and trained ANN2 may be utilized to map a quantified DOC ($DOC_{EQN}$) and a quantified Tor ($Tor_{EQN}$) respectively, based on the quantified values of $WOB_{EQN}$, $RPM_{EQN}$, $H_{EQN}$, and $LD_{EQN}$. Additionally, and as will be discussed, trained ANN1 and trained ANN2 can additionally be utilized to map input vectors formulated using the WOB, RPM, H, and LD data points from a filled data line, in order to evaluate data status.

At 306, the apparatus and method generates such quantified values of $WOB_{EQN}$, $RPM_{EQN}$, and $H_{EQN}$ by defining a WOB/RPM/H space at 306, in a manner similar to that discussed for 206 at FIG. 2. Additionally, at 307, the apparatus and method generates a quantified value of $LD_{EQN}$ in a manner similar to that discussed for 206 at FIG. 2. Again, the means in which $LD_{EQN}$ is provided at 307 is not a limitation, provided that $LD_{EQN}$ is greater than all LD data points in the plurality of filled data rows. At the conclusion of the processes represented by 306 and 307, quantified values of WOB, RPM, and H and a particular value of LD are available from the plurality of ($WOB_{EQN}$, $RPM_{EQN}$, $H_{EQN}$) points generated at 306 and the particular $LD_{EQN}$ generated at 307 respectively.

At 308, the apparatus and method evaluates an expected SE for each ($WOB_{EQN}$, $RPM_{EQN}$m $H_{EQN}$) point in the plurality of ($WOB_{EQN}$, $RPM_{EQN}$, $H_{EQN}$) points generated at 306, at the particular $LD_{EQN}$ generated at 307. At each individual ($WOB_{EQN}$, $RPM_{EQN}$, $H_{EQN}$) point and using the particular $LD_{EQN}$, a DOC input vector is formulated as $f_1(K_1WOB_{EQN}^A, K_2RPM_{EQN}^B, K_3LD_{EQN}^C, K_4H_{EQN}^D)$, and the DOC input vector is applied to trained ANN1 at 304. In response, trained ANN1 generates a quantified DOC termed $DOC_{EQN}$ for the individual ($WOB_{EQN}$, $RPM_{EQN}$, $H_{EQN}$) point and the particular $LD_{EQN}$. Similarly, a Tor input vector is formulated as $f_2(K_5WOB_{EQN}^L, K_6RPM_{EQN}^M, K_7LD_{EQN}^U, K_8H_{EQN}^V)$, the Tor input vector is applied to trained ANN2 at 305, and trained ANN2 generates a quantified Tor termed $Tor_{EQN}$ for the individual ($WOB_{EQN}$, $RPM_{EQN}$, $H_{EQN}$) point and the particular $LD_{EQN}$. Having generated the $DOC_{EQN}$ and $Tor_{EQN}$ for the individual ($WOB_{EQN}$, $RPM_{EQN}$, $H_{EQN}$) point and the particular $LD_{EQN}$, an expected SE is determined for the each ($WOB_{EQN}$, $RPM_{EQN}$, $H_{EQN}$) point at 308 by a representative SE equation utilizing at least $WOB_{EQN}$, $DOC_{EQN}$, and $Tor_{EQN}$. In an embodiment, an expected ROP is determined for the each ($WOB_{EQN}$, $RPM_{EQN}$, $H_{EQN}$) point at 308 using a representative ROP expression such as the product of $DOC_{EQN}$ and $RPM_{EQN}$, and the ratio of the corresponding ROP to the expected PE is determined. In a particular embodiment, the representative SE expression additionally utilizes at least $RPM_{EQN}$ and $H_{EQN}$.

At 308, the apparatus and method determines a PE parameter based on the expected SE for each ($WOB_{EQN}$, $RPM_{EQN}$, $H_{EQN}$) point in the WOB/RPM/H space at the particular $LD_{EQN}$, and provides the ($WOB_{EQN}$, $RPM_{EQN}$, $H_{EQN}$) condition at the specific $LD_{EQN}$ that generates an optimum PE parameter. The "PE parameter" here is a general term for a performance evaluating parameter covering ROP, MSE, DSE, and the ratio of ROP to either MSE or DSE, as those terms are defined herein. The advantageous ($WOB_{EQN}$, $RPM_{EQN}$, $H_{EQN}$) for the optimum PE parameter is termed ($WOB_{OPT}$, $RPM_{OPT}$, $H_{OPT}$). For example, 308 might provide an ($WOB_{OPT}$, $RPM_{OPT}$, $H_{OPT}$) condition at the specific $LD_{EQN}$ which generates a minimum value of SE or a maximum ROP/SE ratio, where SE may correspond to either MSE or DSE, as discussed below.

At 309, the apparatus and method provides at least $WOB_{OPT}$ and $RPM_{OPT}$ to an operator. This allows an operator during a drilling operation to adjust the controllable parameters WOB and RPM as LD approaches $LD_{EQN}$, such that the $WOB_{OPT}$ and $RPM_{OPT}$ condition which generates the advantageous condition may be achieved. In an embodiment, the apparatus and method provides a $WOB_{OPT}$, a $RPM_{OPT}$, and an $H_{OPT}$ to the operator.

The operations of 301, 302, 303, 304, 305, 306, 307, 308, and 309 are repeatedly conducted based on refreshed stored data rows based on newly arrived MWD data input generated during the course of a drilling operation. This allows an operator to periodically adjust the controllable parameters WOB, RPM, and H and continue to approximate the advantageous PE conditions as LD continues to increase over the course of a drilling operation. In an embodiment, the apparatus compiles MWD data, trains the first and second ANN, defines the WOB/RPM/H space, and determines the WOB, RPM, H conditions representing the optimum PE over a period of time $\Delta t_{COMP}$ less than ten minutes and typically less than one minute, in order to provide frequent updates for a drilling operation in progress. The $\Delta t_{COMP}$ may and typically will be less than a period of time over which an operator may be able to execute each recommended adjustment, and application of all recommended adjustments is not a limitation within the disclosed method. However, the closer the recommended adjustment is followed, the more efficient the drilling may be. The complexity of the necessary data operations conducted over this short period of time establishes computerized implementation as a necessity.

Additional principles of operations and details are discussed below.

Principles of Operation

In certain embodiments, the method and apparatus is based on a determination of an energy term SE, which reflects the energy spent by the drilling system in removing a unit volume mass of rock. Within this disclosure, SE may refer to either mechanical specific energy (MSE) or drilling specific energy (DSE). MSE may be expressed as:

$$MSE = \frac{WOB}{A_B} + \frac{2\pi \times Tor}{A_B \times DOC} \qquad (1)$$

and DSE may be expressed as, $$DSE = \frac{WOB}{A_B} + \frac{2\pi \times Tor}{A_B \times DOC} + \frac{H}{A_B \times RPM \times DOC} \qquad (2)$$

where H is equal to S multiplied by F, and WOB, RPM, and Tor are as earlier defined. Additionally, DOC represents a depth-of-cut equal to ROP/RPM, and $A_B$ represents a cross-sectional area of a drill bit operating in a drilling system. In embodiments where ROP only is optimized, ROP is generally expressed as:

$$ROP = DOC \times RPM \qquad (3)$$

The DSE expression as shown in equation (2) is different from a previous work by Miguel Armenta [Miguel Armenta, SPE, Shell EPT-WT "Identifying Inefficient Drilling Conditions Using Drilling—Specific Energy", SPE 116667 paper presented at the 2008 SPE Annual Technical Conference and Exhibition held in Denver, Colo.]. In the previous work, a negative sign is used in front of the third term on the right. Here, a positive sign is used instead to show that the work done by the hydraulic power forms part of the work done by the rig in removing unit volume of rock mass through drilling activity.

Within equations (1) and (2), $A_B$ is a constant for a given bit, while WOB, RPM, and H are parameters directly controllable by an operator of the drilling system. Conversely, as discussed, Tor and DOC are intermediate parameters measured by the MWD system, but which cannot be independently and directly controlled by the operator. Generally speaking, Tor and DOC, and correspondingly also ROP, are dependent on the values of WOB, RPM and H, as well as other factors. The methodology disclosed provides for evaluation of an optimum PE criterion using a representative MSE equation, a representative DSE equation, and/or a representative ROP equation similar in form to equations (1), (2), and (3).

Within this disclosure, a "representative MSE equation" means a first well-formed mathematical expression having variables comprised of at least a WOB variable, a Tor variable, and a DOC variable, where the DOC variable may be expressed as an ROP variable divided by an RPM variable, and where the representative MSE equation, when applied in a WOB/RPM/H space comprised of a plurality of probable operating points ($WOB_{EQN}$, $RPM_{EQN}$, $H_{EQN}$) as defined herein, produces a mean average error ($MAE_{MSE}$) relative to equation (1) of less than 0.2, preferably less than 0.1. Here, $MAE_{MSE}$ is expressed as:

$$MAE_{MSE} = \frac{1}{n}\sum_{n}^{i=1} \frac{|MSE_{REP} - MSE_{EQN(1)}|}{MSE_{EQN(1)}}$$

where n is the number of ($WOB_{EQN}$, $RPM_{EQN}$, $H_{EQN}$) points in a WOB/RPM/H space, $MSE_{REP}$ is the MSE generated at the $i^{th}$ ($WOB_{EQN}$, $RPM_{EQN}$, $H_{EQN}$) point by the representative MSE equation, and $MSE_{EQN(1)}$ is the MSE generated at the $i^{th}$ ($WOB_{EQN}$, $RPM_{EQN}$, $H_{EQN}$) point by the MSE expression of equation (1), when $MSE_{REP}$ and $MSE_{EQN(1)}$ are expressed in equivalent physical units.

A general MSE equation comprises two terms with one representing work done in the direction of drilling path at the point of drilling, and the second terms, the work done in the tangential direction perpendicular to the direction of drilling. The first term represents work done by trust or axial force, named here as WOB, and therefore $WOB^{R1}$ where WOB is the variable WOB and R1 is a positive number, is involved. To be noted, the displacement of the point of application in the direction of the force(WOB) is DOC which is cancelled out, since the product of DOC with Ab equals the volume of mass removed in one rotation of bit. The work represented by the second term is done by a tangential force, therefore $Tor^{R2}$ is involved. The displacement of the point of application in the direction of the tangential force in one bit rotation varies from the rotation center to the edge of the bit. For both the first and second terms, any other operating parameters that can be used to represent the energy spent in doing the corresponding work can be used to represent MSE.

In an embodiment, the representative MSE equation comprises at least a first addend and a second addend, where the first addend is comprised of $WOB^{R1}$ where WOB is the variable WOB and R1 is a positive number, and where the second addend is comprised of $Tor^{R2}$ and $DOC^{R3}$, where Tor is the variable Tor and R2 is a positive number, and DOC is the variable DOC and R3 is a negative number. In further embodiment, R1 is equal to one, R2 is equal to one, and R3 is equal to negative one. In a further embodiment, the representative MSE equation is an expression equivalent to equation (1).

Similarly within this disclosure, a "representative DSE equation" means a second well-formed mathematical expression having variables comprised of at least a WOB variable, an RPM variable, a Tor variable, a DOC variable, and an H variable, where the DOC variable may be expressed as an ROP variable divided by the RPM variable, and where the H variable may be expressed as an S variable multiplied by an F variable, and where the representative DSE equation, when applied in a WOB/RPM/H space comprised of a plurality of probable operating points ($WOB_{EQN}$, $RPM_{EQN}$, $H_{EQN}$) as defined herein, produces a mean average error ($MAE_{DSE}$) relative to equation (2) of less than 0.2, preferably less than 0.1. Here, $MAE_{DSE}$ is expressed as:

$$MAE_{DSE} = \frac{1}{n}\sum_{n}^{i=1} \frac{|DSE_{REP} - DSE_{EQN(2)}|}{DSE_{EQN(2)}}$$

where n is the number of ($WOB_{EQN}$, $RPM_{EQN}$, $H_{EQN}$) points in a WOB/RPM/H space, $DSE_{REP}$ is the DSE generated at the $i^{th}$ ($WOB_{EQN}$, $RPM_{EQN}$, $H_{EQN}$) point by the representative DSE equation, and $DSE_{EQN(2)}$ is the DSE generated at the $i^{th}$ ($WOB_{EQN}$, $RPM_{EQN}$, $H_{EQN}$) point by the DSE expression of equation (2), when $DSE_{REP}$ and $DSE_{EQN(2)}$ are expressed in equivalent physical units.

In an embodiment, the representative DSE equation comprises at least a first addend, a second addend, and a third addend, where the first addend is comprised of $WOB^{R4}$ where WOB is the variable WOB and R4 is a positive number, and where the second addend is comprised of $Tor^{R5}$ and $DOC^{R6}$, where Tor is the variable Tor, R5 is a positive number, DOC is the variable DOC, and R6 is a negative number, and where the third addend is comprised of $H^{R7}$, $RPM^{R8}$, and $DOC^{R9}$, where H is the variable H, R7 is a positive number, RPM is the variable RPM, R8 is a negative number, DOC is the variable DOC, and R9 is a negative number. In further embodiment, R4 is equal to one, R5 is equal to one, R6 is equal to negative one, R7 is equal to one, R8 is equal to negative one, and R9 is equal to negative one. In a further embodiment, the representative DSE equation is an expression equivalent to equation (2).

Additionally within this disclosure, a "representative SE equation" means either a representative MSE equation or a representative DSE equation.

Within this disclosure, a "representative ROP equation" means a first well-formed mathematical expression having variables comprised of at least a DOC variable and an RPM variable, where the DOC variable may be expressed as an ROP variable divided by an RPM variable, and where the representative ROP equation, when applied in a WOB/RPM/H space comprised of a plurality of probable operating points ($WOB_{EQN}$, $RPM_{EQN}$, $H_{EQN}$) as defined herein, produces a mean average error ($MAE_{ROP}$) relative to equation (3) of less than 0.2, preferably less than 0.1. Here, $MAE_{ROP}$ is expressed as:

$$MAE_{ROP} = \frac{1}{n}\sum_{n}^{i=1} \frac{|ROP_{REP} - ROP_{EQN(3)}|}{ROP_{EQN(3)}}$$

where n is the number of ($WOB_{EQN}$, $RPM_{EQN}$, $H_{EQN}$) points in a WOB/RPM/H space, $ROP_{REP}$ is the ROP generated at the $i^{th}$ ($WOB_{EQN}$, $RPM_{EQN}$, $H_{EQN}$) point by the representative ROP equation, and $ROP_{EQN}(3)$ is the ROP generated at the $i^{th}$ ($WOB_{EQN}$, $RPM_{EQN}$, $H_{EQN}$) point by the ROP expression of equation (3), when $ROP_{REP}$ and $ROP_{EQN(3)}$ are expressed in equivalent physical units.

In an embodiment, the representative MSE equation comprises at least $DOC^{R10}$ where DOC is the variable DOC and R10 is a positive number, and comprises at least $RPM^{R11}$, where RPM is the variable RPM and R11 is a positive number. In further embodiment, R10 and R11 are equal to one. In a further embodiment, the representative ROP equation is an expression equivalent to equation (3).

The apparatus and method disclosed determines an ROP, an SE, or an ROP/SE for each ($WOB_{EQN}$, $RPM_{EQN}$, $H_{EQN}$) point in the WOB/RPM/H space at the particular $LD_{EQN}$ using the representative MSE equation, the representative DSE equation, and/or the representative ROP equation, and utilizes the results to provide a ($WOB_{OPT}$, $RPM_{OPT}$, $H_{OPT}$) condition to a drilling operator based on a PE chosen, as discussed.

Principles of ANN1 and ANN2 Operation

Figure 4:
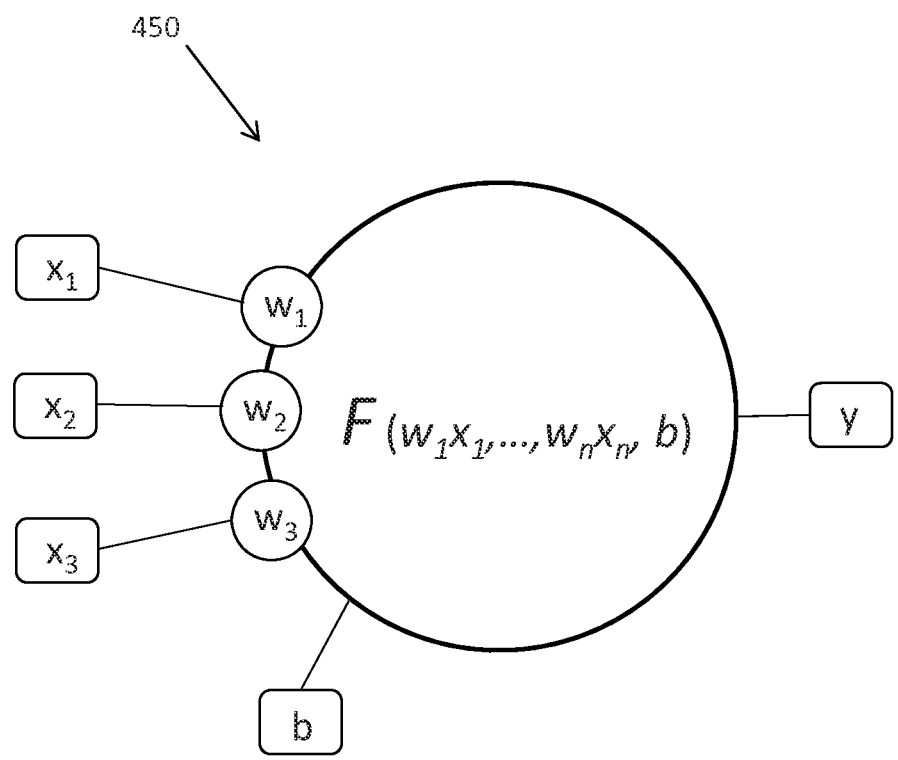
FIG. 4 illustrates an exemplary artificial neuron.

Artificial Neural Networks (ANN) are mathematical models made up of artificial neurons, such as artificial neuron 450 at FIG. 4. As is known in the art, artificial neuron 450 receives input values $x_i$ such as $x_1$, $x_2$, and $x_3$ at FIG. 4. Artificial neuron 450 multiplies each input value by a corresponding individual weight $w_i$, illustrated as $w_1$, $w_2$, and $w_3$, and generates weighted inputs $w_i x_i$, such as $w_1 x_1$, $w_2 x_2$, and $w_3 x_3$. Artificial neuron 450 then operates on the weighted inputs and a bias value illustrated as b with a transfer function, represented at FIG. 4 as F ($w_1 x_1, \ldots, w_i x_i$, b), where ($w_1 x_1, \ldots, w_i x_i$, b) may be a summation unit, a product unit, or some other mathematical manipulation of the weighted inputs and bias. The transfer function F processes the ($w_1 x_1, \ldots, w_i x_i$, b) to generate an output value y. The transfer function is typically a step function, identity function, linear function, sigmoid function or hyperbolic tangent function.

For the case when sample body consisting of m samples, there will be m output value for each input vector. The output for the jth sample of the ith input vector $y_{ij}$ of artificial neuron 450 is expressed as:

$$y_j(k) = F(w_1(k)x_{1j}(k), \ldots, w_i(k)x_{ij}(k), b(k)) \quad (4)$$

where the artificial neuron receives n inputs and $i=1 \to n$, and where $w_i(k)$ is the weight of the $i^{th}$ input value to artificial neuron 450 at a $k^{th}$ cycle, $x_{ij}(k)$ is the $i^{th}$ input value from the jth sample to artificial neuron 450, b(k) is the bias value applied to artificial neuron 450 at the $k^{th}$ cycle, F denotes the transfer function operating on ($w_1 x_{1j}, \ldots, w_i x_{ij}$, b) within artificial neuron 450, and y(k) is the output value of artificial neuron 450 at the $k^{th}$ cycle. The y(k) is an m-element vector with each of the element corresponding to a particular sample set of the m samples, In a particular embodiment, ($w_1 x_{ij}, \ldots, w_i x_{ij}$, b) is a summation of the weighted inputs and bias, and the output y is expressed as:

$$y_j(k) = F\left(\sum_{i=0}^{n} w_i(k)x_{ij}(k) + b(k)\right) \quad (5)$$

The bias value b may also be expressed using the nomenclature of a weighted input as $w_0 x_0$ in equations (3) and (4), with $i=0 \to n$ and $x_0$ equal to a constant, typically 1.

Figure 5:
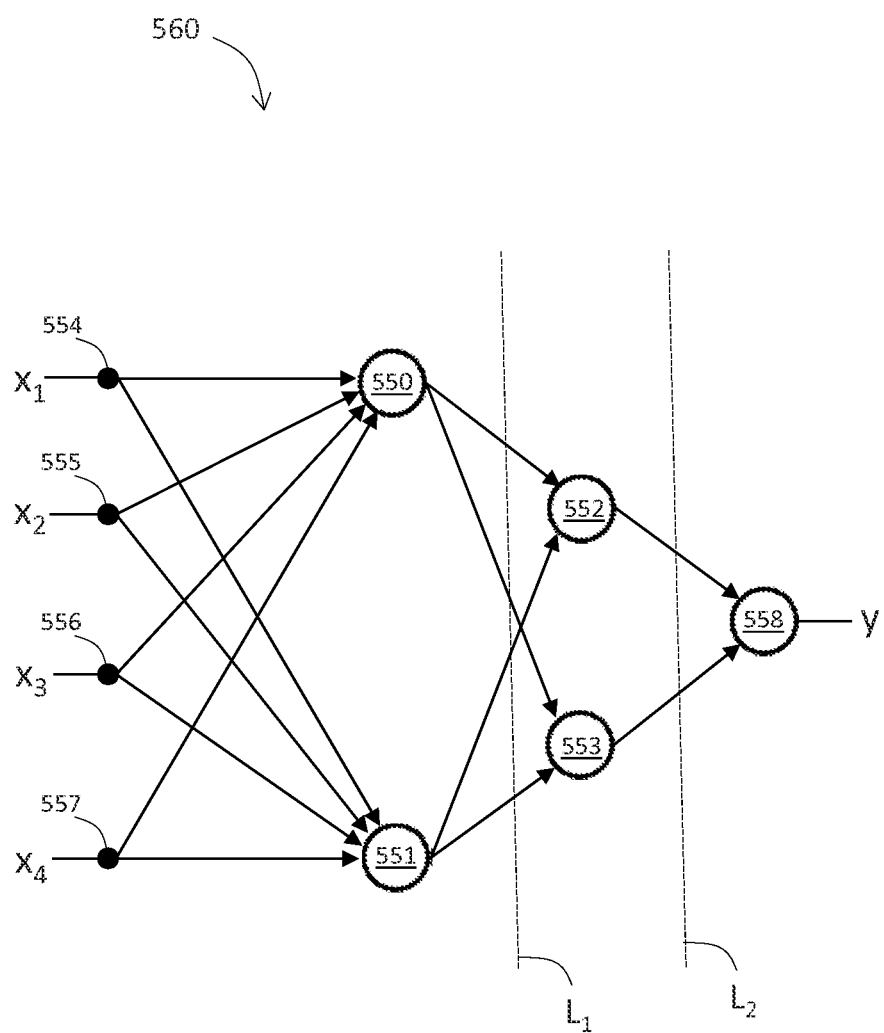
FIG. 5 illustrates an exemplary artificial neural network.

As is additionally understood, an artificial neural network (ANN) comprises multiple artificial neurons linked together in a network architecture, in order to transform inputs into a meaningful output. A typical structure includes a number of neurons usually arranged in layers: an input layer, one or more hidden layers, and an output layer. The output of a neuron in a layer provides an input to one or more neurons in the succeeding layer. The propagation of information in the ANN starts at the input layer where the input data are presented, and one or more outputs is provided by the output value of one or more neurons in the output layer. As an example, FIG. 5 illustrates ANN 560 with an input layer comprised of nodes and neurons to the left of $L_1$, a hidden layer comprised of neurons between $L_1$ and $L_2$, and an output layer comprised of a neuron and an output node to the right of $L_2$. At FIG. 5, the input layer of ANN 560 is comprised of input nodes 554, 555, 556, and 557, and a first layer comprised of artificial neurons 550 and 551, a hidden layer comprised of artificial neurons 552 and 553, and an output layer is comprised of artificial neuron 558 and an output node Y. ANN 560 as depicted is a feed-forward ANN, where signals travel in only one direction from input to output.

At FIG. 5, input nodes in the input layer are fixed with inputs such as $x_1$, $x_2$, $x_3$, and $x_4$ and pass these inputs to one or more artificial neurons in the input layer, as illustrated. Artificial neurons 550 and 551 in the input layer operate on these inputs and generate respective outputs according to the relationship of equation (4). The respective outputs provide an input to one or more artificial neurons in the hidden layer, represented by artificial neurons 552 and 553 at FIG. 5. Artificial neurons 552 and 553 similarly provide respective outputs based on equation (4) and provide these outputs to output neuron 558. The output value of ANN 560 is provided by output neuron 558, which receives the output of artificial neurons 552 and 553 and provides an output y at the output node based on equation (4). Thus overall, ANN 560 receives input values $x_1$, $x_2$, $x_3$, and $x_4$ and translates these input values to the output y. The value of the output y produced depends on the input values provided, but also is strongly dependent on the individual weights $w_i$ and bias values, as well as the type of transfer functions F, operating within each artificial neuron in the input layer, hidden layer and the output layer. Generally, each training cycles will exhaust all the samples for training. The i-th input value may consist of 1 to m values with each of them from the corresponding row of the i-th variable. Generally all of them will be used in the k-th training cycle.

As is additionally understood, an ANN, such as ANN 560, is trained through a process by which the ANN adjusts the values of the set of weights and the bias of individual artificial neurons in the input, hidden and output layers based on a training data set and application of a learning rule. Many learning rules can be utilized, such as the Hebbian, Correlation, Instar, WTA, Outstar, Widrow-Hoff LMS, and others. Typically in feed-forward ANNs such as ANN 560, the learning rule is applied in a back-propagation algorithm. The back-propagation algorithm uses supervised learning, where the ANN is provided with training data comprised of input objects and corresponding output values. The supervised learning algorithm analyzes the training data and produces an inferred function, which can be used for mapping new examples. See e.g. Rumelhart et al., "Learning Representations by back-propagating errors," *Nature* 323(9) (1986); see also Jain et al., "Artificial Neural Networks: A Tutorial" *Computer* 29(3) (1996); see also B. M. Wilamowski, "Neural Networks Learning" *Industrial Electronics Handbook, vol. 5—Intelligent Systems* ($2^{nd}$ Ed., 2011).

During training, the weights and the bias of individual artificial neurons in an ANN such as ANN 550 are modified through the use of an error function based on the error between ANN output and the target value of a training input vector. Error functions such as mean square error, mean absolute error, and others may be utilized. See e.g. Falas et al., "The Impact of the Error Function Selection in Neural Network-based Classifiers," Neural Networks, 1999. IJCNN '99. International Joint Conference on, among others.

Further, as is understood, the training process for an ANN such as ANN 560 generally continues until a termination criterion is reached, signifying that the ANN is a trained ANN. The termination criterion is typically based on the magnitude of error between ANN output and the target value, the change in the magnitude of the error, application of a pre-determined number of training patterns to the ANN, or application of the training set to the ANN over a certain number of epochs. See e.g. Ney, "On the Probabilistic Interpretation of Neural Network Classifiers and Discriminative Training Criterion," *IEEE Trans. Pattern Anal. Mach. Intell.* 17(2) (1995), among others.

During training, the values of set of weights and the bias coefficients for each artificial neuron experience consecutive changes from iteration to iteration, such as that $w_i(k)$ for a given i becomes $w_i(k+1)$, $w_i(k+2)$, and so on, and b(k) for the given i becomes b(k+1), b(k+2), and so on. At the end of training, each weight and bias value is settled to a final value. Once trained, each of all the weight and bias value become fixed when they are used in the prediction and evaluation phases. At this point, the ANN such as ANN 560 may be provided with an input vector ($x_1$, $x_2$, $x_3$, $x_4$) and map an output y based on the input vector. For example, an ANN such as ANN 560 may be trained under supervised learning using a set of training input vectors (WOB, LD, H, RPM), where each input vector is associated with an target DOC. At the conclusion of this training, the trained ANN may be provided with an input vector (WOB, LD, H, RPM) not within the set of training input vectors, and the trained ANN may map this input vector to a particular output value DOC. Similarly, an ANN may be trained using the set of training input vectors (WOB, LD, H, RPM) with each input vector associated with a target Tor, such that the trained ANN maps (WOB, LD, H, RPM) input vectors to a particular output value Tor. In an embodiment, the particular output value DOC and the particular output value Tor are further evaluated based on a trend of an input~DOC relationship and a trend of an input~Tor relationship, as will be discussed.

This disclosure employs artificial neural networks by utilizing at least a first ANN to provide an output value representative of depth-of-cut (DOC) and in some embodiments a second ANN to provide an output value representative of torque (Tor). The first and second ANNs are independent artificial neural networks, such that there is no information flow between the input, hidden or output layer of the first ANN and the input, hidden or output layer of the second ANN. Both ANNs receive input vectors having individual elements comprised of functions of the individual parameters WOB, LD, H, or RPM, where those terms are as earlier defined. The function may comprise, for example, $P^n$, where P is one of the individual parameters WOB, LD, H, or RPM, and n is an exponent.

Within this disclosure, "artificial neuron" means a set of software instructions which receives one or more inputs and produces an output according to equation (4). In an embodiment, the artificial neuron receives the one or more inputs and produces an output according to equation (5).

Within this disclosure, the phrase "a set of weights and a bias" as applied to an individual artificial neuron means the set of weights $w_i(k)$ and the bias b(k) utilized by the individual artificial neuron at the $k^{th}$ cycle.

Within this disclosure, the term "artificial neural network" means a set of software instructions which receives an input vector and operates on the input vector in a manner equivalent to a network comprising input nodes and artificial neurons and having an input layer, one or more hidden layers, and an output layer. "Input layer" means the portion of the network comprising a group of input nodes and one or more artificial neurons. "Input node" means a node in the input layer which receives one element of an input vector, and communicates that element to at least one artificial neuron in the input layer, where no input node in the input layer communicates with any other input node in the input layer. "Hidden layer" means a group of artificial neurons where each artificial neuron receives at least one input communicated from another artificial neuron and communicates an output to at least one other artificial neuron. "Output layer" means an artificial neuron which receives at least one input communicated from an artificial neuron in a hidden layer and produces an output value. The artificial neural network may be a feed-forward, or a recurrent or interactive network, as those terms are used in the art. In an embodiment, "artificial neural network" means a feed-forward network where connections between input nodes and artificial neurons do not form a directed cycle.

Within this disclosure, a "training set" means a set of input vectors and a target, where each individual input vector has a number of elements equal to the number of input nodes in an ANN, and where each element in the individual input vector is associated with at least one of the input nodes in the ANN, such that when the each individual input vector is applied to the ANN, the value of the each element is communicated to one of the input nodes in the ANN. The "target," when used relative to the individual input vector is at the same position as an output value. The target value is the desired output value of the ANN. In an embodiment, the training set can be an input matrix, with each row of the input matrix being an individual input vector or from a sample row as described above. Accordingly, the target comprises a column of data with correspondence to the input vectors in the input matrix. The entire data set in the input matrix can be applied to the ANN with the entire values of each column communicating with the input nodes in one iteration of ANN training and generates a column of predicted output values simultaneously, with each output value produced by the ANN corresponding to a value of the target column in the corresponding row.

Similarly, "training" when applied to an ANN means a process whereby a plurality of input vectors from a training set is applied to the input nodes of the ANN, such that during a first iteration a first input vector is applied to the input nodes of the ANN, an output value is produced at the output neuron of the ANN, and an first error is generated using an error function based on a comparison between the output value produced by the ANN and the target of the first input vector, followed at least by a second iteration where a second input vector from the plurality is applied to the input nodes, a second error is generated using the error function based on a comparison between the output value of the ANN and the target of the second input vector, and so on, until a termination criterion is met. The training may be conducted as line-by-line training, where the error generated is applied to the set of weights and the bias of each individual artificial neuron in the ANN using a learning algorithm at the conclusion of each iteration, or may be conducted as batch training, where the set of weights and the bias of each individual artificial neuron is left unchanged as the plurality of two or more input vectors is sequentially applied, and then modified once application of the plurality is complete, with the modification based on an error value generated using the first error, the second error, and the other errors generated as each input vector in the plurality is applied. In either line-by-line or batch training as described here, an individual input vector or a plurality of input vectors within a given training set may be utilized one or more times. Alternatively, if the termination criterion is met prior to use of all input vectors in the training set, some input vectors in the training set may not be utilized at all during the training.

Within this disclosure, when the method and apparatus calls for modifying the initial set of weights and the initial bias based on an error and based on whether training the ANN is an line-by-line training or a batch training, this means that when the training is conducted as line-by-line training, the error generated is applied to the set of weights and the bias of each individual artificial neuron in the ANN following application of each input vector in order to generate a modified set of weights and a modified bias for each artificial neuron, and when the training is conducted as batch training, the error generated is applied to the set of weights and the bias of each individual artificial neuron in the ANN once the application of the plurality of training vectors is complete, such that the modified set of weights and the modified bias for a given artificial neuron is the same as the initial set of weights and the initial bias for the given artificial neuron until the application of the plurality of training vectors is complete, at which time the modified set of weights and the modified bias for the given artificial neuron is altered from the initial set of weights and the initial bias for the given artificial neuron based on the error.

Similarly, "termination criterion" means a maximum value of the magnitude of error between an ANN output and the target of a training input vector, a maximum value of a change in the magnitude of the error generated from application of a first training vector or a plurality of training vectors to a group of ANN input nodes and application of a second training vector or a second plurality of training vectors to the group of ANN input nodes, a minimum number of training patterns applied to an ANN during training, or a minimum number of epochs a training set is applied an ANN. Similarly, when training is specified "until the termination criterion is satisfied," this means that a termination criterion is set prior to training, a termination parameter is monitored during the training, and that training ceases when the termination parameter meets the condition of the termination criterion. Exemplary but non-limiting examples include when a maximum error $E_{MAX}$ is set prior to training, an error E is monitored during the training, and training ceases when E is less than or equal to $E_{MAX}$, or when a minimum count $k_{MAX}$ is set prior to training, a counting variable k is incremented and monitored during the training, and training ceases when k is greater than $k_{MAX}$.

Similarly, the modifier "trained" when applied to an ANN means an ANN which has undergone the process of training.

Similarly, the phrase "a set of modified weights and a modified bias" as applied to an individual artificial neuron means a set of weights $w_i(k+1)$ and a bias $b(k+1)$ utilized by the individual artificial neuron at the $(k+1)^{th}$ cycle during training, where the set of modified weights and the modified bias is based on the error generated by an ANN at the $k^{th}$ cycle during training with the set of weights $w_i(k)$ and the bias $b(k)$ utilized by the individual artificial neuron at the $k^{th}$ cycle during training. Here, the $k^{th}$ and the $(k+1)^{th}$ cycle may refer to the individual applications of individual training vectors when line-by-line training is conducted, such that the $k^{th}$ cycle would refer to application of a first input vector and the $(k+1)^{th}$ cycle would refer to the application of a second input vector, or the $k^{th}$ and the $(k+1)^{th}$ cycle may refer to applications of pluralities of input vectors when batch training is conducted, such that the $k^{th}$ cycle would refer to application of a first plurality and the $(k+1)^{th}$ cycle would refer to the application of a second plurality. Typically the error is the average of the sum of the square of the difference between target value and the corresponding ANN output with respect to all input vectors or sample rows in the sample body. For example, the sum error is expressed as an error function as below $$\text{Error } Functn = \sum_{j=1}^{m} (y_j(k) - Y_j)^2$$

While $y_j(k)$ is the output for the jth input vector (jth sample row) at the k-th training cycle, $Y_j$ is the jth teaching element, or jth target value of the jth training set, which is independent of the training cycle. Particularly when ANN1 is referred, the error function can be written as:

$$\text{Error } Functn_{DOC} = \sum_{j=1}^{m}(d_j(k) - DOC_j)^2$$

The apparatus and method disclosed utilizes MWD data to generate training input vectors and at least a trained first ANN to generate a $DOC_{EQN}$ and in some embodiments a trained second ANN to generate a $Tor_{EQN}$ at each ($WOB_{EQN}$, $RPM_{EQN}$, $H_{EQN}$) point in a WOB/RPM/H space. The $DOC_{EQN}$ and $Tor_{EQN}$ are subsequently utilized to determine at least an expected SE and typically also an expected ROP for the each ($WOB_{EQN}$, $RPM_{EQN}$, $H_{EQN}$) point, by using the representative MSE equation, the representative DSE equation, and or the representative ROP equation to determine an expected SE, SE/ROP, and/or ROP, in order to provide a ($WOB_{OPT}$, $RPM_{OPT}$, $H_{OPT}$) condition to a drilling operator, as discussed.

Specific Operations

An embodiment of the apparatus and method is discussed with reference to FIGS. 6-16 with exemplary operations provided for specified steps such as generating a plurality of filled data rows, training the first and second artificial neural networks, generating the plurality of ($WOB_{EQN}$, $RPM_{EQN}$, $H_{EQN}$) points, utilizing the trained first and second ANN to determine at least an expected PE for each ($WOB_{EQN}$, $RPM_{EQN}$, $H_{EQN}$) point, and determining the optimum PE parameter, among other steps. The methodology is explained in terms of functions grouped into modules solely for explanation and clarity purposes, in order to demonstrate the manner in which the various method steps integrate in order to produce the final results of the methodology. However, the use of the term "module" is not intended to imply that each described step must be present within, for example, an isolable group of software instructions within a given programming architecture, when the method is conducted utilizing computerized means. The various steps as described below may be accomplished by any means, and any appropriate programming structure, and further in any order unless a necessary order is explicitly or implicitly described.

Additional specifics of the various steps are discussed below.

Figure 6:
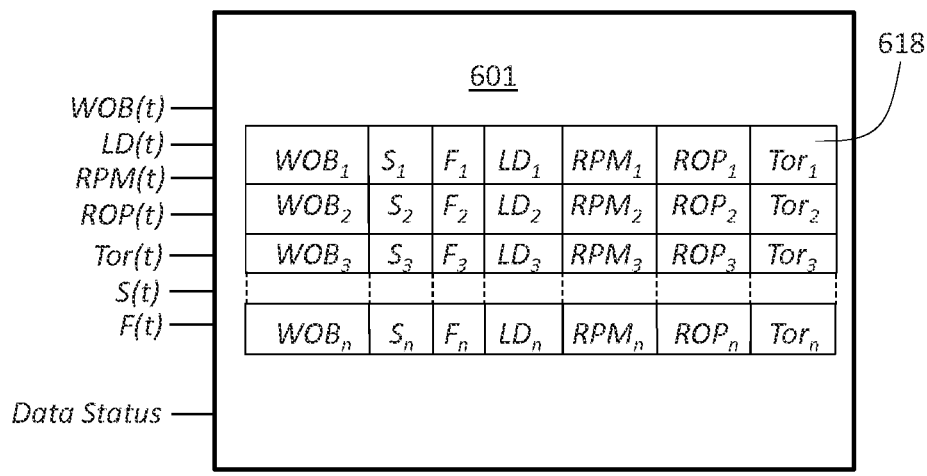
FIG. 6 illustrates one embodiment of a Data matrix.

Specific Operations of the Data Module:

At FIG. 6, a group of data comprised of at least LD(t), WOB(t), RPM(t), ROP(t), Tor(t), S(t), and F(t) is delivered by the MWD system to Data Module 601 through an LD data channel, a WOB data channel, a RPM data channel, a Tor data channel, a S data channel, and a F data channel respectively. This data is a series of signals measured by the MWD system and represents parameters at a sampling period t according to:

LD(t)—corresponding to the well bore length of a well bore produced by a drilling system, expressed as units of length;

WOB(t)—corresponding to the weight-on-bit in the drilling system, expressed as units of weight;

RPM(t)—corresponding to the rate of rotation of a drill bit in the drilling system, expressed as revolutions per unit time, typically revolutions per minute;

ROP(t)—corresponding to a rate of penetration of the drill bit in the drilling system, or the change in LD(i) over a time period, expressed as units of length divided by units of time;

Tor(t)—corresponding to the rotary torque acting on the drill bit in the drilling system, expressed as length-weight units;

S(t)—corresponding to a standpipe pressure of a drilling fluid in a standpipe of the drilling system, expressed as units of weight divided by units of area; and F(t)—corresponding to a flow rate of the drilling fluid injected into the bottom of the well and returned from the annulus and flowed out of the mud returning line, expressed as units of volume divided by units of time.

Data Module 601 collects MWD data by establishing two-dimensional array data structure Data matrix 618, and annotating a WOB column, an S column, an F column, an LD column, an RPM column, an ROP column, and a Tor column in Data matrix 618, as illustrated. As a result, each row in Data matrix 618 has an element location corresponding to the WOB column, the S column, the F column, the LD column, the RPM column, the ROP column, and the Tor column.

Data Module 601 generates a plurality of filled data rows by sampling LD(t), WOB(t), RPM(t), ROP(t), Tor(t), S(t), and F(t) from the appropriate data channels. Data Module 601 generates a filled data row by identifying an empty row in Data matrix 618 and storing data points in the empty row, by storing a WOB signal corresponding to WOB(t) as a WOB data point in the WOB column of the empty row, storing a S signal corresponding to the S(t) as an S data point in the S column of the empty row, storing a F signal corresponding to the F(t) as an F data point in the F column of the empty row, storing a LD signal corresponding to the LD(t) as an LD data point in the LD column of the empty row, storing a RPM signal corresponding to the RPM(t) as an RPM data point in the RPM column of the empty row, storing a ROP signal corresponding to the ROP(t) as an ROP data point in the ROP column of the empty row, and storing a Tor signal corresponding to the Tor(t) as a Tor data point in the Tor column of the empty row, thereby generating a filled data row. Data Module 601 conducts this process iteratively in order to establish the plurality of filled data rows. For example at FIG. 6, Data Module 601 periodically samples LD(t), WOB(t), RPM(t), ROP(t), Tor(t), S(t), and F(t) from the appropriate data channels and stores the resulting data points to generate $WOB_1$, $S_1$, $F_1$, $LD_1$, $RPM_1$, $ROP_1$, and $Tor_1$ held within a first filled data row, data points $WOB_2$, $S_2$, $F_2$, $LD_2$, $RPM_2$, $ROP_2$, and $Tor_2$ held within a second filled data row, $WOB_3$, $S_3$, $F_3$, $LD_3$, $RPM_3$, $ROP_3$, and $Tor_3$ held within a third filled data row, and so on to an $n^{th}$ filled data row holding data points $WOB_n$, $S_n$, $F_n$, $LD_n$, $RPM_n$, $ROP_n$, and $Tor_n$. Here "plurality of filled data rows" refers to at least 2 filled data rows in the Data matrix, however preferably the plurality of filled data rows comprises at least 10 filled data rows, and more preferably at least 50 filled data rows.

Here, a "signal corresponding to X(t)" where X(t) is LD(t), WOB(t), RPM(t), ROP(t), Tor(t), S(t), or F(t) can be any signal intended to represent one or more values of LD(t), WOB(t), RPM(t), ROP(t), Tor(t), S(t), or F(t), as those terms are defined herein, For example, a signal corresponding to X(t) might mean the LD(t), WOB(t), RPM(t), ROP(t), Tor(t), S(t), or F(t) as provided by an MWD system, or might mean a signal derived from an X(t) by using one or more X(t) values in a defined mathematical expression, such as an average or some other statistical expression. Within this disclosure, the precise manner in which a signal corresponding to X(t) is determined is not limiting, provided that the signal intended to represent LD(t), WOB(t), RPM(t), ROP (t), Tor(t), S(t), or F(t), as those terms are defined herein.

In certain embodiments, Data Module 601 may additionally receive a Data Status signal through a Data Status data channel. The Data Status signal serves as a binary signal indicating that the LD(t), WOB(t), RPM(t), ROP(t), Tor(t), S(t), and F(t) signals received originate from drilling conducted using the same drill bit, and originate from measurements conducted in a relatively consistent rock formation environment. Changing the drill bit in the drilling system is a highly conspicuous, planned event and the occurrence is readily observed by operators. Similarly, a change in the formation surrounding the drill bit may be based on formation indicators such as γ-ray and formation resistivity indicators, or formation acoustic indicators provided by the MWD system in conjunction with a known formation change index, or a cutting analysis report generated at the site. However, the manner which the Data Status signal is generated is not a limitation within this disclosure. In these embodiments, as long as the Data Status signal is unchanged, Data Module 601 continues to periodically sample the data channels and generate additional filled data rows, producing the plurality of filled data rows. Verifying the consistency of the Data Status signal ensures that the data points stored in the plurality of filled data rows result from measurements by the MWD system obtained under sufficiently similar drilling conditions.

In another embodiment, Data Module 601 holds the plurality of filled data rows in a temporary storage space, and limits the quantity of the filled data rows below an $RN_{MAX}$. In this embodiment, when the quantity of the filled data rows exceeds the $RN_{MAX}$, Data Module 601 eliminates the chronologically oldest filled data rows to maintain the quantity of the filled data rows below the $RN_{MAX}$. In a further embodiment, Data Module 601 collects additional data from the MWD system while maintaining the plurality of filled data rows in the temporary storage space, provides the plurality of filled data rows to the other modules from the temporary storage space until an optimum SE parameter is determined, then refreshes the temporary storage space by adding the additional data from the MWD system gathered during the computation time to the body of existing filler data rows in the temporary storage space. In this way, the length of the data row stored in the temporary storage space grows batch-wise till it reaches the maximum allowed number of rows, $RN_{MAX}$.

Figure 7:
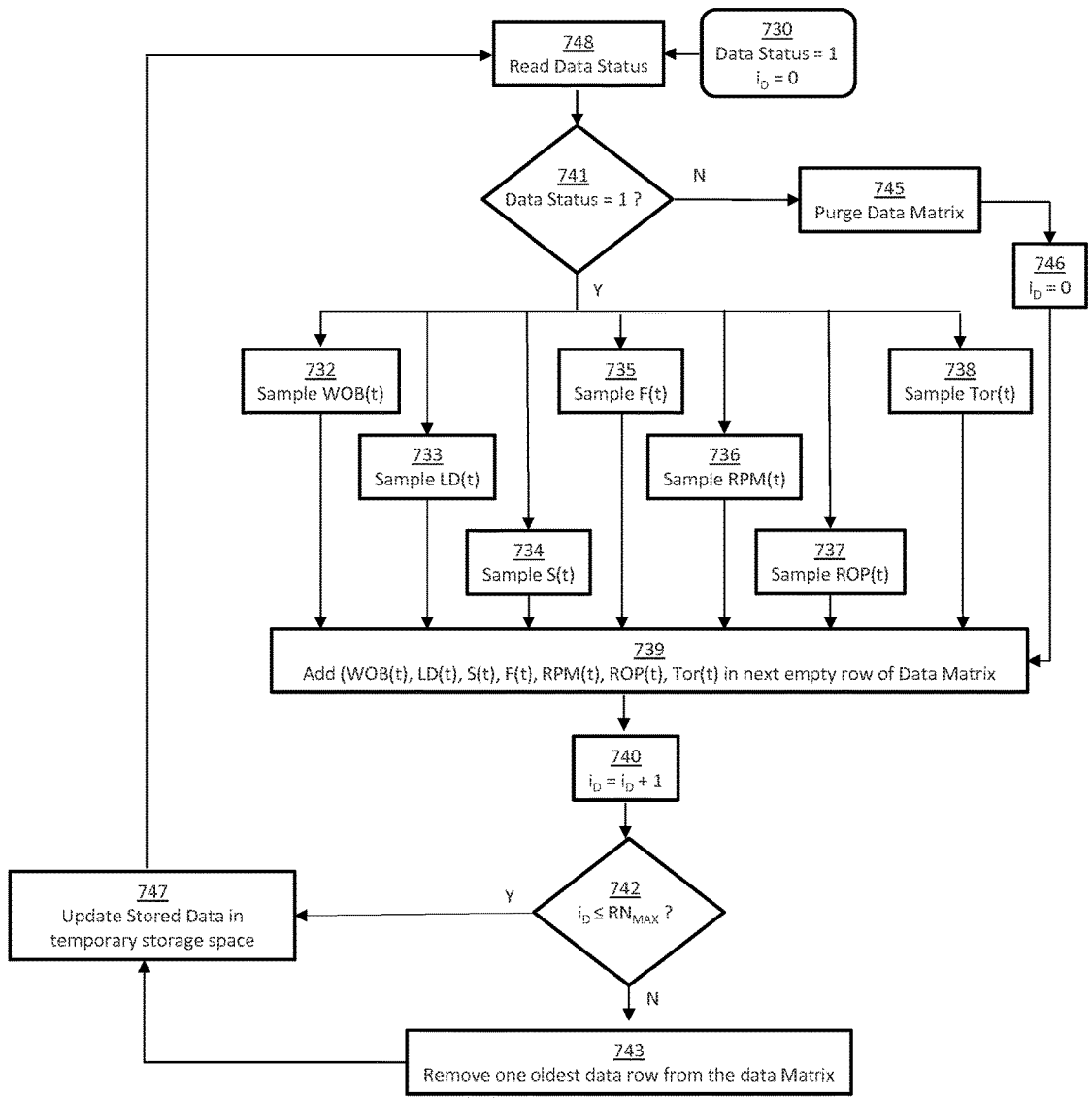
FIG. 7 illustrates a generalized block diagram for an embodiment of a Data module.

The operation of a specific embodiment of a Data Module is illustrated at FIG. 7. The FIG. 7 process commences at 730 where Data Status is equal to one and a counting variable $i_D$ is equal to zero. The FIG. 7 process initially reads Data Status at 748 and takes action at decision point 741 based on the value. Here, a Data Status equal to one indicates that the signals received from the MWD system originate from similar conditions as discussed above, while a value other than one such as zero indicates the conditions have changed. If Data Status is equal to one, decision point 741 directs the FIG. 7 process to sample WOB(t) at 732, sample LD(t) at 733, sample S(t) at 734, sample F(t) at 735, sample RPM(t) at 736, sample ROP(t) at 737, and sample Tor(t) at 738. At 739, the process stores the respective data points in an empty row of the Data Matrix, as previously discussed, and at 740, having generated a filled data row in the Data Matrix, increases the counting variable $i_D$ by one.

At decision point 742, the FIG. 7 process evaluates the counting variable $i_D$ against a maximum allowed number of rows, $RN_{MAX}$. If $i_D$ is less than or equal to $RN_{MAX}$, indicating that the quantity of filled data rows in the Data Matrix is less than or equal to $RN_{MAX}$, decision point 742 directs the FIG. 7 process to node 747 and subsequently back to 748. At 748, Data Status again read, and if Data Status remains equal to one, decision point 741 directs the FIG. 7 process to generate a second filled data row, and so one, until either the Data Status is unequal to one, indicating that drilling conditions have changed, or until $i_D$ exceeds $RN_{MAX}$.

If the drilling conditions change and Data Status is unequal to one, then decision point 741 directs the FIG. 7 process to node 745 and subsequently to 746, where the Data Matrix is purged. Following 746, the process resets $i_D$ equal to zero and returns to the main stream at node 739, where a sole data row is added to the data Matrix and the count of data rows re-raised to $i_D$=0+1=1 at 740. The FIG. 7 process re-commences once new drilling conditions are established and Data Status is reset to one. Decision point 741 thereby ensures that the plurality of filled data rows generated and stored within the Data Matrix originate from similar drilling conditions.

If the counting variable $i_D$ exceeds $RN_{MAX}$, then decision point 742 direct the FIG. 7 process to remove the oldest data rows stored at block 743 therefore the temporary storage space always keeps the filled data rows of the Data Matrix under total number of rows, $i_D$, being under $RN_{MAX}$. The temporary storage space is a two-dimensional array data structure similar to Data matrix 618. Then the FIG. 7 process returns to 748. In the next turn, if the data status keeps unchanged, the total number of rows will again exceeds the upper limit, $RN_{MAX}$, since a new line/row will be added at 739. Then the process will follow the pathway of 740-742-743 through which another oldest row at that point of time will be cleared off. In this way, the total stored row number will always be kept just below the allowed limit, until the occurrence of change in Data Status, when all the rows to be purged off, and the filling up of storage space restarts from the addition of the newly arrived row, followed with the reset of row number counting to $i_D$=0+1=1 at 739.

Figure 8:
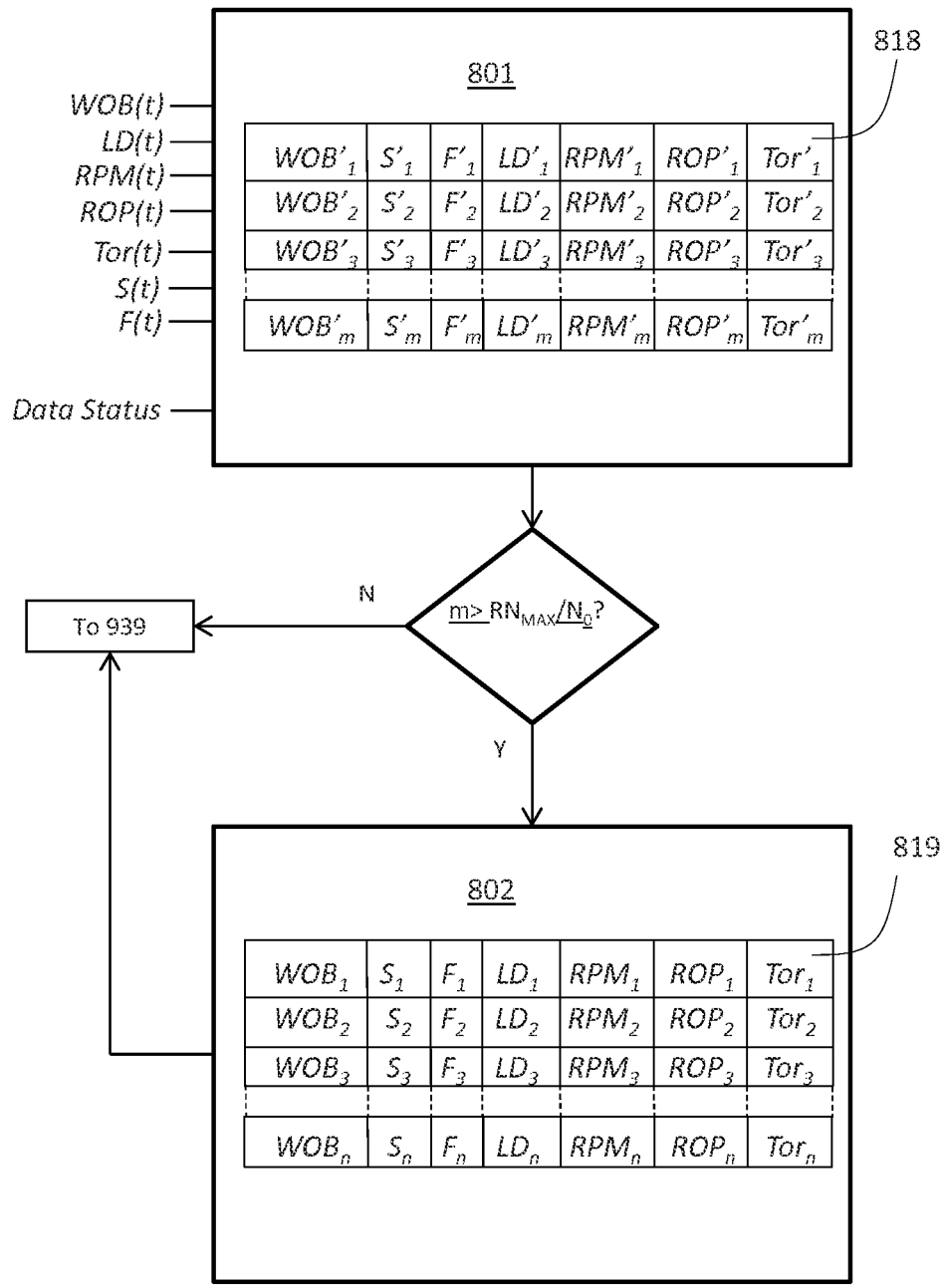
FIG. 8 illustrates another embodiment of a Data matrix.

For a particular embodiment, FIG. 8 demonstrates the function of preparing batch input. The Data Module represented by FIG. 8 comprises modules 801 and 802. Module 801 is an online memory working in parallel in time with the rest of the processors. During the entire process, module 801 works to keep receiving MWD data and holding a number of received data rows that are most current, and making them available to be transferred to module 802. The input to module 801 is a group of data comprised of at least LD(t), WOB(t), RPM(t), ROP(t), Tor(t), S(t), and F(t), where these are as earlier defined and delivered by the MWD system to module 801 through an LD data channel, a WOB data channel, a RPM data channel, a Tor data channel, a S data channel, a F data channel, and potentially a ROP channel respectively.

Module 801 always keeps a fixed number of filled data rows, for example m rows, which are most recently received from the MWD interface. The m rows can be listed in chronological order. Module 802 visits 801 periodically, once every loop, and takes all the data rows that have not been used in previous loops and process them. The output from the module 802 is a plurality of filled data rows of a desired row number which may be the same as or different from that of the filled data rows it receives from module 801 with each visit. However, each value in each filled data row stored in module 802 is certain function of the corresponding subset of data rows received from module 801 in each visit of module 802 to module 801. The entire filled data rows stored in module 802 forms a data batch that is to be added to a temporary storage space once every loop.

Module 801 periodically samples LD(t), WOB(t), RPM(t), ROP(t), Tor(t), S(t), and F(t) from the appropriate data channels and stores the resulting data points to generate $WOB_1'$, $S_1'$, $F_1'$, $LD_1'$, $RPM_1'$, $ROP_1'$, and $Tor_1'$ held within a first filled data row, data points $WOB_2'$, $S_2'$, $F_2'$, $LD_2'$, $RPM_2'$, $ROP_2'$, and $Tor_2'$ held within a second filled data row, $WOB_3'$, $S_3'$, $F_3'$, $LD_3'$, $RPM_3'$, $ROP_3'$, and $Tor_3'$ held within a third filled data row, and so on to an $m^{th}$ filled data row holding data points $WOB_m'$, $S_m'$, $F_m'$, $LD_m'$, $RPM_m'$, $ROP_m'$, and $Tor_m'$. Once all the m-rows are filled, the chronologically newest received data row from MWD is placed where the chronologically oldest data row is located by replacing the chronologically oldest data row with the newly arrived data row. This replacing process continues for the entire period whenever optimization is in process.

Module 802 of FIG. 8 contains the same group of parameters as module 801, which includes at least LD, WOB, RPM, ROP, Tor, S, and F, and the function of module 802 is to generate batch data rows based on input from 801. Module 802 converts the received data rows from module 801 into a fixed n-row data table, and sends all the n-row data to a temporary storage space before it is ordered to make another visit to module 801 in establishing a new n-row data table.

The values stored in each row of module 802 maybe a certain statistic representation of the module 801 raw data table. Exemplary methods include but are not limited to: 1) cut-off to the size of row numbers as required by the batch, by simply keeping only the freshest rows up to the number of batch limitation, n, or 2) if the received data rows is at least twice as much as the batch limitation n, dividing the received data into n subgroups of approximately the similar size, according to the chronological order, and using the average value of each parameters in each subgroup as the value for the same parameter for the corresponding filled data rows of module 1302. The batch limitation row number, n, is determined based on the balance between computation speed and the desire to keep as many representative patterns of a controllable~intermediate function relationship (i.e, DOC or Tor) as possible. An exemplary way to determine the batch limitation row number, n, is to divide the maximum row number, $RN_{MAX}$, by a proper positive integer $n_0$. In an embodiment, the value of $n_0$ is 10. Then, $n=RN_{MAX}/n_0$ is the expected output batch row number from module 802. As a result, the n filled data rows holding data points $WOB_n$, $S_n$, $F_n$, $LD_n$, $RPM_n$, $ROP_n$, and $Tor_n$ are prepared for later use.

Figure 9:
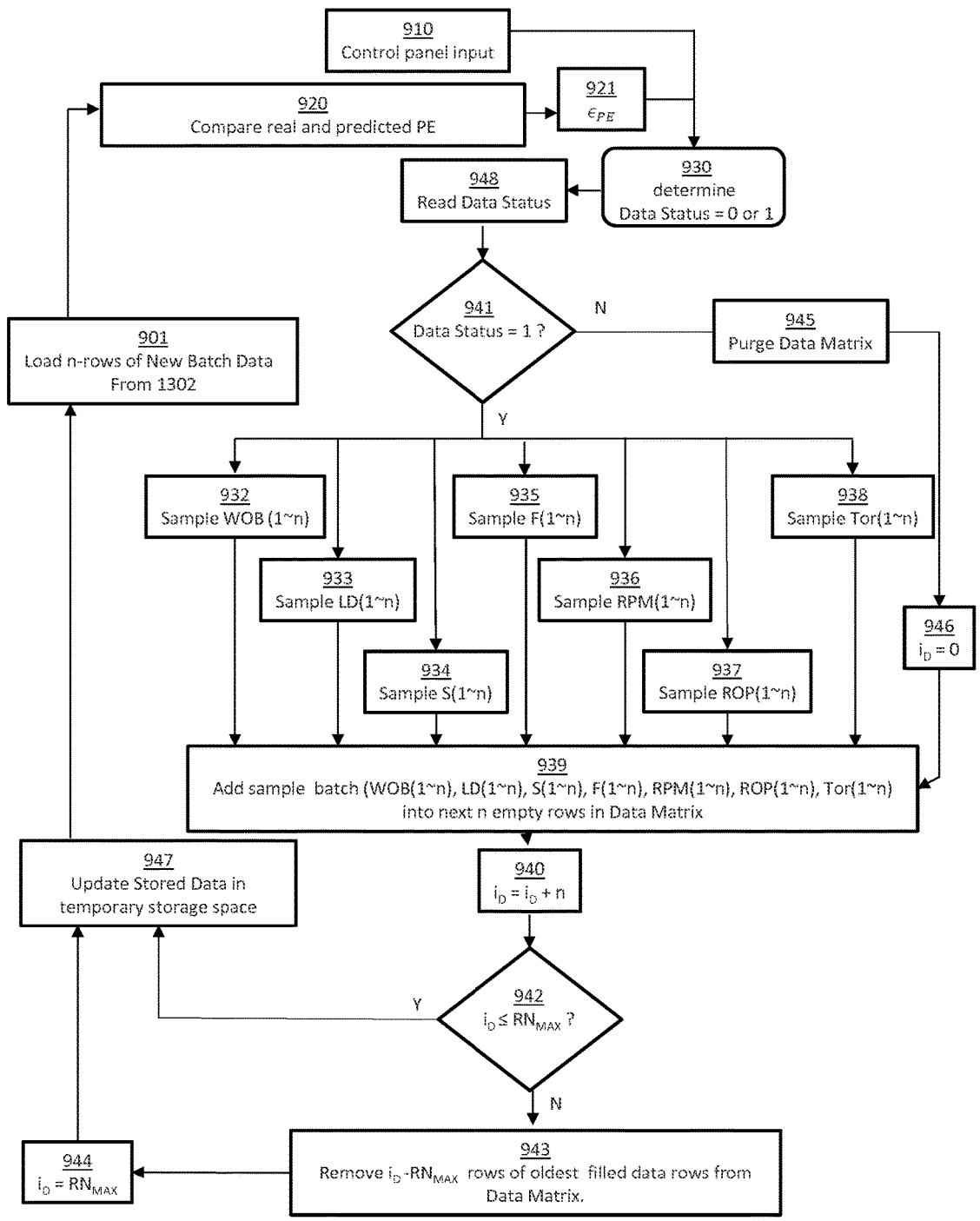
FIG. 9 illustrates a generalized block diagram for another embodiment of a Data module.

The operation of a specific embodiment of the Data Module of FIG. 8 is illustrated at FIG. 9. The FIG. 9 process commences at module 901 where a new batch of data rows is loaded from module 802. At the same time the process represented by FIG. 9 receives information needed to determine data status at Module 930. The information fed to 930 comes from two channels. One is signal from Control Panel input 910 manually from the drilling operator and the other, at 920 and 921, from the result of simulation evaluation as the value of $\epsilon_{PE}$, the point average derivation between a real and simulated PE, such as MSE. Module 930 then determines the Data status and reports to 948. The FIG. 9 process reads Data Status at 948 and makes a decision at point 941 based on the value representing Data Status. Here, a Data Status equals to one indicates that the drilling dynamics represented by the newly received data batch is similar to those by the data rows stored in the temporary storage space, while a value other than one such as zero indicates the conditions have changed. If Data Status is equal to one, i.e., condition unchanged, decision point 941 directs the FIG. 9 process to add the new batch into the Data Matrix of the temporary storage space. While the new batch of data is symbolized as WOB(1~n) at 932, sample LD(1~n) at 933, sample S(1~n) at 934, sample F(1~n) at 935, sample RPM (1~n) at 936, sample ROP(1~n) at 937, and sample Tor(1~n) at 938, while 1~n indicating there are n data points for each parameter, or n rows of new data batch are added. The addition of the new Data batch to the Data Matrix is performed at 939. Correspondingly, 940 recognizes the increase in row number in the Data Matrix, by increasing the counting variable $i_D$ by n. Since extra rows are removed at 943, 944 re-recognizes that the current number at that point should be equal to the set upper limit of $RN_{MAX}$.

At decision point 942, the FIG. 9 process evaluates the counting variable $i_D$ against a maximum allowed number of rows, $RN_{MAX}$. If $i_D$ is less than or equal to $RN_{MAX}$, indicating that the quantity of filled data rows in the Data Matrix is less than or equal to $RN_{MAX}$, decision point 942 directs the FIG. 9 process to node 947 and subsequently back to 901. Another cycle restarts as a new batch of data row is again loaded at 901 followed by a Data Status check at 948, and so on, until either the Data Status is unequal to one, indicating that drilling conditions have changed, or until $i_D$ exceeds $RN_{MAX}$.

If the drilling conditions change the Data Status will become unequal to one, then decision point 941 directs the FIG. 9 process to node 945 to purge the Data Matrix and subsequently to 946, to reset the count number of rows kept in the Data Matrix, $i_D$, to zero to reflect the purge. Then the route merges with the route for unchanged Data Status at 939, where the new batch is added to the just emptied Data Matrix. After the addition to the empty Data. Matrix, the number of rows in the Data Matrix now becomes n. This is reflected by the operation in 940, as $i_D=0+n=n$. The process will then go through 942, merging at 947 and returns to node 901, where the FIG. 9 process re-commences again when new batch of data is loaded. Decision point 941 thereby ensures that the plurality of filled data rows generated and stored within the Data Matrix originate from similar drilling conditions.

If the counting variable $i_D$ exceeds $RN_{MAX}$, then decision point 942 directs the FIG. 9 process to remove the excessive number of data rows that are oldest from the Data Matrix, followed by resetting the counting number $i_D$ at 944 to $i_D=RN_{MAX}$. With update completed and keeping the qualified data rows, Block 947 is simply a point of supply to the ANN training needs. In other words, Block 947 acts as a temporary storage space for the output from the FIG. 9 process. As earlier described, the temporary storage space is a two-dimensional array data structure similar to Data matrix 618.

As used here and with respect to other modules, a two-dimensional matrix means a rectangular array of numbers, symbols, or expressions, where the rectangular array has an m number of rows and an n number of columns, where m>1 and n>1. See e.g., Dennis S. Bernstein, Matrix Mathematics: Theory, Facts, and Formulas, Princeton University Press, Princeton, N.J., ($2^{nd}$ Ed.), among others. Similarly, a "two-dimensional array data structure" means a physical device in a computer capable of storing and indexing data with a plurality of two-dimensional coordinates (i, j), where each two-dimensional coordinate (i, j) in the plurality is a unique set, and where the physical device in the computer is capable of retrieving data addressed with a given (i, j) coordinate in response to a software instruction which includes the given (i, j) coordinate.

Figure 10:
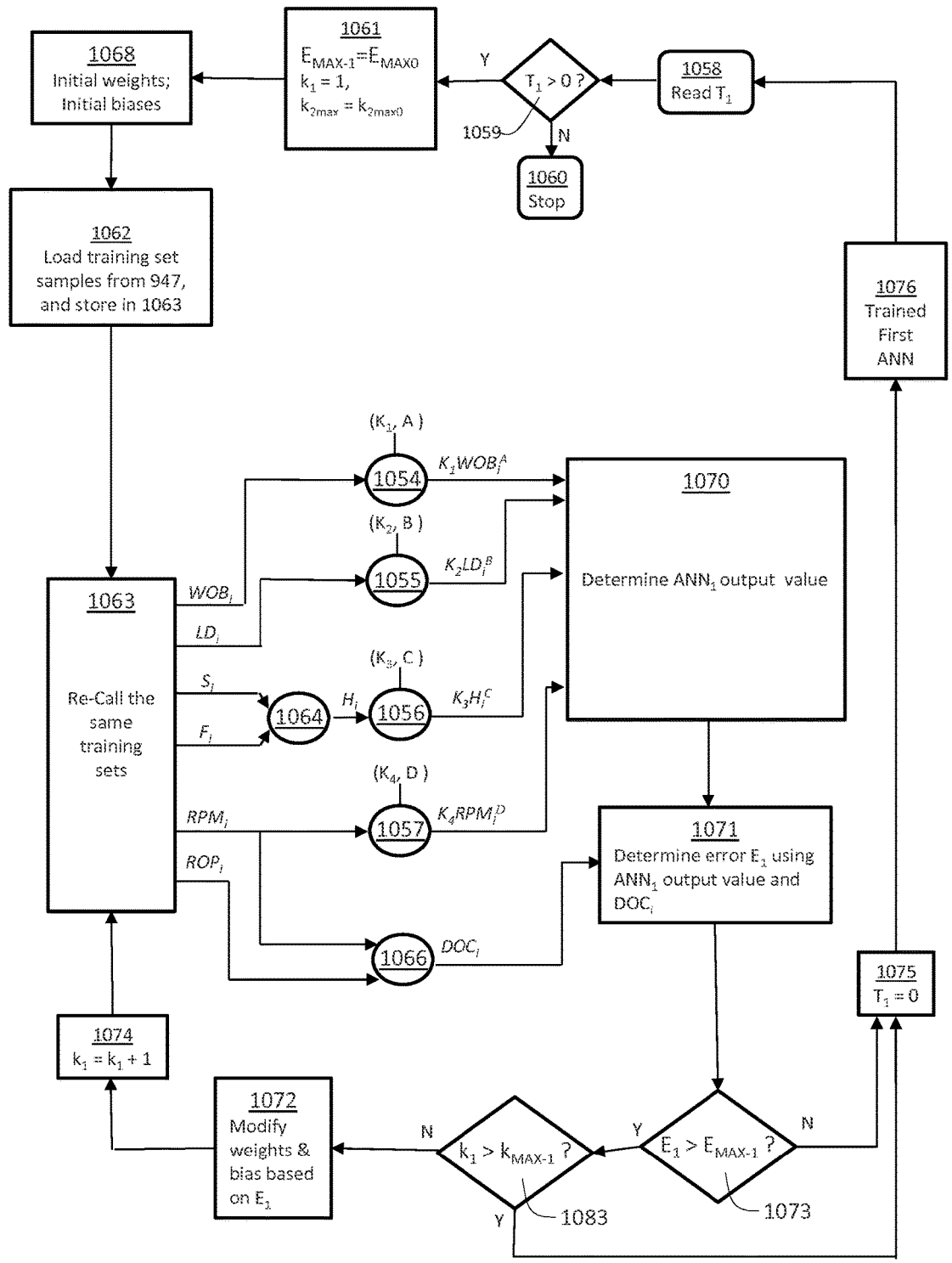
FIG. 10 illustrates a generalized block diagram illustrating training of a first ANN.

Specific Operations for $ANN_1$ Training:

As discussed, a first ANN is trained using the plurality of filled data rows to generate ANN1 training input vectors comprising at least ($K_1 WOB^A$, $K_2 LD^B$, $K_3 H^C$, $K_4 RPM^D$) and a target DOC, where DOC is equal to ROP divided by RPM. At the conclusion of the training, the trained first ANN may receive an input vector comprising at least ($K_1 WOB^A$, $K_2 LD^B$, $K_3 H^C$, $K_4 RPM^D$) and map that input vector to a specific output DOC. An embodiment of the process by which the first ANN is trained is illustrated at FIG. 10. At FIG. 10, the first ANN for which training is conducted comprises 4 input nodes in an input layer, at least one hidden layer, and a single output neuron. In an embodiment, the first ANN is a 4-2-1 network, with 4 input nodes, four neurons in the input layer, two neurons in the hidden layer and one output neuron.

FIG. 10 illustrates a training process for a specific embodiment of the method disclosed. At FIG. 10, training of the first ANN commences at 1058, where a value $T_1$ is read. $T_1$ at FIG. 10 is a symbolic representation equal to either zero or some value greater than zero, and toggles between values based on whether the first ANN is trained or untrained. At FIG. 10, when the first ANN is in an untrained state, $T_1$ is greater than zero. After reading $T_1$ at 1058, the FIG. 10 process proceeds to decision point 1059. As indicated, if $T_1$ is equal to zero, indicating that the first ANN is in a trained state and is thus a trained first ANN, the FIG. 10 process halts at 1060. Alternately, if $T_1$ is greater than zero, indicating that the first ANN is in an untrained state, the FIG. 10 process proceeds to train commencing at 1061. The value of $T_1$ may be controlled by other modules within the overall process disclosed. For example, the value of $T_1$ might be controlled by 947 at FIG. 9, such that 947 at FIG. 9 sets $T_1$ greater than zero when a plurality of filled data rows has been established in the temporary storage space. Alternatively, the value of $T_1$ might be controlled within the FIG. 10 process, for example, by 1075 when a termination criterion, $E_1 < E_{MAX-1}$, is met, or by some other module in the overall process disclosed based on an alternate criterion.

As previously discussed, completion of the training process may be based on a preset maximum allowed number of training cycles, or may be based on an error or change in error generated by an error function, where the error function is dependent on a difference between a target of a training vector and output value of the first ANN when the training vector is applied. Alternatively, completion of the training process may be based on some other termination criterion. Further the termination can be determined with combination of two or more criteria, such as the satisfaction of any one of the criteria will trigger the termination action. In the embodiment represented at FIG. 10, the termination criterion is satisfied when an $E_1$ based on the target vector of sample matrix and the output value of the first ANN is less than an error maximum, termed $E_{MAX-1}$.

At 1061, in the embodiment depicted, training commences by introducing criterion for the completion of training. This is done by assigning an error $E_{MAX-1}$ to a preselected value, such as $E_{MAX01}$. The initialization at block 1061 also includes setting a variable $k_1$ equal to one and a $k_{imax}$ equals a $k_{1max0}$. The variable $k_1$ is analogous to the symbol k denoting the $k^{th}$ cycle in equations (4) and (5), the maximum number $k_{1max0}$ is the pre-chosen upper limit by which the training cycles is ordered to stop regardless of whether the error based criterion has been met or not. This safe guards the program from running endless loops in case there is something wrong with the quality of sample body used for training the ANN. At 1068 the FIG. 10 process establishes an initial set of weights and a bias for each artificial neuron of the first ANN. The initial weights and bias initially applied to a given artificial neuron may be any real number. In an embodiment, the initial set of weights and the bias for each artificial neuron in the first ANN is set equal to one.

Following establishment of the error $E_1$ and the variable $k_1$, and the initial Weights and bias, the FIG. 10 process proceeds to node 1062, and subsequently proceeds to 1063 by storing the data rows to be used as training sets.

At 1063, the FIG. 10 process executes a call to data storage 1063 and receives the filled data row from either the Data Matrix or a temporary storage space, as earlier discussed. This filled data row is a training set for the training just initiated, and will stays the same till the completion of the training, i.e. when a training criteria is met as identified at 1073. Otherwise the information flow will be kept within the inner cycle formed from 1063 to (1064, 1054-1057-1066) to 1070, 1071, 1073, 1072, 1074 back to 1063. The only chance the filled data row is to be updated is the order passing down from the outer cycle, i.e. from 1059-1061-1068-1062, and enters the inner cycle at 1063. Once it enters the inner cycles the information flow in the direction indicated by the arrows and will be kept within the inner cycle, till exit at 1073. As a result, once received from 1062, the training sets are frozen within the inner cycle, till changing notices is passed down from the outer cycle. In other words, it will stays the same regardless of the change in iteration indicator $k_1$. At 1063, the FIG. 10 process receives a $WOB_i$, a $LD_i$, an $S_i$, an $F_i$, an $RPM_i$, and an $ROP_i$, where $WOB_i$ is the WOB data point of the filled data row, $LD_i$ is the LD data point of the filled data row, $S_i$ is the S data point of the filled data row, $F_i$ is the F data point of the filled data row, $RPM_i$ is the RPM data point of the filled data row, and $ROP_i$ is the ROP data point of the filled data row, where those terms are as earlier defined.

The FIG. 10 process at 1063 sends the $WOB_i$ to operator 1054, which combines the $WOB_i$, a value $K_1$, and a value A and generates an output $K_1 WOB_i^A$, and sends the $LD_i$ to operator 1055, which combines the $LD_i$, a value $K_2$, and a value B and generates an output $K_2 LD_i^B$. The FIG. 10 process at 1063 additionally sends the $S_i$ and $F_i$ to operator 1064 which generates an output $H_i$, and operator 1064 sends the $H_i$ to operator 1056, which combines the $H_i$, a value $K_3$, and a value C and generates an output $K_3 H_i^C$. The process at 1063 additionally sends the $RPM_i$ to operator 1057, which combines the $RPM_i$, a value $K_4$, and a value D and generates an output $K_4 WOB_i^D$. The FIG. 10 process at 1063 further sends the $RPM_i$ and the $ROP_i$ to operator 1066, which generates a $DOC_i$.

In an embodiment, $K_1$, $K_2$, $K_3$, and $K_4$ are equal to one. In another embodiment, A, B, C, and D are positive or negative integers. However, as previously discussed, $K_1$, $K_2$, $K_3$, $K_4$, A, B, C, and D may be any real numbers established by any means, provided the method of establishing $K_1$, $K_2$, $K_3$, $K_4$, A, B, C, and D is consistent at each $k_1^{th}$ iteration of FIG. 10. For example, $K_1$, $K_2$, $K_3$, $K_4$, A, B, C, and D may be established as constant values where each constant value is unchanged over all $k_1$ iterations. Alternatively, $K_1$, $K_2$, $K_3$, $K_4$, A, B, C, and D may be established as real numbers arising from individual functions of other variables having a known value, such as individual data points in a filled data row or other measured parameters which arise during a drilling operation. For example, a real number $R_1$ might be determined by the individual function $f(Y_1, Y_2, Y_3)$ when the variables $Y_1$, $Y_2$, and $Y_3$ each have a known value.

At 1070, the output from operators 1054, 1055, 1056, and 1057 are each applied to an input node of the first ANN. For example, using FIG. 5, $x_1$ is established as $K_1 WOB_i^A$, $x_2$ is established as $K_2 LD_i^B$, $x_3$ is established as $K_3 H_i^C$, and $x_4$ is established as $K_4RPM_i^D$. Stated equivalently, operator 1054 applies $K_1WOB_i^A$ to an $ANN_1$ WOB neuron, operator 1055 applies $K_2LD_i^A$ to an $ANN_1$ neuron, operator 1056 applies $K_3H_i^A$ to an $ANN_1$ H neuron, and operator 1057 applies $K_4RPM_i^A$ to an $ANN_1$ RPM neuron. Concurrently, for the first iteration and with $k_1$ equal to 1, the initial set of weights and the bias for each artificial neuron in the first ANN is applied. As a result, the first ANN generates an $ANN_1$ output value at the $ANN_1$ output neuron. Subsequently, at 1071, the ANN1 output value is compared with the target $DOC_i$ of the filled data row generated by operator 1066, and the error $E_1$ is generated based on the comparison.

The FIG. 10 process subsequently proceeds to decision point 1073, where the FIG. 10 process evaluates $E_1$ against $E_{MAX-1}$. If $E_1$ exceeds $E_{MAX-1}$, the FIG. 10 process proceeds to 1072, where the FIG. 10 process evaluates the error $E_1$, and generates a modified set of weights and a modified bias for each $ANN_1$ artificial neuron and the $ANN_1$ output neuron based on the error $E_1$. The FIG. 10 process also proceeds to increment the variable $k_1$ at 1074, and returns to node 1063. At 1063, the FIG. 10 process reuses a filled data rows, thereby receiving a new $WOB_i$, $LD_i$, $S_i$, $F_i$, $RPM_i$, and $ROP_i$, and operators 1054, 1055, 1056, and 1057 apply $K_1WOB_i^A$, $K_2LD_i^B$, $K_3H_i^C$, and $K_4RPM_i^D$ to the input nodes of the first ANN. Then at 1070 the FIG. 10 process applies the modified set of weights and the modified bias to each $ANN_1$ artificial neuron and the $ANN_1$ output neuron, the ANN1 output value is compared with the target output $DOC_i$ of the same set of filled data rows generated by operator 1066, the error $E_1$ is generated and evaluated at 1073, and if $E_1$ exceeds $E_{MAX-1}$, the set of weights and the bias for each $ANN_1$ artificial neuron and the $ANN_1$ output neuron is again modified at 1072. The FIG. 10 process continues iteratively in this manner as long as the resulting $E_1$ exceeds $E_{MAX-1}$ at decision point 1073.

When the resulting $E_1$ no longer exceeds $E_{MAX-1}$, decision point 1073 directs the FIG. 10 process to 1075, where the value $T_1$ is toggled to zero to indicate that training is complete, and the first ANN is now a trained first ANN, as indicated at 1076. Similarly, when training cycle number $k_1$ no longer less than $k_{MAX-1}$, decision point 1083 also directs the process to 1075 and the information flow follows the same path to 1076. At the conclusion of the process illustrated at FIG. 10, the trained first ANN may be utilized to receive an input vector ($K_1WOB_{EQN}^A$, $K_2LD_{EQN}^B$, $K_3H_{EQN}^C$, $K_4RPM_{EQN}^D$) and map the input vector to an output $DOC_{EQN}$, as will be discussed.

As stated, at FIG. 10 the termination criterion is satisfied when either an Error based or cycle number based criterion is met. The error $E_1$ based criterion requires the value of target vector of a training sets and the output value of the first ANN being less than an error maximum, termed $E_{MAX-1}$. The cycle number based criterion requires that training continues until $k_1$ exceeds a preset maximum value of $k_1$. This is achieved with the use of an additional decision point 1083. This check point creates another exit from the inner training cycle to allow the ending of the training process even if the Error based criterion cannot be met. This is additional relief prevents endless cycling and allows the continue functioning by jumping to a new training process.

In a particular embodiment, a module such as module 1063 receives a plurality of input vectors as an input matrix from a storage space such as 947 as passed through 1062, then generates an array of WOB inputs as $K_1WOBj^A$, an array of LD inputs as $K_2LD_j^B$, an array of H inputs as $K_3H_j^C$, and an array of RPM inputs as $K_4RPM_j^D$, where the value j denotes the $j^{th}$ row number of the filled data rows in the training sample matrix. In this embodiment, a module similar to 1070 can train the first ANN by utilizing all the j-elements arrays of the WOB, LD, RPM and H input matrices within one iteration and produce an output array of $DOC_j$ having the same number of elements as the row numbers of the input matrices. 1071 may then evaluate the result of simulation based on point deviation between the ANN1 output vector and target DOC vector. Alternatively, the following equation might be used as performance evaluation index of the ANN training iteration:

$$E_1(k1) = \sum_i^j \{DOC_{i,real} - DOC_{i,predicted}\}^2$$

where $DOC_{i,predicted}$ is first ANN output, and $DOC_{i,real}$ is the target DOC directly from the stored Data rows, with both corresponding to the same data row, and with the row number goes from i=1 to j. Similarly, when the $E_1(k1)$ is greater than j times $E_{MAX-1}$ the iteration of training continues by modifying the weights and bias and training the updated ANN with the same input data matrix from the temporary storage 1063, and converting them into input arrays.

Figure 11:
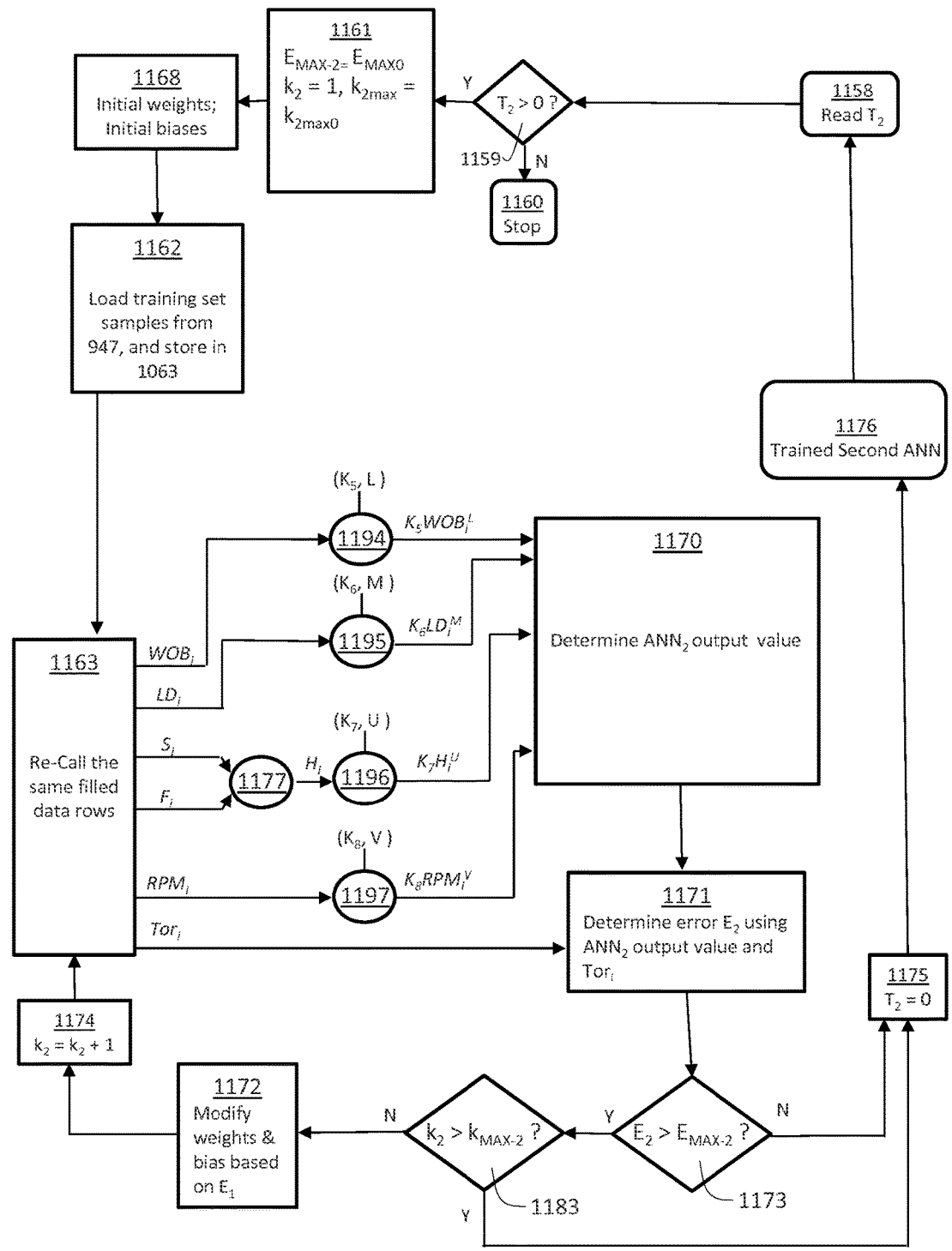
FIG. 11 illustrates a generalized block diagram illustrating training of a second ANN.
Figure 12:
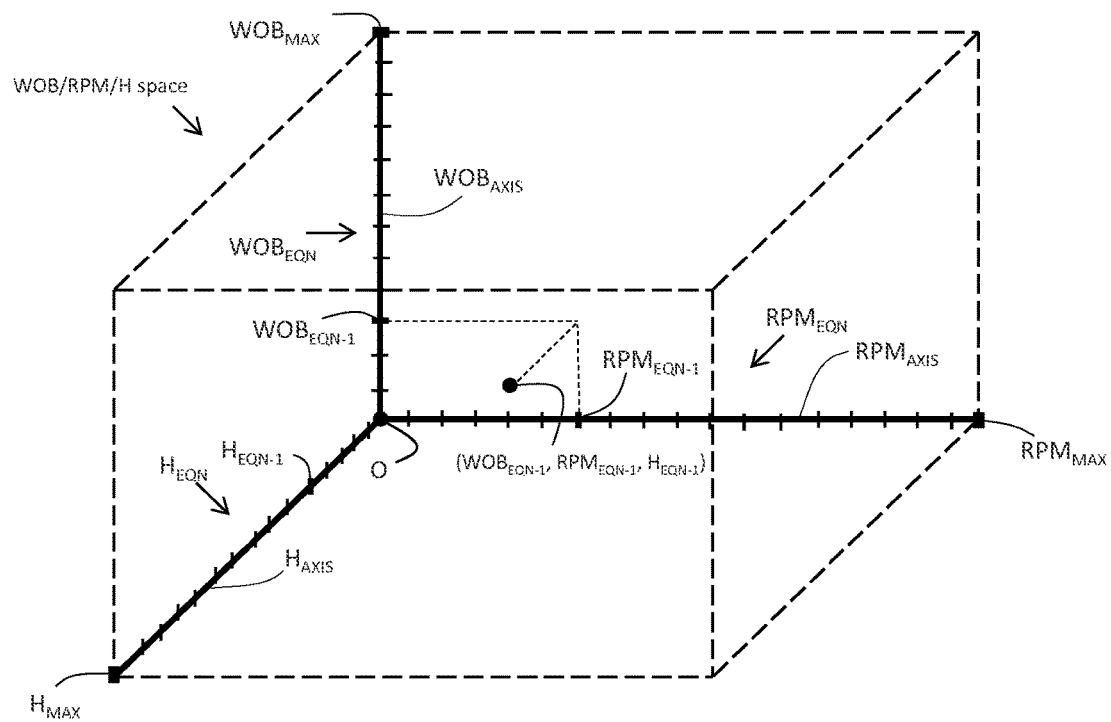
FIG. 12 illustrates a three-dimensional WOB/RPM/H space.

Specific Operations for $ANN_2$ Training:

In embodiments where a second ANN is trained, the second ANN is trained using the plurality of filled data rows to generate ANN2 training input vectors comprising at least ($K_5WOB^L$, $K_6LD^M$, $K_7H^U$, $K_8RPM^V$) and a target, Tor. The second ANN is trained in a fashion similar to the first ANN, and at the conclusion of the training, the trained second ANN may receive an input vector comprising at least ($K_5WOB^L$, $K_6LD^M$, $K_7H^U$, $K_8RPM^V$) and map that input vector to a specific Tor. An embodiment of the process by which the second ANN is trained is illustrated at FIG. 11, for a second ANN comprising 4 input nodes, at least one hidden layer, and a single output neuron.

Training of the second ANN commences at 1158 where a value $T_2$ is read. $T_2$ toggles between one and zero based on whether the second ANN is trained or untrained. After reading $T_2$ at 1158, the FIG. 11 process proceeds to decision point 1159. If $T_2$ is equal to zero the FIG. 11 process halts at 1160, and if $T_2$ is equal to one the FIG. 11 process proceeds to 1161. Similar to $T_1$, the value of $T_2$ is typically controlled by other modules within the overall process disclosed, such as 743 at FIG. 7 or at 1175 when either a cycle number based termination criterion, $k_2 > k_{MAX-2}$ or error based termination criterion, $E_2 < E_{MAX-2}$, is met.

1161 is analogous to 1061 discussed previously. At 1161, training commences by introducing criterion for the completion of training. This is done by assigning an error $E_{MAX-2}$ to a preselected value, such as $E_{MAX02}$. The initialization at block 1161 also includes setting an initial $k_2$ value equals 1 and a $k_{2max}$ equals a $k_{1max0}$. Similar to $k_1$, the variable $k_2$ at FIG. 11 is analogous to the symbol k denoting the $k^{th}$ cycle in equations (4) and (5), the maximum number is the pre-chosen upper limit by which the training cycles is ordered to stop regardless of whether the error based criterion has been met or not. Such maximum cycle number can be 100 in one embodiment. This safe guards the program from running endless loops in case there is something wrong with the quality of sample body used for training the ANN. At 1168 the FIG. 11 process establishes an initial set of weights and a bias for each artificial neuron of the second ANN. The initial weights and bias initially applied to a given artificial neuron may be any real number. In an embodiment, the initial set of weights and the bias for each artificial neuron in the first ANN is set equal to one. Following establishment of $E_2$ and $k_2$, and initial weights and bias the FIG. 11 process proceeds to node 1162, and subsequently to 1163 while filled data rows, such as those loaded from 947 is stored in 1163 as the sample body for training ANN2.

1163 is analogous to 1063 discussed previously. At 1163, the FIG. 1 process executes a call to data storage 1163 and receives the filled data row comprising a $WOB_i$, a $LD_i$, an $S_i$, an $f_i$, an RPM. Block 1163 sends the values to the operators illustrated, such that operator 1194 generates an output $K_5WOB_i^L$, operator 1195 generates an output $K_6LD_i^M$, operator 1196 receives the $S_i \times F_i$ out of operator 1177 and generates an ouput $K_7H_i^U$, and operator 1197 generates an output $K_8RPM_i^V$. Operator 1194 applies the $K_5WOB_i^L$ to an $ANN_2$ WOB neuron, operator 1195 applies the $K_6LD_i^M$ to an $ANN_2$ LD neuron, operator 1196 applies the $K_7H_i^U$ to an $ANN_2$ H neuron, and operator 1197 applies the $K_8RPM_i^V$ to an $ANN_2$ RPM neuron. 1163 additionally receives a $Tor_i$, where $Tor_i$ is the Tor data point of the $k_2^{th}$ filled data row, and communicates $Tor_i$ to 1170, as will be discussed.

In an embodiment, $K_5$, $K_6$, $K_7$, and $K_8$ are equal to one. In another embodiment, L, M, U, and V are positive or negative integers. However, $K_5$, $K_6$, $K_7$, $K_8$, L, M, U, and V may be any real numbers established by any means, provided the method of establishing $K_5$, $K_6$, $K_7$, $K_8$, L, M, U, and V is consistent at each $k_2^{th}$ iteration of FIG. 11. For example, $K_5$, $K_6$, $K_7$, $K_8$, L, M, U, and V may be established as constant values where each constant value is unchanged over all $k_2$ iterations. Alternatively, $K_5$, $K_6$, $K_7$, $K_8$, L, M, U, and V may be established as real numbers arising from individual functions of other variables having a known value, such as individual data points in a filled data row or other measured parameters which arise during a drilling operation. For example, a real number $R_2$ might be determined by the individual function $f(Y_4, Y_5, Y_6)$ when the variables $Y_4$, $Y_5$, and $Y_6$ each have a known value.

At 1170, the output from operators 1194, 1195, 1196, and 1197 are each applied to an input node of the second ANN, and the second ANN generates an $ANN_2$ output value at the $ANN_2$ output neuron. At 1171, the ANN2 output value is compared with the target values of $Tor_i$ of the filled data row supplied by 1163, the error $E_2$ is generated based on the comparison.

At decision point 1173 the FIG. 11 process evaluates $E_2$ against $E_{MAX-2}$, and if $E_2$ exceeds $E_{MAX-2}$, 1172 generates a modified set of weights and a modified bias for each $ANN_2$ neuron based on the error $E_2$, and 1174 makes an increments in the variable of $k_2$, then the process returns to node 1163 with an updated $k_2$. Then at 1163 it reuses the stored filled data row comprising $WOB_i$, $LD_i$, $S_i$, $F_i$, $RPM_i$, and $Tor_i$. Operators 1194, 1195, 1196, and 1197 apply $K_5WOB_i^L$, $K_6LD_i^M$, $K_7H_i^U$, and $K_8RPM_i^V$ to the input nodes of the second ANN, and the process to apply the modified set of weights and the modified bias to each $ANN_2$ artificial neuron. The resulting ANN2 output value is compared with the target values of $Tor_i$ of the same filled data row, the error $E_2$ is generated at 1172, and the set of weights and the bias for each $ANN_2$ artificial neuron is again modified. The FIG. 11 process continues iteratively in this manner as long as the resulting $E_2$ exceeds $E_{MAX-2}$ at decision point 1173.

When the resulting $E_2$ no longer exceeds $E_{MAX-2}$, decision point 1173 directs the process to 1175, where the value $T_2$ is toggled to zero to indicate that training is complete, and the second ANN is now a trained second ANN, as indicated at 1176. Similarly, when training cycle number $k_2$ no longer less than $k_{MAX-2}$, decision point 1183 also directs the process to 1175 and the information flow follows the same path to 1176. At the conclusion of the process illustrated at FIG. 11, the trained second ANN may be utilized to receive an input vector $(K_5WOB_{EQN}^D, K_6LD_{EQN}^E, K_7H_{EQN}^F, K_8RPM_{EQN}^J)$ and map the input vector to an output $Tor_{EQN}$, as will be discussed.

At FIG. 11 the training is terminated when either an error $E_2$ based or training cycle number based termination criterion is satisfied. The formal is based on the target of a training vector and the output value of the second ANN is less than an error maximum, termed $E_{MAX-2}$. The later is based on a maximum value of $k_2$, such that training continues until $k_2$ exceeds the maximum value of $k_2$. This is achieved with the use of an additional decision point 1183. This check point creates another exit from the inner training cycle to allow the ending of the training process even if the Error based criterion cannot be net. This is an additional relief that prevents endless cycling and allows the continue functioning by jumping to a new training process.

In a particular embodiment, a module such as module 1163 receives a plurality of input vectors as an input matrix from a storage space such as 947, then generates an array of WOB inputs as $K_5WOBj^L$, an array of LD inputs as $K_6LD_j^M$, an array of H inputs as $K_7H_j^U$, and an array of RPM inputs as $K_8RPM_j^V$, where the value j denotes the $j^{th}$ row number of the filled data rows in 947. In this embodiment, a module similar to 1170 can train the second ANN by utilizing all the j-elements arrays of the WOB, LD, RPM and H input matrices within one iteration and produce an output array of $Tor_j$ having the same number of elements as the row numbers of the input matrices. 1171 may then evaluate the result of simulation based on point deviation between the ANN2 output and target Tor. Alternatively, the following equation might be used as performance evaluation index of the ANN training iteration:

$$E_2(k2) = \sum_i^j \{Tor_{i,real} - Tor_{i,predicted}\}^2$$

Where $Tor_{i,predicted}$ is first ANN output, and $Tor_{i,real}$ is the target Tor directly from the stored Data rows, with both corresponding to the same data row, while i=1~j. Similarly, when the $E_2(k2)$ is greater than j times $E_{MAX-2}$ the iteration of training continues by loading another input matrix from the temporary storage 947, and converting them into input arrays.

Specific Operations of the $WOB_{EQN}/RPM_{EQN}/H_{EQN}$ Definition Module:

As discussed, the trained first ANN is utilized to map a $DOC_{EQN}$ and in certain embodiments the trained second ANN is utilized to map a $Tor_{EQN}$ based on probable input vectors formulated from a probable condition ($WOB_{EQN}$, $RPM_{EQN}$, $H_{EQN}$) and a specified $LD_{EQN}$. The $WOB_{EQN}$, $RPM_{EQN}$, and $H_{EQN}$ define a point in the WOB/RPM/H space, where the dimensions of the WOB/RPM/H space are based on operating data reported by the MWD system during a drilling operation, or based on operational envelope of the rig developed by rig manufacturer. Evaluation of the optimum PE parameters over the WOB/RPM/H space and for a specific $LD_{EQN}$ thus serves to identify advantageous values of at least the controllable parameters WOB and RPM as LD(t) approaches $LD_{EQN}$.

The WOB/RPM/H space is a defined space having dimensions of $(WOB_{MAX}-WOB_{MIN}) \times (RPM_{MAX}-RPM_{MIN}) \times (H_{MAX}-H_{MIN})$, where $WOB_{MAX}$, $RPM_{MAX}$, and $H_{MAX}$ may be based on the maximum values of $WOB_i, RPM_i$, and $H_i$ (where $H_i$ equals $S_i$ times $F_i$) that occur within the plurality of filled data rows, or may be set to predetermined values based on the capacity of the rig. Similarly, $WOB_{MIN}$, $RPM_{MIN}$, and $H_{MIN}$ may be based on minimum values of $WOB_i, RPM_i$, and $H_i$ within the plurality of filled data rows, or may be set to a predetermined value, such as zero. In an embodiment, $H_{MAX}$ and $H_{MIN}$ are the same value, and the WOB/RPM/H space is a two-dimensional space.

When $WOB_{MAX}$ is based on the maximum value of $WOB_i$, a $WOB_{EQN}/RPM_{EQN}/H_{EQN}$ Definition Module reviews the plurality of filled data rows from the Data Matrix or the temporary storage space as applicable, and locates a $WOB_{i-MAX}$, where $WOB_{i-MAX}$ is equal to the highest magnitude WOB data point among all $WOB_i$ in the plurality of filled data rows. $WOB_{MAX}$ is established as $WOB_{i-MAX}$ multiplied by a factor $X_{WOB-MAX}$, or $WOB_{MAX}=(WOB_{i-MAX}) \times (X_{WOB-MAX})$. Similarly, when $WOB_{MIN}$ is based on the minimum value of $WOB_i$, the $WOB_{EQN}/RPM_{EQN}/H_{EQN}$ Definition Module reviews the plurality of filled data rows from the Data Matrix or the temporary storage space as applicable, and locates a $WOB_{i-MIN}$, where $WOB_{i-MIN}$ is equal to the lowest magnitude WOB data point among all $WOB_i$ in the plurality of filled data rows. $WOB_{MIN}$ is established as $WOB_{i-MIN}$ multiplied by a factor $X_{WOB-MIN}$, or $WOB_{MIN}=(WOB_{i-MIN}) \times (X_{WOB-MIN})$. $X_{WOB-MAX}$ and $X_{WOB-MIN}$ may be any number greater than zero. Typically, $X_{WOB-MAX}$ and $X_{WOB-MIN}$ are both between 0.5 and 1.5, although this is not a requirement.

When $RPM_{MAX}$ is based on the maximum value of $RPM_i$, the $WOB_{EQN}/RPM_{EQN}/H_{EQN}$ Definition Module reviews the plurality of filled data rows from the Data Matrix or the temporary storage space as applicable, and locates a $RPM_{i-MAX}$, where $RPM_{i-MAX}$ is equal to the highest magnitude RPM data point among all $RPM_i$ in the plurality of filled data rows. $RPM_{MAX}$ is established as $RPM_{i-MAX}$ multiplied by a factor $X_{RPM-MAX}$, or $RPM_{MAX}=(RPM_{i-MAX}) \times (X_{RPM-MAX})$. Similarly, when $RPM_{MIN}$ is based on the minimum value of $RPM_i$, the $WOB_{EQN}/RPM_{EQN}/H_{EQN}$ Definition Module reviews the plurality of filled data rows from the Data Matrix or the temporary storage space as applicable, and locates a $RPM_{i-MIN}$, where $RPM_{i-MIN}$ is equal to the lowest magnitude RPM data point among all $RPM_i$ in the plurality of filled data rows. $RPM_{MIN}$ is established as $RPM_{i-MIN}$ multiplied by a factor $X_{RPM-MIN}$, or $RPM_{MIN}=(RPM_{i-MIN}) \times (X_{RPM-MIN})$. $X_{RPM-MAX}$ and $X_{RPM-MIN}$ may be any number greater than zero. Typically, $X_{RPM-MAX}$ and $X_{RPM-MIN}$ are both between 0.5 and 1.5, although this is not a requirement.

When $H_{MAX}$ is based on the maximum value of $H_i$, where the $H_i$ for a filled data row is equal to the $S_i$ for the filled data row times the $F_i$ for the filled data row, the $WOB_{EQN}/RPM_{EQN}/H_{EQN}$ Definition Module reviews the plurality of filled data rows from the Data Matrix or the temporary storage space as applicable, and locates a $H_{i-MAX}$, where $H_{i-MAX}$ is equal to the highest magnitude H among all products of $S_i$ and $F_i$ pairs in the plurality of filled data rows. $H_{MAX}$ is established as $H_{i-MAX}$ multiplied by a factor $X_{H-MAX}$, or $H_{MAX}=(H_{i-MAX}) \times (X_{H-MAX})$. Similarly, when $H_{MIN}$ is based on the minimum value of $H_i$, the $WOB_{EQN}/RPM_{EQN}/H_{EQN}$ Definition Module reviews the plurality of filled data rows from the Data Matrix or the temporary storage space as applicable, and locates a $H_{i-MIN}$, where $H_{i-MIN}$ is equal to the lowest magnitude H among all products of $S_i$ and $F_i$ pairs in the plurality of filled data rows. $H_{MIN}$ is established as $H_{i-MIN}$ multiplied by a factor $X_{H-MIN}$, or $H_{MIN}=(H_{i-MIN}) \times (X_{H-MIN})$. $X_{H-MAX}$ and $X_{H-MIN}$ may be any number greater than zero. Typically, $X_{H-MAX}$ and $X_{H-MIN}$ are both between 0.5 and 1.5, although this is not a requirement.

Alternatively, $H_{MAX}$ and $H_{MIN}$ may be established as the same value, $H_{INPUT}$, such that the WOB/RPM/H space is a two-dimensional space. The value of $H_{INPUT}$ may be an input value selected by an operator, or may be based on operating data. For example, $H_{INPUT}$ can be the value of H as the product of the S and F in the last row of the field data, or it can be an actual or estimated average value of H as the product of S and F based on the plurality of filled data rows available. Defining a value for $H_{INPUT}$ reduces the WOB/RPM/H space to a two-dimensional space over which subsequent optimization will occur, and may be desired when, for example, computational resources are limited.

In an particular embodiment, $WOB_{MAX}$ is based on the maximum value of $WOB_i$, and $WOB_{MIN}$ is set equal to zero, $RPM_{MAX}$ is based on the maximum value of $RPM_i$, and $RPM_{MIN}$ is set equal to zero, and $H_{MAX}$ is based on the maximum value of $H_i$, and $H_{MIN}$ is set equal to zero. In another embodiment, $WOB_{MAX}$, $RPM_{MAX}$ and $H_{MAX}$ are based on the designed operation envelope of the WOB, RPM and H respectively, as provided by a rig manufacturer.

Having determined a $WOB_{MAX}$ and $WOB_{MIN}$, an $RPM_{MAX}$ and $RPM_{MIN}$, and an $H_{MAX}$ and $H_{MIN}$, the $WOB_{EQN}/RPM_{EQN}/H_{EQN}$ Definition Module defines a WOB/RPM/H space having a coordinate origin at $(WOB_{MIN}, RPM_{MIN}, H_{MIN})$. In the WOB/RPM/H space, the $WOB_{EQN}/RPM_{EQN}/H_{EQN}$ Definition Module defines a WOB axis originating at the coordinate origin and extending to $WOB_{MAX}$, and divides that axis into a plurality of $WOB_{EQN}$ values. For example, at FIG. 12, a WOB axis, $WOB_{AXIS}$, intersects a plurality of $WOB_{EQN}$ values bounded by the coordinate origin O at $(WOB_{MIN}, RPM_{MIN}, H_{MIN})$ and the $WOB_{MAX}$ value $WOB_{MAX}$. Similarly, the $WOB_{EQN}/RPM_{EQN}/H_{EQN}$ Definition Module defines a RPM axis originating at the coordinate origin and extending to $RPM_{MAX}$, and divides that axis into a plurality of $RPM_{EQN}$ values. At FIG. 12, this is indicated by an RPM axis, $RPM_{AXIS}$, intersecting a plurality of $RPM_{EQN}$ values bounded by the coordinate origin O at $RPM_{MIN}$ and the $RPM_{MAX}$ value $RPM_{MAX}$. Similarly, when $H_{MAX}$ and $H_{MIN}$ are not equal to $H_{INPUT}$, the $WOB_{EQN}/RPM_{EQN}/H_{EQN}$ Definition Module defines an H axis originating at the coordinate origin and extending to $H_{MAX}$, and divides that axis into a set of $H_{EQN}$ values. At FIG. 12, this is indicated by an H axis, $H_{AXIS}$, intersecting a set of $H_{EQN}$ values by the coordinate origin O at $H_{MIN}$ and the $H_{MAX}$ value $H_{MAX}$. In this manner, the $WOB_{EQN}/RPM_{EQN}/H_{EQN}$ Definition Module establishes a WOB/RPM/H space over three dimensions defined by the axes $WOB_{AXIS}$, $RPM_{AXIS}$, and $H_{AXIS}$.

Within this disclosure, "defining a plurality of $WOB_{EQN}$ values," means defining a $WOB_{MAX}$ and a $WOB_{MIN}$ and establishing at least one $WOB_{EQN}$ value on a WOB axis from $WOB_{MIN}$ to $WOB_{MAX}$, where the WOB axis originates at $WOB_{MIN}$, and establishing the plurality of $WOB_{EQN}$ values as comprising at least $WOB_{MAX}$, $WOB_{MIN}$, and the at least one $WOB_{EQN}$ value. Similarly, "defining a plurality of $RPM_{EQN}$ values," means defining a $RPM_{MAX}$ and a $RPM_{MIN}$ and establishing at least one $RPM_{EQN}$ value on an RPM axis from $RPM_{MIN}$ to $RPM_{MAX}$, where the RPM axis originates at $RPM_{MIN}$, and where the RPM axis is orthogonal to the WOB axis, and establishing the plurality of $RPM_{EQN}$ values as comprising at least $RPM_{MAX}$, $RPM_{MIN}$, and the at least one $RPM_{EQN}$ value. Similarly, "defining a set of $H_{EQN}$ values," means defining a $H_{MAX}$ and an $H_{MIN}$ and, if $H_{MAX}$ and $H_{MIN}$ are not equal to $H_{INPUT}$, establishing at least one $H_{EQN}$ value on an H axis from $H_{MIN}$ to $H_{MAX}$, where the H axis originates at $H_{MIN}$, and where the H axis is orthogonal to the WOB axis and the RPM axis, and establishing the plurality of $H_{EQN}$ values as comprising at least $H_{MAX}$, $H_{MIN}$, and the at least one $H_{EQN}$ value, or alternatively, if $H_{MAX}$ and $H_{MIN}$ are equal to $H_{INPUT}$, establishing the set of $H_{EQN}$ values as a single element set consisting of $H_{INPUT}$.

In an embodiment, the $WOB_{EQN}/RPM_{EQN}/H_{EQN}$ Definition Module establishes a quantity of $WOB_{EQN}$ values equal to a quantity $N_{WOB}$, where $N_{WOB}$ is a positive integer greater than 1. In this embodiment, the plurality of $WOB_{EQN}$ values is a set of $WOB_{EQN}$ values of size $N_{WOB}$, where each $WOB_{EQN}$ value in the set of $WOB_{EQN}$ values is greater than or equal to the $WOB_{MIN}$ value and less than or equal to the $WOB_{MAX}$ value, and where every $WOB_{EQN}$ value in the set of $WOB_{EQN}$ values is unique, such that no two $WOB_{EQN}$ values in the set of $WOB_{EQN}$ values are equal. In a further embodiment, the $WOB_{MIN}$ value and the $WOB_{MAX}$ value are members of the set of $WOB_{EQN}$ values. In an additional embodiment, a WOB axis originates at $WOB_{MIN}$ and terminates at $WOB_{MAX}$ and intersects all $WOB_{EQN}$ values in the set of $WOB_{EQN}$ values. In an embodiment, all $WOB_{EQN}$ values are less than $WOB_{MAX}$ and greater than $WOB_{MIN}$, and the distance between each $WOB_{EQN}$ value on the WOB axis is equal to $(WOB_{MAX}-WOB_{MIN})$ divided by $(N_{WOB}+1)$. In another embodiment, all $WOB_{EQN}$ values are less than $WOB_{MAX}$ and one $WOB_{EQN}$ point is equal to $WOB_{MIN}$, and the distance between each $WOB_{EQN}$ value on the WOB axis is equal to $(WOB_{MAX}-WOB_{MIN})$ divided by $N_{WOB''}$. In a further embodiment, a single $WOB_{EQN}$ point is equal to $WOB_{MAX}$ and all $WOB_{EQN}$ points are greater than $WOB_{MIN}$, and the distance between each $WOB_{EQN}$ value on the WOB axis is equal to $(WOB_{MAX}-WOB_{MIN})$ divided by $N_{WOB'''}$. In an additional embodiment, an individual $WOB_{EQN}$ point is equal to $WOB_{MAX}$ and another $WOB_{EQN}$ point is equal to $WOB_{MIN}$, and the distance between each $WOB_{EQN}$ value on the WOB axis is equal to $(WOB_{MAX}-WOB_{MIN})$ divided by $(N_{WOB}-1)$.

Similarly in an embodiment, the $WOB_{EQN}/RPM_{EQN}/H_{EQN}$ Definition Module establishes a quantity of $RPM_{EQN}$ values equal to a quantity $N_{RPM}$, where $N_{RPM}$ is a positive integer greater than 1. In this embodiment, the plurality of $RPM_{EQN}$ values is a set of $RPM_{EQN}$ values of size $N_{RPM}$, where each $RPM_{EQN}$ value in the set of $RPM_{EQN}$ values is greater than or equal to the $RPM_{MIN}$ value and less than or equal to the $RPM_{MAX}$ value, and where every $RPM_{EQN}$ value in the set of $RPM_{EQN}$ values is unique, such that no two $RPM_{EQN}$ values in the set of $RPM_{EQN}$ values are equal. In a further embodiment, the $RPM_{MIN}$ valve and the $RPM_{MAX}$ value are members of the set of $RPM_{EQN}$ values. In an embodiment, all $RPM_{EQN}$ values are less than $RPM_{MAX}$ and greater than $RPM_{MIN}$, and the distance between each $RPM_{EQN}$ value on the RPM axis is equal to $(RPM_{MAX}-RPM_{MIN})$ divided by $(N_{RPM}+1)$. In another embodiment, all $RPM_{EQN}$ values are less than $RPM_{MAX}$ and one $RPM_{EQN}$ point is equal to $RPM_{MIN}$, and the distance between each $RPM_{EQN}$ value on the RPM axis is equal to $(RPM_{MAX}-RPM_{MIN})$ divided by $N_{RPM''}$. In a further embodiment, a single $RPM_{EQN}$ point is equal to $RPM_{MAX}$ and all $RPM_{EQN}$ points are greater than $RPM_{MIN}$, and the distance between each $RPM_{EQN}$ value on the RPM axis is equal to $(RPM_{MAX}-RPM_{MIN})$ divided by $N_{RPM'''}$. In an additional embodiment, an individual $RPM_{EQN}$ point is equal to $RPM_{MAX}$ and another $RPM_{EQN}$ point is equal to $RPM_{MIN}$, and the distance between each $RPM_{EQN}$ value on the RPM axis is equal to $(RPM_{MAX}-RPM_{MIN})$ divided by $(N_{RPM}-1)$.

Similarly in an embodiment, the $WOB_{EQN}/RPM_{EQN}/H_{EQN}$ Definition Module establishes a quantity of $H_{EQN}$ values equal to a quantity $N_H$, where $N_H$ is a positive integer greater than or equal to 1. In this embodiment, the set of $H_{EQN}$ values has a size $N_H$, and where, if $N_H$ is greater than 1, each $H_{EQN}$ value in the set of $H_{EQN}$ values is greater than or equal to the $H_{MIN}$ value and less than or equal to the $H_{MAX}$ value, and where every $H_{EQN}$ value in the set of $H_{EQN}$ values is unique, such that no two $H_{EQN}$ values in the set of $H_{EQN}$ values are equal. In a further embodiment, the $H_{MIN}$ value and the $H_{MAX}$ value are members of the set of $H_{EQN}$ values. In an additional embodiment, a H axis originates at $H_{MIN}$ and terminates at $H_{MAX}$ and intersects all $H_{EQN}$ values in the set of $H_{EQN}$ values. In an embodiment, all $H_{EQN}$ values are less than $H_{MAX}$ and greater than $H_{MIN}$, and the distance between each $H_{EQN}$ value on the H axis is equal to $(H_{MAX}-H_{MIN})$ divided by $(N_H+1)$. In another embodiment, all $H_{EQN}$ values are less than $H_{MAX}$ and one $H_{EQN}$ point is equal to $H_{MIN}$, and the distance between each $H_{EQN}$ value on the H axis is equal to $(H_{MAX}-H_{MIN})$ divided by $N_{H''}$. In a further embodiment, a single $H_{EQN}$ point is equal to $H_{MAX}$ and all $H_{EQN}$ points are greater than $H_{MIN}$, and the distance between each $H_{EQN}$ value on the H axis is equal to $(H_{MAX}-H_{MIN})$ divided by $N_{H'''}$. In an additional embodiment, an individual $H_{EQN}$ point is equal to $H_{MAX}$ and another $H_{EQN}$ point is equal to $H_{MIN}$, and the distance between each $H_{EQN}$ value on the H axis is equal to $(H_{MAX}-H_{MIN})$ divided by $(N_H-1)$. Alternately, if $N_H$ is equal to 1, the set of $H_{EQN}$ values is a single element set where the single element has a value equal to $H_{INPUT}$.

The $WOB_{EQN}/RPM_{EQN}/H_{EQN}$ Definition Module thus establishes a plurality of $(WOB_{EQN}, RPM_{EQN}, H_{EQN})$ points as a set equal to the Cartesian product $(WOB_N \times RPM_N \times H_N)$, where $WOB_N$ is a set consisting of the plurality of $WOB_{EQN}$ values, $RPM_N$ is a set consisting of the plurality of $RPM_{EQN}$ values, and $H_N$ is the set of $H_{EQN}$ values, and where the quantity of $(WOB_{EQN}, RPM_{EQN}, H_{EQN})$ points in the plurality of $(WOB_{EQN}, RPM_{EQN}, H_{EQN})$ points is equal to $N_{WOB} \times N_{RPM} \times N_H$. Here the count of $N_{WOB}$ covers all the $WOB_{EQN}$ points along the WOB axis including both $WOB_{MAX}$ and $WOB_{MIN}$; the count of $N_{RPM}$ covers all the $RPM_{EQN}$ points along the RPM axis including both $RPM_{MAX}$ and $RPM_{MIN}$, and the count of $N_H$ covers all the $H_{EQN}$ points along the H axis including both $H_{MAX}$ and $H_{MIN}$.

Having defined the plurality of $WOB_{EQN}$ values, the plurality of $RPM_{EQN}$ values, and the set of $H_{EQN}$ values, $(WOB_{EQN}, RPM_{EQN}, H_{EQN})$ points can be identified based on a $(WOB_{EQN}, RPM_{EQN}, H_{EQN})$ coordinate. For example, point $(WOB_{EQN-1}, RPM_{EQN-1}, H_{EQN-1})$ at FIG. 12.

Having defined the plurality of points $(WOB_{EQN}, RPM_{EQN}, H_{EQN})$, the $WOB_{EQN}/RPM_{EQN}/H_{EQN}$ Definition Module communicates these points to an optimum PE Module, which utilizes the plurality of points $(WOB_{EQN}, RPM_{EQN}, H_{EQN})$ and an $LD_{EQN}$ value to determine a specific PE at each $(WOB_{EQN}, RPM_{EQN}, H_{EQN})$ point, as will be discussed.

Specific Operations of the $LD_{EQN}$ Module:

An $LD_{EQN}$ module determines a quantified value of $LD_{EQN}$, where $LD_{EQN}$ reflects a value of LD(t) to be approached at a future point in time as the drilling operation continues. The $LD_{EQN}$ module may determine $LD_{EQN}$ by any means, provided that the $LD_{EQN}$ is greater than all LD data points in the plurality of filled data rows. For example, $LD_{EQN}$ may be a direct input provided by an operator. Alternately, $LD_{EQN}$ may be determined as $(LD_0+\Delta LD)$, where $LD_0$ is an LD data point from the latest filled data row, and $\Delta LD$ is a product of an input $\Delta t$ and $\overline{ROP}$, where the input $\Delta t$ is an elapsed time input by the operator and $\overline{ROP}$ is an average or weighted ROP over the plurality of filled data rows. Alternatively, the input $\Delta t$ may be based on a $\Delta t_{LOOP}$, where $\Delta t_{LOOP}$ reflects an elapsed time required for the method and apparatus to gather data, train the ANNs, evaluate the SE, and provide an output to the operator. $\overline{ROP}$ can be the average over the latest batch of received data rows, if the loop time is short, for example only a few seconds or within a minute, or it may be an average of only the latest a few rows, or even the latest row, of new batch of the received data, if the loop time is set to over a few minutes. Within this disclosure, the means in which $LD_{EQN}$ is determined is not a limitation, provided that $LD_{EQN}$ is greater than all LD data points in the plurality of filled data rows. Within this disclosure, "quantifying an $LD_{EQN}$ value" means establishing a value of $LD_{EQN}$ greater than all LD data points in the plurality of filled data rows.

Specific Operations of the Optimum PE Module:

As discussed, the Optimum PE Module receives the $LD_{EQN}$ value from $LD_{EQN}$ module, and uses the first trained ANN to map a $DOC_{EQN}$ and in certain embodiments the second trained ANN to map a $Tor_{EQN}$ for each ($WOB_{EQN}$, $RPM_{EQN}$, $H_{EQN}$) point in the WOB/RPM/H space generated by the $WOB_{EQN}$/$RPM_{EQN}$/$H_{EQN}$ Definition Module, for the received $LD_{EQN}$ value. The Optimum PE Module uses the resulting $DOC_{EQN}$ and $Tor_{EQN}$ along with the ($WOB_{EQN}$, $RPM_{EQN}$, $H_{EQN}$) point used to generate the values in order to determine at least a drilling performance evaluating parameter, for example a specific energy, SE, using a representative MSE equation or a representative DSE equation, where those terms are as earlier defined, or determine ROP by calculating the product of $DOC_{EQN}$ and $RPM_{EQN}$. As a result, the Optimum PE Module determines at least an expected PE value for each ($WOB_{EQN}$, $RPM_{EQN}$, $H_{EQN}$) point in the WOB/RPM/H space. At the conclusion of the process, the Optimum PE Module determines a ($WOB_{EQN}$, $RPM_{EQN}$, $H_{EQN}$) point producing an optimum PE parameter, where the optimum PE parameter is as earlier defined, and provides at least an optimum WOB and an optimum RPM, where the optimum WOB is equal to the $WOB_{EQN}$ of the ($WOB_{EQN}$, $RPM_{EQN}$, $H_{EQN}$) point producing the optimum PE parameter, and the optimum RPM is equal to the $RPM_{EQN}$ of the ($WOB_{EQN}$, $RPM_{EQN}$, $H_{EQN}$) point producing the optimum PE parameter. In an embodiment, the Optimum PE Module also provides an optimum H, where the optimum H is equal to the $H_{EQN}$ of the ($WOB_{EQN}$, $RPM_{EQN}$, $H_{EQN}$) point producing the optimum PE parameter. In a particular embodiment, the optimum PE parameter is an SE determined by a representative MSE equation or representative DSE equation. In another embodiment, the optimum SE parameter is a maximum ROP or ROP/SE ratio, as earlier discussed.

By providing at least the optimum WOB and the optimum RPM producing the optimum PE parameter, the process allows an operator to adjust at least the controllable parameters WOB and RPM as LD(t) approaches $LD_{EQN}$, thereby approximating operation at the optimum PE parameter. As discussed, in some embodiments, the process also provides an optimum H.

Embodiments in Which ROP is the Optimum PE Criterion

Figure 13:
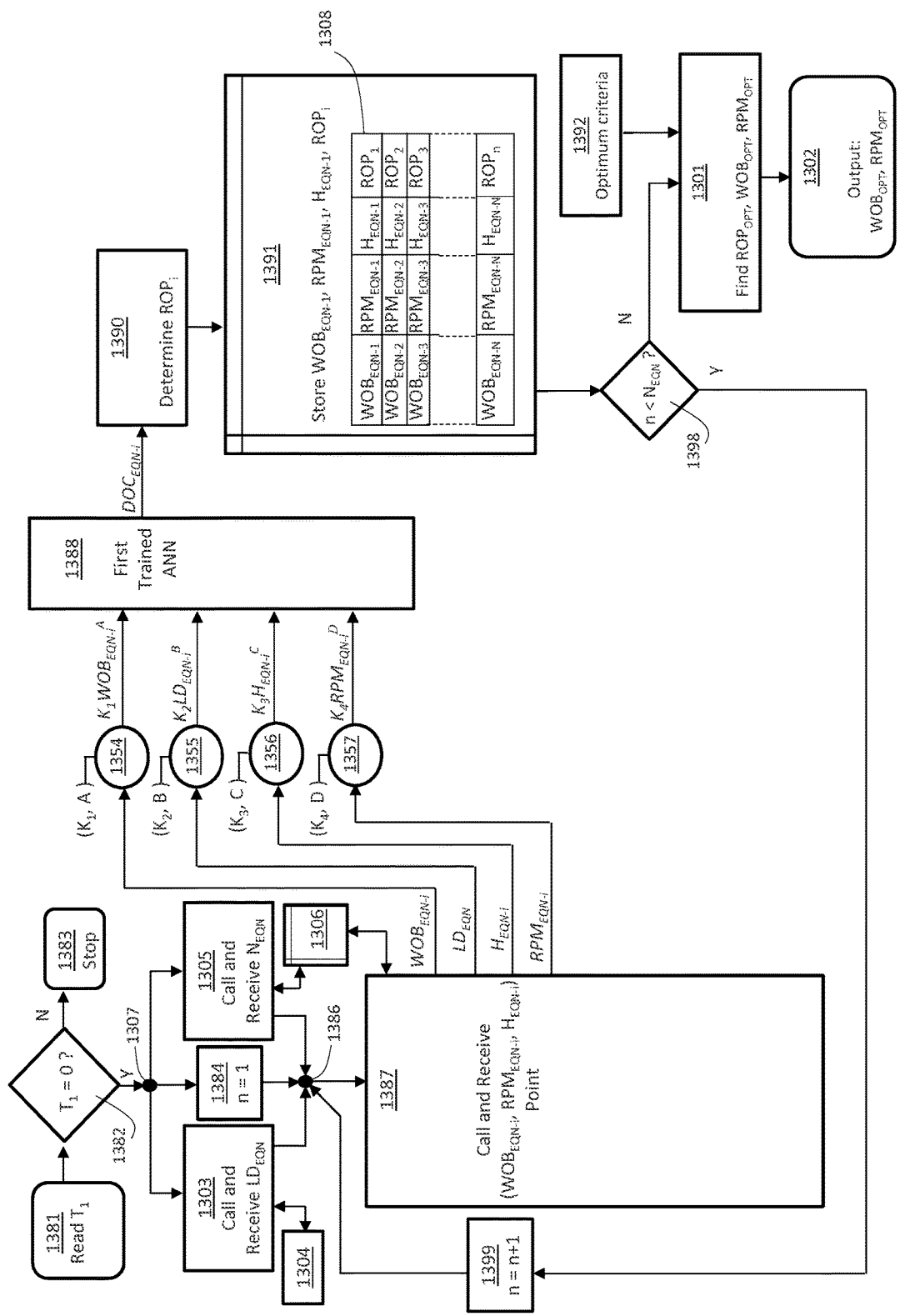
FIG. 13 illustrates a generalized block diagram for the determination of an optimum PE parameter using a first trained ANN.

An embodiment of the process by which the Optimum PE Module generates at least an optimum WOB and an optimum RPM for a given $LD_{EQN}$ value when ROP is the optimum PE parameter is illustrated at FIG. 13. As previously discussed, when ROP is the optimum PE parameter, the method utilizes a trained first ANN in order to determine a $DOC_{EQN}$, and determines an expected ROP using an ROP equation, such as equation (3).

At 1381, the process reads the value of $T_1$. If $T_1$ is equal to zero, this indicates that the first ANN is in the trained state, as previously discussed with reference to FIG. 10. At decision point 1382, if $T_1$ is not equal to zero, the FIG. 13 process stops at 1383. Alternatively, if $T_1$ is equal to zero, such that the first ANN is a trained first ANN, the FIG. 13 process proceeds to node 1307.

From node 1307, at 1303, the FIG. 13 process calls and receives an $LD_{EQN}$ value from the $LD_{EQN}$ module 1304. At 1305, the FIG. 13 process calls and receives an $N_{EQN}$ value from $WOB_{EQN}$/$RPM_{EQN}$/$H_{EQN}$ Definition Module 1306, where $N_{EQN}$ is equal to $N_{WOB} \times N_{RPM} \times N_H$ and describes the quantity of ($WOB_{EQN}$, $RPM_{EQN}$, $H_{EQN}$) points in the plurality of ($WOB_{EQN}$, $RPM_{EQN}$, $H_{EQN}$) points, including $WOB_{MAX}$, $WOB_{MIN}$, $RPM_{MAX}$, $RPM_{MIN}$, $H_{MAX}$, and $H_{MIN}$, as previously described. At 1384, the FIG. 13 process establishes a counting variable n equal to one.

1303, 1384, and 1305 proceed to node 1386, and the FIG. 13 process subsequently proceeds to 1387. At 1387, the FIG. 13 process communicates with $WOB_{EQN}$/$RPM_{EQN}$/$H_{EQN}$ Definition Module 1306, and receives a first ($WOB_{EQN}$, $RPM_{EQN}$, $H_{EQN}$) point from the plurality of ($WOB_{EQN}$, $RPM_{EQN}$, $H_{EQN}$) points, represented at FIG. 13 as ($WOB_{EQN-i}$, $RPM_{EQN-i}$, $H_{EQN-i}$). At 1387, the FIG. 13 process then provides the $WOB_{EQN-i}$, $LD_{EQN}$, $H_{EQN-i}$, and $RPM_{EQN-}$ to operators as illustrated.

Operator 1354 receives $WOB_{EQN-}$ and additionally $K_1$ and A, and generates an output equal to $K_1 WOB_{EQN-i}{}^A$. Operator 1355 receives $LD_{EQN}$ and additionally $K_2$ and B, and generates an output equal to $K_2 LD_{EQN}{}^B$. Operator 1356 receives $H_{EQN-}$ and additionally $K_3$ and C, and generates an output equal to $K_3 H_{EQN-i}{}^C$. Operator 1357 receives $RPM_{EQN-}$ and additionally $K_4$ and D, and generates an output equal to $K_4 RPM_{EQN-i}{}^D$. Here, $K_1$, $K_2$, $K_3$, $K_4$, A, B, C, and D are as earlier defined and further have values equivalent to those utilized for the first ANN training process of FIG. 10.

At 1388, operators 1354, 1355, 1356, and 1357 apply the $K_1 WOB_{EQN-i}{}^A$, the $K_2 LD_{EQN}{}^B$, the $K_3 H_{EQN-i}{}^C$, and the $K_4 RPM_{EQN-i}{}^D$ to the trained first ANN at the $ANN_1$ WOB input node, the $ANN_1$ LD input node, the $ANN_1$ H input node, and the $ANN_1$ RPM input node respectively. In response, the trained first ANN generates a $DOC_{EQN}$ value at the output of the trained first ANN, represented at FIG. 13 as $DOC_{EQN-i}$.

The FIG. 13 process sends $DOC_{EQN-i}$ to 1390, and determines an expected ROP ($ROP_i$) with a representative ROP equation using at least $DOC_{EQN-}$ and $RPM_{EQN-i}$.

At 1391, the FIG. 13 process stores at least $WOB_{EQN-i}$, $RPM_{EQN-i}$, $H_{EQN-i}$, and $ROP_i$ in an ROP data matrix, such as ROP data matrix 1308. The ROP data matrix is a two-dimensional matrix having a WOB column, a RPM column, an H column, and an ROP parameter column, as illustrated. The FIG. 13 process then proceeds to decision point 1398.

At 1398, if the counting variable n is less than $N_{EQN}$, the FIG. 13 process updates the counting variable n at 1399, and returns to node 1386, and subsequently to 1387. At 1387. The FIG. 13 process calls for and receives a second ($WOB_{EQN}$, $RPM_{EQN}$, $H_{EQN}$) point from the plurality of ($WOB_{EQN}$, $RPM_{EQN}$, $H_{EQN}$) points, and repeats the process using the second ($WOB_{EQN}$, $RPM_{EQN}$, $H_{EQN}$) point. This continues until all $N_{EQN}$ points in the plurality of ($WOB_{EQN}$, $RPM_{EQN}$, $H_{EQN}$) points has been utilized as the ($WOB_{EQN-i}$, $RPM_{EQN-i}$, $H_{EQN-i}$) point within the FIG. 13 process. Once all $N_{EQN}$ points have been utilized, the FIG. 13 process has generated a plurality of ROP values, represented at FIG. 13 within ROP data matrix 1308 as $ROP_1$, $ROP_2$, $ROP_3$, . . . , $ROP_n$.

Once all $N_{EQN}$ points in the plurality of ($WOB_{EQN}$, $RPM_{EQN}$, $H_{EQN}$) points has been utilized as the ($WOB_{EQN-i}$, $RPM_{EQN-i}$, $H_{EQN-i}$) point, such that n is equal to $N_{EQN}$ at decision point 1398, the FIG. 13 process proceeds to 1301. At 1301, the FIG. 13 process reads the optimum criterion at 1392 and examines the plurality of ROP values, and utilizes the plurality of ROP values in conjunction with the optimum criteria to determine an optimum PE parameter. For example, the optimum criterion might be MAX such that the optimum PE parameter is a maximum ROP, and 1301 determines the maximum ROP value in the plurality of ROP values. At 1301, the FIG. 13 process also determines at least an optimum WOB ($WOB_{OPT}$) and an optimum RPM ($RPM_{OPT}$), where the optimum WOB is the $WOB_{EON}$ value of the ($WOB_{EQN}$, $RPM_{EQN}$, $H_{EQN}$) point which generated the optimum PE parameter, and the optimum RPM is the $RPM_{EQN}$ value of the ($WOB_{EQN}$, $RPM_{EQN}$, $H_{EQN}$) point which generated the optimum PE parameter. The FIG. 13 process provides at least $WOB_{OPT}$ and $RPM_{OPT}$ as an output at 1302.

The FIG. 13 process thereby provides at least $WOB_{OPT}$ and $RPM_{OPT}$ producing the optimum PE parameter when the optimum PE parameter is based on ROP, such that an operator may adjust at least the controllable parameters WOB and RPM as LD(t) approaches $LD_{EQN}$, and thereby approximate operation at the optimum PE parameter.

Embodiments in Which the Optimum PE Criterion is SE, or ROP/SE

Figure 14:
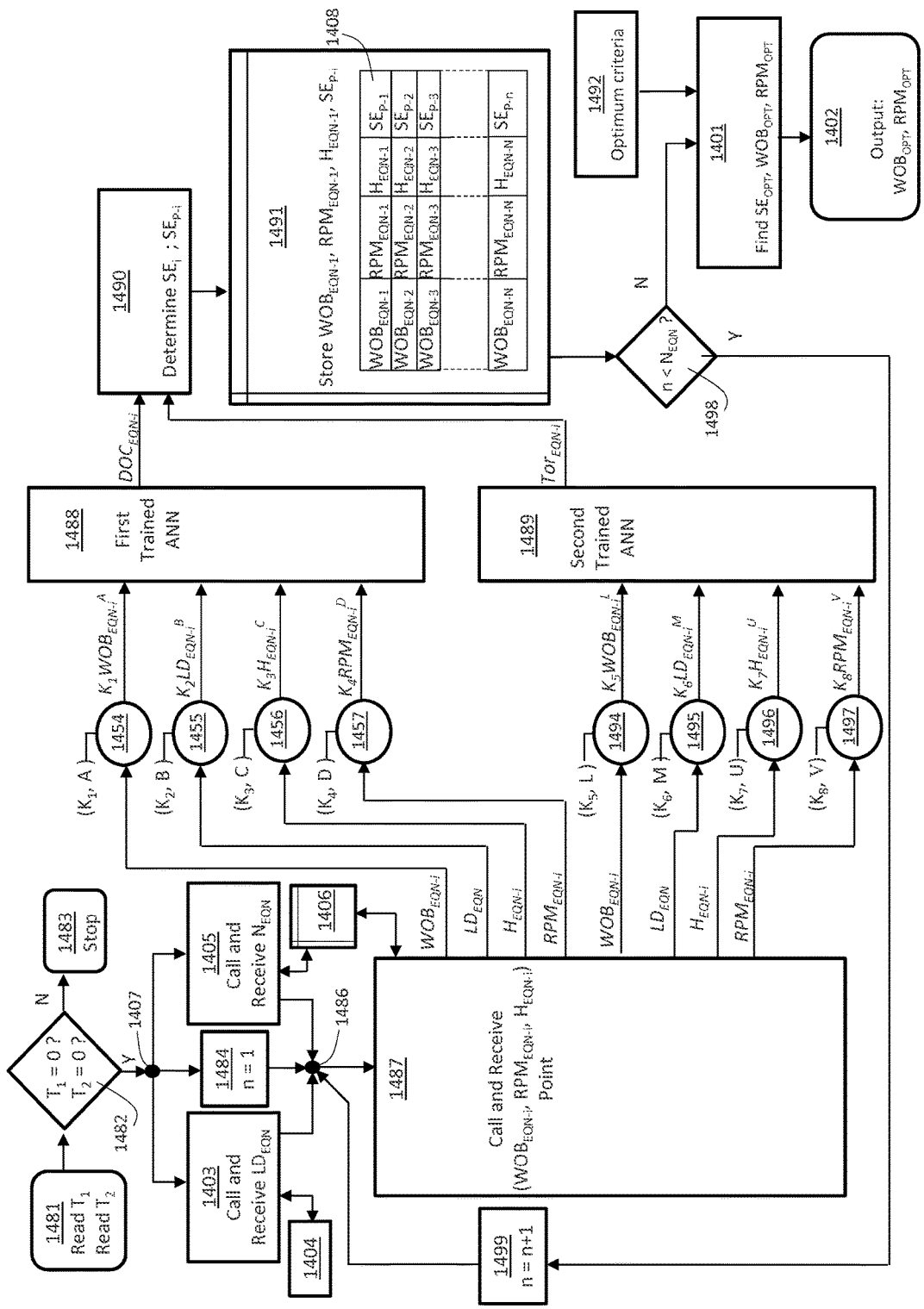
FIG. 14 illustrates a generalized block diagram for the determination of an optimum PE parameter using a first and second trained ANN.

An embodiment of the process by which the Optimum PE Module generates at least an optimum WOB and an optimum RPM for a given $LD_{EQN}$ value while the optimum PE parameter is based on SE or ROP/SE illustrated at FIG. 14. As previously discussed, when SE or ROP/SE is the optimum PE parameter, the method utilizes a trained first ANN in order to determine a $DOC_{EQN}$ and a trained second ANN in order to determine a $Tor_{EQN}$, and determines at least an expected SE and may determine an expected ROP/SE using a representative SE equation, such as equation (1) or (2).

At 1481, the process reads the values of $T_1$ and $T_2$. If $T_1$ and $T_2$ are equal to zero, this indicates that the first ANN and the second ANN are in the trained state, as previously discussed with reference to FIGS. 10 and 11. At decision point 1482, if either $T_1$ or $T_2$ or both are not equal to zero, the FIG. 14 process stops at 1483. Alternatively, if both $T_1$ and $T_2$ are equal to zero, such that the first ANN is a trained first ANN and the second ANN is a trained second ANN, the FIG. 14 process proceeds to node 1407.

From node 1407, at 1403, the FIG. 14 process calls and receives an $LD_{EQN}$ value from the $LD_{EQN}$ module 1404. At 1405, the FIG. 14 process calls and receives an $N_{EQN}$ value from $WOB_{EQN}/RPM_{EQN}/H_{EQN}$ Definition Module 1406, where $N_{EQN}$ is equal to $N_{WOB} \times N_{RPM} \times N_H$ and describes the quantity of ($WOB_{EQN}$, $RPM_{EQN}$, $H_{EQN}$) points in the plurality of ($WOB_{EQN}$, $RPM_{EQN}$, $H_{EQN}$) points, as previously described. At 1484, the FIG. 14 process establishes a counting variable n equal to one.

1403, 1484, and 1405 proceed to node 1486, and the FIG. 14 process subsequently proceeds to 1487. At 1487, the FIG. 14 process communicates with $WOB_{EQN}/RPM_{EQN}/H_{EQN}$ Definition Module 1406, and receives a first ($WOB_{EQN}$, $RPM_{EQN}$, $H_{EQN}$) point from the plurality of ($WOB_{EQN}$, $RPM_{EQN}$, $H_{EQN}$) points, represented at FIG. 14 as ($WOB_{EQN-i}$, $RPM_{EQN-i}$, $H_{EQN-i}$). At 1487, the FIG. 14 process then provides the $WOB_{EQN-i}$, $LD_{EQN}$, $H_{EQN-i}$, and $RPM_{EQN-i}$ to operators as illustrated.

Operator 1454 receives $WOB_{EQN-}$ and additionally $K_1$ and A, and generates an output equal to $K_1 WOB_{EQN-i}^A$. Operator 1455 receives $LD_{EQN}$ and additionally $K_2$ and B, and generates an output equal to $K_2 LD_{EQN}^B$. Operator 1456 receives $H_{EQN-}$ and additionally $K_3$ and C, and generates an output equal to $K_3 H_{EQN-i}^C$. Operator 1457 receives $RPM_{EQN-}$ and additionally $K_4$ and D, and generates an output equal to $K_4 RPM_{EQN-i}^D$. Here, $K_1$, $K_2$, $K_3$, $K_4$, A, B, C, and D are as earlier defined and further have values equivalent to those utilized for the first ANN training process of FIG. 1.

Similarly, Operator 1494 receives $WOB_{EQN-}$ and additionally $K_5$ and L, and generates an output equal to $K_5 WOB_{EQN-i}^L$; Operator 1495 receives $LD_{EQN}$ and additionally $K_6$ and M, and generates an output equal to $K_6 LD_{EQN}^M$; Operator 1496 receives $H_{EQN-}$ and additionally $K_7$ and U, and generates an output equal to $K_7 H_{EQN-i}^U$; and Operator 1497 receives $RPM_{EQN-}$ and additionally $K_8$ and V, and generates an output equal to $K_8 RPM_{EQN-i}^V$. Here, $K_5$, $K_6$, $K_7$, $K_8$, L, M, U, and V are as earlier defined and further have values equivalent to those utilized for the second ANN training process of FIG. 11.

At 1488, operators 1454, 1455, 1456, and 1457 apply the $K_1 WOB_{EQN-i}^A$, the $K_2 LD_{EQN}^B$, the $K_3 H_{EQN-i}^C$, and the $K_4 RPM_{EQN-i}^D$ to the trained first ANN at the $ANN_1$ WOB input node, the $ANN_1$ LD input node, the $ANN_1$ H input node, and the $ANN_1$ RPM input node respectively. In response, the trained first ANN generates a $DOC_{EQN}$ value at the output of the trained first ANN, represented at FIG. 14 as $DOC_{EQN-i}$.

Similarly, At 1489, operators 1494, 1495, 1496, and 1497 apply the $K_5 WOB_{EQN-i}^L$, the $K_6 LD_{EQN}^M$, the $K_7 H_{EQN-i}^U$, and the $K_8 RPM_{EQN-i}^V$ to the trained second ANN at the $ANN_2$ WOB input node, the $ANN_2$ LD input node, the $ANN_2$ H input node, and the $ANN_2$ RPM input node respectively. In response, the trained second ANN generates a $Tor_{EQN}$ value at the output of the trained second ANN, represented at FIG. 14 as $Tor_{EQN-i}$.

The FIG. 14 process sends $DOC_{EQN-i}$ and $Tor_{EQN-i}$ to 1490, and determines an expected SE ($SE_i$) with a representative MSE equation using at least $WOB_{EQN-i}$, $DOC_{EQN-i}$, and $Tor_{EQN-i}$, or using a representative DSE equation using at least $WOB_{EQN-i}$, $H_{EQN-i}$, $RPM_{EQN-i}$, $DOC_{EQN-i}$, and $Tor_{EQN-i}$. The FIG. 14 process at 1490 further determines a SE parameter ($SE_{P-i}$) for the first ($WOB_{EQN}$, $RPM_{EQN}$, $H_{EQN}$) point using the expected SE ($SE_i$). In an embodiment, the SE parameter is equal to the expected SE. In another embodiment, the SE parameter is equal to an $ROP_i$ divided by $SE_i$, where $ROP_i$ is equal to $DOC_{EQN-}$ multiplied by $RPM_{EQN-i}$.

At 1491, the FIG. 14 process stores at least $WOB_{EQN-i}$, $RPM_{EQN-i}$, $H_{EQN-i}$, and $SE_{P-i}$ in an SE data matrix, such as SE data matrix 1408. The SE data matrix is a two-dimensional matrix having a WOB column, a RPM column, an H column, and an SE parameter column, as illustrated. The FIG. 14 process then proceeds to decision point 1498.

At 1498, if the counting variable n is less than $N_{EQN}$, the FIG. 14 process updates the counting variable n at 1499, and returns to node 1486, and subsequently to 1487. At 1487. The FIG. 14 process calls for and receives a second ($WOB_{EQN}$, $RPM_{EQN}$, $H_{EQN}$) point from the plurality of ($WOB_{EQN}$, $RPM_{EQN}$, $H_{EQN}$) points, and repeats the process using the second ($WOB_{EQN}$, $RPM_{EQN}$, $H_{EQN}$) point. This continues until all $N_{EQN}$ points in the plurality of ($WOB_{EQN}$, $RPM_{EQN}$, $H_{EQN}$) points has been utilized as the ($WOB_{EQN-i}$, $RPM_{EQN-i}$, $H_{EQN-i}$) point within the FIG. 14 process. Once all $N_{EQN}$ points have been utilized, the FIG. 14 process has generated a plurality of SE values, represented at FIG. 14 within SE data matrix 1408 as $SE_{P-1}$, $SE_{P-2}$, $SE_{P-3}$, . . . , $SE_{P-n}$.

Once all $N_{EQN}$ points in the plurality of ($WOB_{EQN}$, $RPM_{EQN}$, $H_{EQN}$) points has been utilized as the ($WOB_{EQN-i}$, $RPM_{EQN-i}$, $H_{EQN-i}$) point, such that n is equal to $N_{EQN}$ at decision point 1498, the FIG. 14 process proceeds to 1401. At 1401, the FIG. 14 process reads the optimum criterion at 1492 and examines the plurality of SE values, and utilizes the plurality of SE values in conjunction with the optimum criteria to determine an optimum PE parameter, where the optimum PE parameter is based on SE or ROP/SE, as previously discussed. At 1401, the FIG. 14 process also determines at least an optimum WOB ($WOB_{OPT}$) and an optimum RPM ($RPM_{OPT}$), where the optimum WOB is the $WOB_{EQN}$ value of the ($WOB_{EQN}$, $RPM_{EQN}$, $H_{EQN}$) point which generated the optimum PE parameter, and the optimum RPM is the $RPM_{EQN}$ value of the ($WOB_{EQN}$, $RPM_{EQN}$, $H_{EQN}$) point which generated the optimum PE parameter. The FIG. 14 process provides at least $WOB_{OPT}$ and $RPM_{OPT}$ as an output at 1402.

The FIG. 14 process thereby provides at least $WOB_{OPT}$ and $RPM_{OPT}$ producing the optimum PE parameter, such that an operator may adjust at least the controllable parameters WOB and RPM as LD(t) approaches $LD_{EQN}$, and thereby approximate operation at the optimum SE parameter.

In an embodiment, the optimum PE parameter for a given ($WOB_{EQN-i}$, $RPM_{EQN-i}$, $H_{EQN-i}$) point is an expected SE ($SE_i$) value, and the optimum criterion is equal to minimum, so that FIG. 14 at 1401 examines the plurality of SE values and determines the optimum PE parameter as the lowest magnitude SE value in the plurality of SE values. In another embodiment where the optimum PE parameter is equal to a $ROP_i$ divided by $SE_i$, the optimum criterion is equal to maxium so that FIG. 14 at 1401 examines the plurality of SE values and determines the optimum PE parameter as the maximum $ROP_i$ divided by $SE_i$.

Additional Discussion of Data Status:

A data status is a measure of the collective effect of changes in critical drilling parameters on the relationship between PE and controllable drilling parameters. The critical drilling parameters are any parameters that are not listed as a controllable drilling parameter (WOB, RPM, H and LD) but could impose significant impact on the value of a PE even if the controllables stay unchanged. Critical drilling parameters include but may not limited to the wear or damage status of drill bit, the mechanical strength of formation, the type of drilling fluid, temperature and pressure at the bottom of the hole, etc. The strength of these critical parameters vary as a function of time, and therefore as a function of LD, can be in a relatively steady state (i.e., either stays unchanged or changes at a mild slope) or underdoing a transit phase where frequent abrupt changes occur.

A drilling process with most of the critical parameters staying in a steady state often yields a relatively more consistent and therefore more predictable controllables~PE relationship. An abrupt change in critical parameters always comes with the occurrence of unexpected events, such as breakage of the bit, running into a formation of large differences in mechanical properties, or the blow out of formation fluid or sudden loss of circulation fluid etc. The behavior of controllables~PE relationship always bears conflicting features with those represented by a data set collected prior to the occurrence of these abrupt changes.

The method presented here is designed to deal with both the steady state and abrupt transit phases. For drilling within a steady state, historic database consisting of received data rows accumulated since the beginning of the current steady state may be used to establish and/or continue modifying/updating a model by which the behavior of any PE parameters is predicted based on values of controllables received.

When the prediction error of the method becomes greater than accepted range, it is believed that abrupt changes in critical drilling parameters (bit status, formation type, drilling fluid type, kick or fluid loss etc.) have occurred as it gives rise to a new trend of controllables~PE relationship. This new trend is different from what is represented by the ANN model(s) trained with the data set, resulting in outdated predictions. With this realization, the method may clear those data rows and start a new accumulation of data rows with the latest received rows representing the new status following the abrupt changes. The new accumulation will continue until the next abrupt change arrives, bringing about another transition process that requires another data purging.

There are cases when an abrupt change is obvious to the driller. These include intentionally changing the bit and drilling fluid. In dealing with this situation, the method also provides the driller with access to make a proper indication to the method and apparatus, which can then clear the existing data rows and start the collection of new data rows. This is accomplished by providing an input button on a control panel of the apparatus to the driller. However, even if the driller fails to indicate the man-made changing factors of potential abrupt impacts, the method should still be able to recognize the impact if the magnitude of the changes is significant enough.

There are cases which cause gradual but steady change and lead to eventually significant shift in terms of the Controllables~PE relationships. In other words, a macroscopically steady process consisting of numerous microscopic abrupt changes. The provided method treat such gradual shifts as a process of steady state, and is able to mimic the above process by establishing a smoothed trend of process for prediction needs.

The prediction error used to distinguish whether a change is abrupt or within the limit of a steady state process is defined via the use of the point average deviation of a selected PE between its predicted and real values for the same set input controllable parameters, WOB, RPM, H and LD. The predicted values of the PE are determined with ANN models trained in the latest loop, which have not yet included the currently received batch of data rows. Instead, these currently received batch of data rows are used as the input to the trained ANN to give the values of intermediate parameters, DOC and Tor respectively, which in turn are used to determine the predicted value of a PE for each row of the controllables currently received. On the other hand, the values of dependent parameters, Tor and ROP, currently received that have never been used previously for ANN training, are used to calculate the value of a selected PE parameter, and the result is considered as the real PE value and used as reference in determining the point average deviation. The point average deviation between a predicted and real PE is calculated as:

$$\epsilon_{PE} = \frac{\sqrt{\sum_{i=1}^{N}((PE_i^p - PE_i^r)/PE_i^r)^2}}{N}$$

While, N is the number of rows received from the current batch, $PE_i^p$ and $PE_i^r$ are the predicted and real value of PE for i-th data row respectively, and PE is a general name for performance evaluating parameters including MSE, DSE, ROP and the ratio of ROP to either MSE or DSE.

The method also requires keeping the length of data rows below an upper limit. This is to ensure that the simulation computer turns out result prompt enough. The value of the upper limit depends on the capacity of the computer. For computer with CPU E5-2630 0 @2.3 GHz and 32 GB memory, an up limit of 250 row can guarantee a loop time of about 5 seconds. Excess rows from among the chronologically oldest are to be removed after the latest batch of data rows is added.

The number of rows within each batch of data sampling, $I_o$, is smaller than the length of the upper limit. Ideally it should be about 1/10 of the upper limit of stored data rows. If greater numbers of rows are available, the stored data table may be trimmed down to the size of $I_o$. One of the trimming down methods is simply to keep only the latest $I_o$ rows. The other method is to divide the total available rows into several groups of approximately same size with each group consisting of data rows occurring at tines closest to each other, and using the average value of each parameter within the group instead of the value of a parameter in a single row to feed the method. The second method is preferred for generating more representative data rows.

In an embodiment, data rows from a current batch can be used to form the input vector as $WOB_{real}$, $RPM_{real}$, $H_{real}$ and $LD_{real}$ and the trained ANN1 and trained ANN2 from the last loop may be utilized to map a quantified DOC, $DOC_{predict}$ and a quantified Tor, $Tor_{predict}$ respectively. The same input vector as $WOB_{real}$, $RPM_{real}$, $H_{real}$ and $LD_{real}$ is also used to determine a $DOC_{real}$ and a $Tor_{real}$, where the $Tor_{real}$ is the value of Tor from the same row where the corresponding value of controllable parameters, $WOB_{real}$, $RPM_{real}$, $H_{real}$ and $LD_{real}$ are located, and the $DOC_{real}$ is calculated as the ratio of $ROP_{real}$ divided by $RPM_{real}$, where $ROP_{real}$ is the value of ROP from the same row where $WOB_{real}$, $RPM_{real}$, $H_{real}$ and $LD_{real}$ are located. The real and predicted DOC and Tor thus obtained are compared to determine the magnitude of error in DOC and Tor predictions respectively, as an indication to determine if the ANN1 and ANN2 trained in the last loop is still valid in predicting the intermediate variables DOC and Tor within an acceptable range of error. If either of the errors appears to be unacceptable, the current batch is considered to represent a different data status and may be discarded, and a new batch of loaded data rows will be kept for training the next set of weight and bias coefficient of the ANN1 and ANN2 networks, if the data status it represents is consistent with that represented by the next batch of data rows, and so on. The check of data status is also based on direct indication from controllable panel, when the operator feels the need to indicate a change in data status based his knowledge or acceptance criterion.

Additional Discussion of Partial Optimums:

In an embodiment, for a given future moment as represented by $LD_{EQN}$, the apparatus and method generates partial optimums of WOB and RPM to allow easy operator recognition of the WOB and RPM values which generate optimized PE conditions for a given value of H, termed $H_{SET}$. This allows an operator to recognize where a first value such as WOB should be maintained if a second value such as RPM is constrained, or vice-versa. The partial optimums are determined based on a sorting of the expected SE and or ROP values in the data matrix.

The value of $H_{SET}$ may be an input value selected by an operator, or may be established as equal to $H_{INPUT}$. The manner of determining the partial optimum of WOB and the partial optimum of RPM is not dependent on the value of $H_{INPUT}$, provided that the value of $H_{SET}$ is some value greater than zero and less than or equal to the H dimension of the WOB/RPM/H space. The process defines a partial optimum of WOB and/or a partial optimum of RPM by establishing a plurality of ($W_P$, $R_{MARK}$) points and a plurality of ($W_{MARK}$, $R_P$) points respectively. The plurality of ($W_P$, $R_{MARK}$) points and the plurality of ($W_{MARK}$, $R_P$) points are a subset of the plurality of ($WOB_{EQN}$, $RPM_{EQN}$, $H_{EQN}$) points, here $H_{EQN}$ for all points in both pluralities is equal to the specified value $H_{SET}$.

The partial optimum of WOB may be determined by generating the plurality of ($W_P$, $R_{MARK}$) points at the $H_{SET}$ quantity by review of a PE data matrix, where the PE data matrix is the SE data matrix or ROP data matrix discussed earlier, or an ROP/SE data matrix storing an ROP/SE value for each ($WOB_{EQN}$, $RPM_{EQN}$, $H_{EQN}$) point. The PE data matrix is thus a storage matrix where each row has a column of SE, ROP, or ROP/SE values, and at least columns for $WOB_{EQN}$, $RPM_{EQN}$, and $H_{EQN}$.

The partial optimum of WOB is determined by establishing an initial RPM marker, where the initial RPM marker is an $RPM_{EQN}$ value in the WOB/RPM/H space, and identifying a plurality of $PE_{RPM-H}$ data rows within the PE data matrix, where each $PE_{RPM-H}$ data row in the plurality of $PE_{RPM-H}$ data rows is a single row in the PE data matrix having a value in the RPM column equal to the initial RPM marker and having a value in the H column equal to $H_{SET}$. An optimum $PE_{RPM-H}$ value is then determined, where the optimum $PE_{RPM-H}$ value is the lowest value of SE, the highest ROP, or the highest ROP/SE as applicable in the plurality of $PE_{RPM-H}$ data rows. A value of $W_P$ is determined based on the value in the WOB column of the row containing the optimum $PE_{RPM-H}$ value. A ($W_P$, $R_{MARK}$) point is then generated based on the value of $W_P$, the initial RPM marker, and the value of $H_{SET}$. This operation thus determines a point in the WOB/RPM/H space where, when the $RPM_{EQN}$ value is equal to the initial RPM marker, and when the $H_{EQN}$ value is equal to $H_{SET}$, the $W_P$ value is equal to the value generating an optimum PE. This operation is repeated by designating a subsequent RPM marker, where the subsequent RPM marker is another $RPM_{EQN}$ value in the WOB/RPM/H space, and where the subsequent RPM marker has not been utilized as the initial RPM marker, setting the initial RPM marker equal to the subsequent RPM marker, and repeating the process, until all RPM markers have been utilized as the initial RPM marker. In this manner, a plurality of ($W_P$, $R_{MARK}$, $H_{SET}$) points is generated, where the plurality of ($W_P$, $R_{MARK}$, $H_{SET}$) points describes the $WOB_{EQN}$ values generating the optimum PE for a given $RPM_{EQN}$ point and $H_{SET}$ value.

Figure 15:
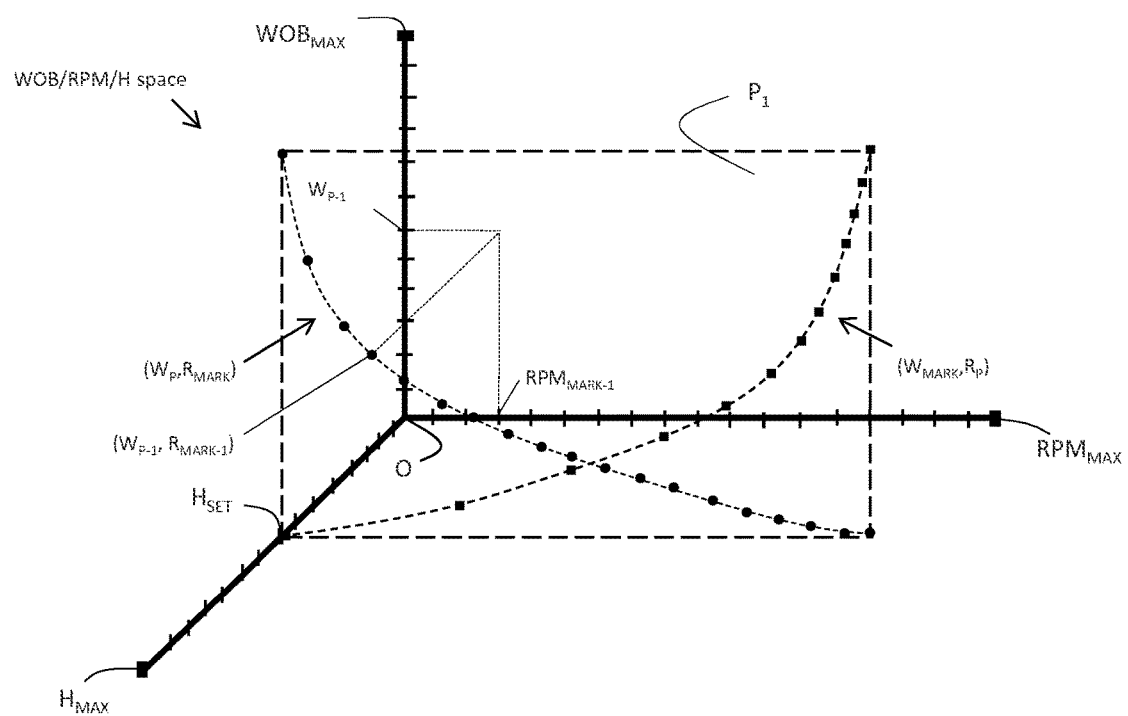
FIG. 15 illustrates partial optimums of WOB and RPM.

This result of this process is illustrated with reference to the WOB/RPM/H space of FIG. 15. As illustrated, the WOB/RPM/H space of FIG. 15 is a two-dimensional planer space $P_1$ where each ($WOB_{EQN}$, $RPM_{EQN}$, $H_{EQN}$) point has an $H_{EQN}$ value equal to $H_{SET}$. The plurality of ($W_P$, $R_{MARK}$) points is comprised of the group of ($WOB_{EQN}$, $RPM_{EQN}$, $H_{EQN}$) points where the $WOB_{EQN}$ generates the optimum PE when $RPM_{EQN}$ equals a given initial RPM marker and when $H_{EQN}$ equals $H_{SET}$. For example, when $RPM_{EQN}$ equals $RPM_{MARK-1}$, the $WOB_{EQN}$ generating the optimum PE is equal to $W_{P-1}$. As stated, the optimum PE can be, for example, the lowest SE, the maximum ROP, the maximum ROP/SE, or some other parameter.

In a further embodiment, the partial optimum of RPM is determined similarly. The process generates the plurality of ($W_{MARK}$, $R_P$) points at the $H_{SET}$ quantity by review of the PE data matrix, and the partial optimum of RPM is determined by establishing an initial WOB marker, where the initial WOB marker is a $WOB_{EQN}$ value in the WOB/RPM/H space, and identifying a plurality of $PE_{WOB-H}$ data rows within the PE data matrix, where each $PE_{WOB-H}$ data row in the plurality of $PE_{WOB-H}$ data rows is a single row in the PE data matrix having a value in the WOB column equal to the initial WOB marker and having a value in the H column equal to $H_{SET}$. An optimum $PE_{WOB-H}$ value is then determined, and a value of $R_P$ is determined based on the value in the RPM column of the row containing the optimum $PE_{WOB-H}$ value. A ($W_{MARK}$, $R_P$) point is then generated based on the initial WOB marker, value of $R_P$, and the value of $H_{SET}$. This operation thus determines a point in the WOB/RPM/H space where, when the $WOB_{EQN}$ value is equal to the initial WOB marker, and when the $H_{EQN}$ value is equal to $H_{SET}$, the $R_P$ value is equal to the value generating the optimum PE. The operation is repeated by designating a subsequent WOB marker, where the subsequent WOB marker is another $WOB_{EQN}$ value in the WOB/RPM/H space, and where the subsequent WOB marker has not been utilized as the initial WOB marker, setting the initial WOB marker equal to the subsequent WOB marker, and repeating the process, until all WOB markers have been utilized as the initial WOB marker. In this manner, a plurality of ($W_{MARK}$, $R_P$, $H_{SET}$) points is generated, where the plurality of ($W_{MARK}$, $R_P$, $H_{SET}$) points describes the $RPM_{EQN}$ values generating the optimum PE for a given $WOB_{EQN}$ point and $H_{SET}$ value.

The result of this process is also illustrated at FIG. 15, where the plurality of ($W_{MARK}$, $R_P$) points is comprised of the group of ($WOB_{EQN}$, $RPM_{EQN}$, $H_{EQN}$) points where the $RPM_{EQN}$ generates the optimized value of PE when $WOB_{EQN}$ equals a given initial WOB marker and when $H_{EQN}$ equals $H_{SET}$.

Figure 16:
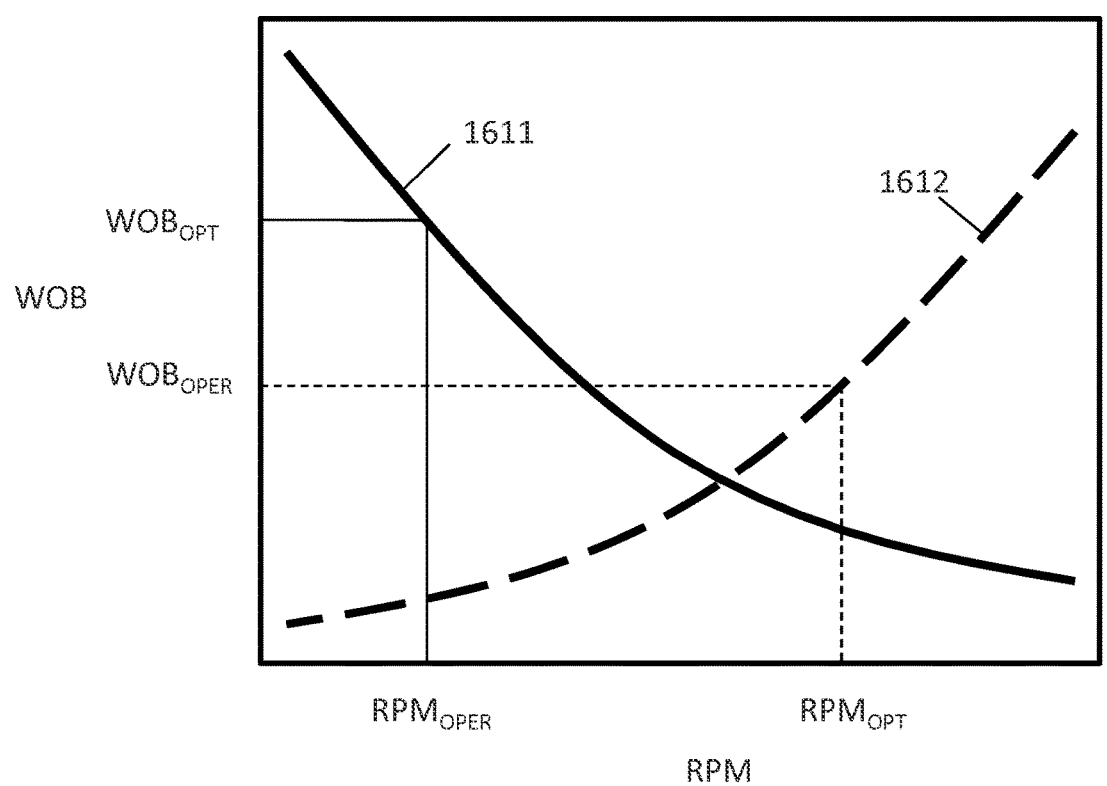
FIG. 16 illustrates the output of a specific embodiment.

The plurality of ($W_P$, $R_{MARK}$, $H_{SET}$) points and the plurality ($W_{MARK}$, $R_P$, $H_{SET}$) points may be displayed on a two-dimensional screen having a WOB axis and an RPM axis, as illustrated at FIG. 16, where curve 1612 illustrates a partial optimum of RPM and curve 1611 illustrates a partial optimum of WOB. Typically the plurality of ($W_P$, $R_{MARK}$) points at the $H_{SET}$ quantity is displayed by generating a first mathematical function which describes all ($W_P$, $R_{MARK}$, $H_{SET}$) points in the plurality, and displaying the first mathematical function. Similarly, the plurality of ($W_{MARK}$, $R_P$, $H_{SET}$) points typically is displayed by generating a second mathematical function which describes all ($W_{MARK}$, $R_P$, $H_{SET}$) points in the plurality, and displaying the second mathematical function. The first and second mathematical functions may be piecewise mathematical functions, and may be comprised of functions having any order.

A display illustrating the partial optimum of RPM and the partial optimum of WOB in a manner similar to FIG. 16 allows an operator to determine WOB and RPM combinations which generate optimum PE conditions, and subsequently control the WOB and RPM parameters in the drilling system accordingly. For example, if RPM is constrained to $RPM_{OPER}$, then the optimum value for WOB is $WOB_{OPT}$. Similarly, if WOB is constrained to $WOB_{OPER}$, then the optimum value for RPM is $RPM_{OPT}$.

In an embodiment a computer readable storage medium is comprised of data representing software executable by a computer, where the software include instructions for generating the plurality of expected SE, ROP, or ROP/SE values in accordance with the above discussed method. In another embodiment, the software operates on a digital computer, and an elapsed time $\Delta t_{COMP}$ is required for the digital computer to generate the plurality of expected SE, ROP, or ROP/SE values once sufficient filled data lines are available. In an embodiment, $\Delta t_{COMP}$ is less than 10 minutes, and a $\Delta t$ interval for which the plurality of expected PE values are defined is greater than or equal to $\Delta t_{COMP}$ and less than 20 minutes. This allows for an iterative type of operation where a drilling operation in progress may establish the $\Delta t$ interval approximately equal to the $\Delta t_{COMP}$ plus some time period required to adjust operating WOB, RPM, or H parameters, so that the drilling operation may be conducted using magnitudes of the controllable parameters which provide for a minimum expected SE, maximum ROP, or maximum ROP/SE based on the most recent performance of the methodology disclosed.

In another embodiment, the software operates on a digital computer, and an elapsed time $\Delta t_{LOOP}$ is required for the digital computer to generate the plurality of expected PE values once sufficient filled data lines are available. In an embodiment, loop time $\Delta t_{LOOP}$ is defined as the time interval between two posts of the optimized drilling parameters. By this definition, Loop time $\Delta t_{LOOP}$ is longer or equal to the sum of $\Delta t_{COMP}$ and $\Delta t'$, the two time intervals defined in the last paragraph. One can adjust the length of $\Delta t_{LOOP}$ by adjusting either or both $\Delta t_{COMP}$ and $\Delta t'$ in order to set a time period sufficient for the driller to catch-up and adjust the drilling parameters they wish to make adjustment to. As mentioned, in an embodiment, $\Delta t_{COMP}$ is less than 10 minutes, and a $\Delta t$ is less than 20 minutes. This allows for an iterative type of operation where a drilling operation in progress may be conducted using magnitudes of the controllable parameters which provide for a minimum expected SE, maximum ROP, or maximum ROP/SE based on the most recent performance of the methodology disclosed.

In a typical operation, the computer readable storage medium operates in conjunction with the digital computer during a drilling operation in progress, and an MWD system provides the LD signal to the LD data channel, the WOB signal to the WOB data channel, the RPM signal to the RPM data channel, the ROP signal to the ROP data channel, the Tor signal to the Tor data channel, the S signal to the S data channel, and the F signal to the F data channel. When a sufficient number of filled data lines have been generated, a $\Delta t$ interval greater than the $\Delta t_{LOOP}$ of the digital computer is read, and the method provides the plurality of expected PE values which apply following elapse of the $\Delta t$ interval, when the length drilled is substantially equal to $LD_{EQN}$. Based on the plurality of expected PE values provided, the operator may make adjustments to the controllable parameters such that the combination of WOB, RPM, and H parameters achieves a desired operating point such as the global optimum or a particular partial optimum point when the length drilled is substantially equivalent to the $LD_{EQN}$. The $\Delta t$ interval is selected such that method repeatedly determines and updates the plurality of expected PE values, so that the operator may adjust the controllable parameters with each update and sustain operation at the desired operating point.

Thus, the method disclosed receives a data stream from an MWD system and determines the response of a performance evaluating parameter (PE) relationship to variables controllable by the operator, in order to enable operation at an optimal PE parameter, such as a lowest expected SE or highest ROP or highest Rate-of-Penetration (ROP) to a SE ratio. The apparatus and method provides a display indicating the relationship of the optimal PE to the controllable parameters, based on analysis of data groups relayed by the MWD system during the drilling operation. The method continuously gathers and analyzes MWD data during the drilling operation, and allows an operator to manage the controllable parameters such that operation at the lowest SE, highest ROP, or highest ROP to SE ratio can be achieved during the drilling operation. The method offers a significant improvement to the effective use of existing MWD systems utilized in current drilling operations.

Within the claims, the method is described by steps indicated using an outline designation having a hierarchy: (1) roman numeral, e.g. "II)"; (2) capitalized letter, e.g. "C"; (3) arabic numeral, e.g. "3"; (4) lower case letter, e.g. "b"; (5) miniscule roman numeral, e.g. "iii"; (5) hyphenated miniscule roman numeral and lower case letter, e.g. "iii-g." Individual steps are labeled using a single designation in the hierarchy (1) through (6), such as the single designation "iii-g." However the step may be subsequently referred to in another step using a nested designation, such as "step II)C)3)b)iii)iii-g)." When an indicated step labeled with a single designation is later referred to with a nested designation that includes additional designators, the additional designators refer to the above hierarchy, so that for example, "Step II)C)3)b)iii)iii-g)" means the first step labeled "iii-g" following a step labeled "iii," where the step labeled "iii" is the first step labeled "iii" which follows a step labeled "b," where the step labeled "b" is the first step labeled "b" which follows a step labeled "3," where the step labeled "3" is the first step labeled "3" which follows a step labeled "C,", where the step labeled "C" is the first step labeled "C" which follows a step labeled "II."

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A system for providing an optimum performance evaluating (PE) parameter, an optimum weight-on-bit (WOB), and an optimum revolutions-per-minute (RPM) in a drilling operation comprising:
   a drilling rig generating a well bore having a well bore length and supplying a drilling fluid to the well bore, the drilling rig comprising a drill bit and generating a weight-on-bit on the drill bit, a rate of rotation of the drill bit, a rotary torque acting on the drill bit, a rate of penetration of the drill bit, a standpipe pressure of the drilling fluid and a flow rate of the drilling fluid;
   a measurement while drilling (MWD) system in data communication with the drilling rig and providing at least a length drilled (LD) signal, a WOB signal, a RPM signal, a rate of penetration (ROP) signal, a Torque (Tor) signal, a standpipe pressure (S) signal, and a drilling flow rate (F) signal, where the LD signal corresponds to the well bore length of the well bore, and where the WOB signal corresponds to the weight-on bit on the drill bit, and where the RPM signal corresponds to the rate of rotation of the drill bit, and where the ROP signal corresponds to the rate of penetration of the drill bit, and where the Tor signal corresponds to the rotary torque acting on the drill bit, and where the S signal corresponds to the standpipe pressure of the drilling fluid, and where the F signal corresponds to the flow rate of the drilling fluid, and the MWD system in data communication with an LD data channel, a WOB data channel, a RPM data channel, a Tor data channel, an S data channel, and an F data channel, and the MWD system providing the LD signal to the LD data channel, the WOB signal to the WOB data channel, the RPM signal to the RPM data channel, the ROP signal to the ROP data channel, the Tor signal to the Tor data channel, the S signal to the S data channel, and the F signal to the F data channel;
   a data processor in data communication with the LD data channel, the WOB data channel, the RPM data channel, the ROP data channel, the Tor data channel, the S data channel, the F data channel, and the output channel, where the data processor is programmed for,
      receiving the LD signal from the LD data channel, the WOB signal from the WOB data channel, the RPM signal from the RPM data channel, the ROP signal from the ROP data channel, the Tor signal from the Tor data channel, the S signal from the S data channel, and the F signal from the F data channel,
      establishing a plurality of filled data rows, where each filled data row in the plurality of filled data rows is established by,
         sampling the LD signal from the LD data channel and generating a LD data point, and sampling the WOB signal from the WOB data channel and generating a WOB data point, and sampling the RPM signal from the RPM data channel and generating a RPM data point, and sampling the ROP signal from the ROP data channel and generating a ROP data point, and sampling the Tor signal from the Tor data channel and generating a Tor data point, and sampling the S signal from the S data channel and generating an S data point, and sampling the F signal from the F data channel and generating an F data point and,
         generating a filled data row, where the filled data row comprises the LD data point, the WOB data point, the RPM data point, the ROP data point, the Tor data point, the S data point, and the F data point,
      training a first artificial neural network (ANN) to provide a value for depth of cut (DOC) using the plurality of filled data rows by providing a group of inputs and a target output to the first ANN, where the group of inputs comprises the WOB data point of a given filled data row, the LD data point of the given filled data row, a data point (H) representing the standpipe pressure (S) times the drilling flow rate (F) of the given filled data row where the where the H data point of the given filled data row is equal to the S data point of the given filled data row times the F data point of the given filled data row, and the RPM data point of the given filled data row, and where the target output comprises the ROP data point of the given filled data row divided by the RPM data point of the given filled data row, thereby generating a trained first ANN, defining a plurality of (weight-on-bit value ($WOB_{EQN}$), a revolutions-per-minute value ($RPM_{EQN}$), H value ($H_{EQN}$)) points, where each ($WOB_{EQN}$, $RPM_{EQN}$, $H_{EQN}$) point comprises a $WOB_{EQN}$ value, an $RPM_{EQN}$ value, and an $H_{EQN}$ value, quantifying a least length drilled ($LD_{EQN}$) value, generating a depth of cut equation ($DOC_{EQN}$) value for each ($WOB_{EQN}$, $RPM_{EQN}$, $H_{EQN}$) point in the plurality of ($WOB_{EQN}$, $RPM_{EQN}$, $H_{EQN}$) points by providing an input group to the trained first ANN, where the input group comprises the $WOB_{EQN}$ value of the each ($WOB_{EQN}$, $RPM_{EQN}$, $H_{EQN}$) point, the $LD_{EQN}$ value, the $H_{EQN}$ value of the each ($WOB_{EQN}$, $RPM_{EQN}$, $H_{EQN}$) point, and the $RPM_{EQN}$ value of the each ($WOB_{EQN}$, $RPM_{EQN}$, $H_{EQN}$) point, and generating a trained first ANN output and generating the $DOC_{EQN}$ value, where the $DOC_{EQN}$ value comprises the trained first ANN output, thereby generating a plurality of $DOC_{EQN}$ values, determining a plurality of PE parameters using the plurality of $DOC_{EQN}$ values and using a representative SE equation or a representative ROP equation or both, and selecting the optimum PE parameter, where the optimum PE parameter is a single PE parameter in the plurality of PE parameters, and an optimum WOB and an optimum RPM based on the optimum PE parameter, providing the optimum WOB and the optimum RPM to an output channel; and a display in data communication with the output channel and displaying the optimum WOB and the optimum RPM, thereby providing the PE parameter among other optimum controllable parameters in the drilling operation, where the first ANN comprises:

an $ANN_1$ input layer comprising an $ANN_1$ WOB input node, an $ANN_1$ LD input node, an $ANN_1$ H input node, and a $ANN_1$ RPM input node, and where the first ANN has an $ANN_1$ output layer comprising an $ANN_1$ output neuron, and where the first ANN has at least one $ANN_1$ hidden layer comprising $ANN_1$ artificial neurons, and where each $ANN_1$ artificial neuron and the $ANN_1$ output neuron has an initial set of weights and an initial bias, and where the data processor is programmed to train the first ANN using steps comprising:

setting the $ANN_1$ WOB input node equal to $K_1 WOB^A$, where $K_1$ is a real number and where $WOB^A$ is the WOB data point of the given filled data row raised to the $A^{th}$ power;

setting the $ANN_1$ LD input node equal to $K_2 LD^B$, where $K_2$ is a real number and where $LD^B$ is the LD data point of the given filled data row raised to the $B^{th}$ power;

setting the $ANN_1$ H input node equal to the $K_3 H^C$, where $K_3$ is a real number and where $H^C$ is the H data point of the given filled data row raised to the $C^{th}$ power;

setting the $ANN_1$ RPM input node equal to the $K_4 RPM^D$, where $K_4$ is a real number and where $RPM^D$ is the RPM data point of the given filled data row raised to the $D^{th}$ power;

determining an $ANN_1$ output value at the $ANN_1$ output neuron after setting the $ANN_1$ WOB input node equal to $K_1 WOB^A$, setting the $ANN_1$ LD input node equal to $K_2 LD^B$, setting the $ANN_1$ H input node equal to $K_3 H^C$, and setting the $ANN_1$ RPM input node equal to $K_4 RPM^D$;

comparing the $ANN_1$ output value and the target output and determining an error; and modifying the initial set of weights and the initial bias for each $ANN_1$ artificial neuron and the $ANN_1$ output neuron based on the error.

2. The system of claim 1 where the data processor is programmed to generate the $DOC_{EQN}$ value for the each ($WOB_{EQN}$, $RPM_{EQN}$, and $H_{EQN}$) point in the plurality of ($WOB_{EQN}$, $RPM_{EQN}$, $H_{EQN}$) points using steps comprising:

setting the $ANN_1$ WOB input node equal to $K_1 WOB_{EQN}^A$;
setting the $ANN_1$ LD input node equal to $K_2 LD_{EQN}^B$;
setting the $ANN_1$ H input node equal to $K_3 H_{EQN}^C$;
setting the $ANN_1$ RPM input node equal to $K_4 RPM_{EQN}^D$; and determining the $ANN_1$ output value at the $ANN_1$ output neuron after setting the $ANN_1$ WOB input node equal to $K_1 WOB_{EQN}^A$, setting the $ANN_1$ LD input node equal to $K_2 LD_{EQN}^B$, setting the $ANN_1$ H input node equal to $K_3 H_{EQN}^C$, and setting the $ANN_1$ RPM input node equal to $K_4 RPM_{EQN}^D$, and setting the $DOC_{EQN}$ value for the each ($WOB_{EQN}$, $RPM_{EQN}$, $H_{EQN}$) point equal to the $ANN_1$ output value, thereby generating the $DOC_{EQN}$ value for the each ($WOB_{EQN}$, $RPM_{EQN}$, $H_{EQN}$) point.

3. The system of claim 1 where the optimum PE parameter is determined using the representative ROP equation and where the data processor is further programmed to determine the optimum PE parameter, the optimum WOB, and the optimum RPM using the plurality of $DOC_{EQN}$ values by:

generating a ROP value for the each ($WOB_{EQN}$, $RPM_{EQN}$, $H_{EQN}$) point in the plurality of ($WOB_{EQN}$, $RPM_{EQN}$, $H_{EQN}$) points using at least the $DOC_{EQN}$ for the each ($WOB_{EQN}$, $RPM_{EQN}$, $H_{EQN}$) point and the $RPM_{EQN}$ of the each ($WOB_{EQN}$, $RPM_{EQN}$, $H_{EQN}$) point in the representative ROP equation, thereby generating a plurality of ROP values;

selecting an optimum ROP, where the optimum ROP is a single ROP value in the plurality of ROP values, and establishing the optimum ROP as the optimum PE parameter;

determining the optimum WOB, where the optimum WOB is the $WOB_{EQN}$ of the ($WOB_{EQN}$, $RPM_{EQN}$, $H_{EQN}$) point which generated the optimum ROP; and determining the optimum RPM, where the optimum RPM is the $RPM_{EQN}$ of the ($WOB_{EQN}$, $RPM_{EQN}$, $H_{EQN}$) point which generated the optimum ROP, thereby determining the optimum PE parameter, the optimum WOB, and the optimum RPM using the plurality of $DOC_{EQN}$ values.

4. The system of claim 1 where quantifying the $LD_{EQN}$ value further comprises reading an input $\Delta t$, where the input $\Delta t$ is an increment of time, and where the input $\Delta t$ is greater than or equal to a $\Delta t_{COMP}$ and less than 10 minutes, where the $\Delta t_{COMP}$ is a time required for the data processor to complete the receiving the LD signal, the WOB signal, the RPM signal, the ROP signal, the Tor signal, the S signal, and the F signal from the input channel step, the establishing the plurality of filled data rows step, the training the first ANN to provide the value for DOC step, the defining the plurality of ($WOB_{EQN}$, $RPM_{EQN}$, $H_{EQN}$) points step, the quantifying an $LD_{EQN}$ value step, the generating the $DOC_{EQN}$ value for the each ($WOB_{EQN}$, $RPM_{EQN}$, $H_{EQN}$) point in the plurality of ($WOB_{EQN}$, $RPM_{EQN}$, $H_{EQN}$) points step, and the determining the plurality of PE parameters using the plurality of $DOC_{EQN}$ values step.

5. The system of claim 1 where the optimum PE parameter is determined using the using the representative SE equation and where the data processor is further programmed to determine the optimum PE parameter, the optimum WOB, and the optimum RPM using a plurality of Torque values ($Tor_{EQN}$) by:
training a second ANN to provide a value for Tor using the plurality of filled data rows by providing a group of Tor inputs and a target Tor output to the second ANN, where the group of Tor inputs comprises the WOB data point of a given filled data row, the LD data point of the given filled data row, the H data point of the given filled data row where the where H data point of the given filled data row is equal to the S data point of the given filled data row times the F data point of the given filled data row, and the RPM data point of the given filled data row, and where the target Tor output comprises the Tor data point of the given filled data row, thereby generating a trained second ANN;
generating a $Tor_{EQN}$ value for the each ($WOB_{EQN}$, $RPM_{EQN}$, $H_{EQN}$) point in the plurality of ($WOB_{EQN}$, $RPM_{EQN}$, $H_{EQN}$) points by providing an input Tor group to the trained second ANN, where the input Tor group comprises the $WOB_{EQN}$ value of the each ($WOB_{EQN}$, $RPM_{EQN}$, $H_{EQN}$) point, the $LD_{EQN}$ value, the $H_{EQN}$ value of the each ($WOB_{EQN}$, $RPM_{EQN}$, $H_{EQN}$) point, and the $RPM_{EQN}$ value of the each ($WOB_{EQN}$, $RPM_{EQN}$, $H_{EQN}$) point, and generating a trained second ANN output and generating the $Tor_{EQN}$ value, where the $Tor_{EQN}$ value comprises the trained second ANN output, thereby generating a plurality of $Tor_{EQN}$ values; and
determining the plurality of PE parameters using the plurality of $DOC_{EQN}$ values and the plurality of $Tor_{EQN}$ values and using the representative SE equation.

6. The system of claim 5 where the second ANN comprises an $ANN_2$ input layer comprising an $ANN_2$ WOB input node, an $ANN_2$ LD input node, an $ANN_2$ H input node, and a $ANN_2$ RPM input node, and where the second ANN has an $ANN_2$ output layer comprising an $ANN_2$ output neuron, and where the second ANN has at least one $ANN_2$ hidden layer comprising $ANN_2$ artificial neurons, and where each $ANN_2$ artificial neuron and the $ANN_2$ output neuron has an initial $ANN_2$ set of weights and an initial $ANN_2$ bias, and where the data processor is programmed to conduct steps comprising:
training the second ANN using steps comprising,
setting the $ANN_2$ WOB input node equal to $K_5 WOB^L$, where $K_5$ is a real number and where $WOB^L$ is the WOB data point of the given filled data row raised to the $L^{th}$ power;
setting the $ANN_2$ LD input node equal to $K_6 LD^M$, where $K_6$ is a real number and where $LD^M$ is the LD data point of the third filled data row raised to the $M^{th}$ power;
setting the $ANN_2$ H input node equal to $K_7 H^U$, where $K_7$ is a real number and where H is equal to the S data point of the third filled data row times the F data point of the third filled data row, and where $H^U$ is H raised to the $U^{th}$ power,
setting the $ANN_2$ RPM input node equal to $K_8 RPM^V$, where $K_8$ is a real number and where $RPM^V$ is the RPM data point of the third filled data row raised to the $V^{th}$ power,
determining an $ANN_2$ output value at the $ANN_2$ output neuron after setting the $ANN_2$ WOB input node equal to $K_5 WOB^L$, setting the $ANN_2$ LD input node equal to $K_6 LD^M$, setting the $ANN_2$ H input node equal to $K_7 H^U$, and setting the $ANN_2$ RPM input node equal to $K_8 RPM^V$,
comparing the $ANN_2$ output value and the target Tor output and determining an $ANN_2$ error and,
modifying the initial $ANN_2$ set of weights and an initial $ANN_2$ bias for each $ANN_2$ artificial neuron and the $ANN_2$ output neuron based on the $ANN_2$ error;
generating the $Tor_{EQN}$ value for the each ($WOB_{EQN}$, $RPM_{EQN}$, $H_{EQN}$) point in the plurality of ($WOB_{EQN}$, $RPM_{EQN}$, $H_{EQN}$) points using steps comprising,
setting the $ANN_2$ WOB input node equal to $K_5 WOB_{EQN}^L$;
setting the $ANN_2$ LD input node equal to $K_6 LD_{EQN}^M$;
setting the $ANN_2$ H input node equal to $K_7 H_{EQN}^U$;
setting the $ANN_2$ RPM input node equal to $K_8 RPM_{EQN}^V$ and,
determining the $ANN_2$ output value at the $ANN_2$ output neuron after setting the $ANN_2$ WOB input node equal to $K_5 WOB_{EQN}^L$, setting the $ANN_2$ LD input node equal to $K_6 LD_{EQN}^M$, setting the $ANN_2$ H input node equal to $K_7 H_{EQN}^U$, and setting the $ANN_2$ RPM input node equal to $K_8 RPM_{EQN}^V$, and setting the $Tor_{EQN}$ value for the each ($WOB_{EQN}$, $RPM_{EQN}$, $H_{EQN}$) point equal to the $ANN_2$ output value, thereby generating the $Tor_{EQN}$ value for the each ($WOB_{EQN}$, $RPM_{EQN}$, $H_{EQN}$) point; and
determining the plurality of PE parameters using the plurality of $DOC_{EQN}$ values and the plurality of $Tor_{EQN}$ values and using the representative SE equation by generating a PE value for the each ($WOB_{EQN}$, $RPM_{EQN}$, $H_{EQN}$) point in the plurality of ($WOB_{EQN}$, $RPM_{EQN}$, $H_{EQN}$) points using at least the $DOC_{EQN}$ and the $Tor_{EQN}$ for the each ($WOB_{EQN}$, $RPM_{EQN}$, $H_{EQN}$) point in the representative SE equation, thereby generating the plurality of PE parameters; and
determining the optimum PE parameter, the optimum WOB, and the optimum RPM using steps comprising,
selecting an optimum PE value, where the optimum PE value is a single PE value in the plurality of PE parameters,
determining the optimum WOB, where the optimum WOB is the $WOB_{EQN}$ of the ($WOB_{EQN}$, $RPM_{EQN}$, $H_{EQN}$) point which generated the optimum PE value and,
determining the optimum RPM, where the optimum RPM is the $RPM_{EQN}$ of the ($WOB_{EQN}$, $RPM_{EQN}$, $H_{EQN}$) point which generated the optimum PE value, thereby determining the optimum PE parameter, the optimum WOB, and the optimum RPM using the plurality of $DOC_{EQN}$ values.

7. The system of claim 5 where quantifying the $LD_{EQN}$ value further comprises:
reading an input $\Delta t$, where the input $\Delta t$ is an increment of time, and where the input $\Delta t$ is greater than or equal to a $\Delta t_{COMP}$ and less than 10 minutes, where the $\Delta t_{COMP}$ is a time required for the data processor to complete the receiving the LD signal, the WOB signal, the RPM signal, the ROP signal, the Tor signal, the S signal, and the F signal from the input channel step, the establishing the plurality of filled data rows step, the training the first ANN to provide the value for DOC step, the defining the plurality of ($WOB_{EQN}$, $RPM_{EQN}$, $H_{EQN}$) points step, the quantifying an $LD_{EQN}$ value step, the generating the $DOC_{EQN}$ value for the each ($WOB_{EQN}$, $RPM_{EQN}$, $H_{EQN}$) point in the plurality of ($WOB_{EQN}$, $RPM_{EQN}$, $H_{EQN}$) points step, the determining the plurality of PE parameters using the plurality of $DOC_{EQN}$ values step, the training the second ANN to provide the value for Tor step, the generating the $Tor_{EQN}$ value for the each ($WOB_{EQN}$, $RPM_{EQN}$, $H_{EQN}$) point in the plurality of ($WOB_{EQN}$, $RPM_{EQN}$, $H_{EQN}$) points step, and the determining the plurality of PE parameters using the plurality of $DOC_{EQN}$ values and the plurality of $Tor_{EQN}$ values step; and quantifying the $LD_{EQN}$ value based on the input $\Delta t$.

8. A system for providing an optimum performance evaluating (PE) parameter, an optimum weight-on-bit (WOB), and an optimum revolutions-per-minute (RPM) in a drilling operation comprising:

a drilling rig generating a well bore having a well bore length and supplying a drilling fluid to the well bore, the drilling rig comprising a drill bit and generating a weight-on-bit on the drill bit, a rate of rotation of the drill bit, a rotary torque acting on the drill bit, a rate of penetration of the drill bit, a standpipe pressure of the drilling fluid and a flow rate of the drilling fluid;

a measurement while drilling (MWD) system in data communication with the drilling rig and providing at least a length drilled (LD) signal, a WOB signal, a RPM signal, a rate of penetration (ROP) signal, a torque (Tor) signal, a standpipe pressure (S) signal, and a drilling flow rate (F) signal, where the LD signal corresponds to the well bore length of the well bore, and where the WOB signal corresponds to the weight-on bit on the drill bit, and where the RPM signal corresponds to the rate of rotation of the drill bit, and where the ROP signal corresponds to the rate of penetration of the drill bit, and where the Tor signal corresponds to the rotary torque acting on the drill bit, and where the S signal corresponds to the standpipe pressure of the drilling fluid, and where the F signal corresponds to the flow rate of the drilling fluid, and the MWD system in data communication with an LD data channel, a WOB data channel, a RPM data channel, a Tor data channel, an S data channel, and an F data channel, and the MWD system providing the LD signal to the LD data channel, the WOB signal to the WOB data channel, the RPM signal to the RPM data channel, the ROP signal to the ROP data channel, the Tor signal to the Tor data channel, the S signal to the S data channel, and the F signal to the F data channel;

a data processor in data communication with the LD data channel, the WOB data channel, the RPM data channel, the ROP data channel, the Tor data channel, the S data channel, the F data channel, and the output channel, where the data processor is programmed for, I) receiving the LD signal from the LD data channel, the WOB signal from the WOB data channel, the RPM signal from the RPM data channel, the ROP signal from the ROP data channel, the Tor signal from the Tor data channel, the S signal from the S data channel, and the F signal from the F data channel, II) establishing a plurality of filled data rows by,
A) establishing a Data matrix, where the Data matrix is a two-dimensional matrix, and annotating a LD column, a WOB column, a RPM column, a ROP column, a Tor column, a S column, and an F column, where the LD column is a first column in the Data matrix, the WOB column is a second column in the Data matrix, the RPM column is a third column in the Data matrix, the ROP column is a fourth column in the Data matrix, the Tor column is a fifth column in the Data matrix, the S column is a sixth column in the Data matrix, and the F column is a seventh column in the Data matrix and,
B) generating the plurality of filled data rows in the Data matrix by,
1) setting a Data Count equal to zero;
2) sampling the LD signal from the LD data channel thereby generating a LD data point, and sampling the WOB signal from the WOB data channel thereby generating a WOB data point, and sampling the RPM signal from the RPM data channel thereby generating a RPM data point, and sampling the ROP signal from the ROP data channel thereby generating a ROP data point, and sampling the Tor signal from the Tor data channel thereby generating a Tor data point, and sampling the S signal from the S data channel thereby generating an S data point, and sampling the F signal from the F data channel thereby generating an F data point,
3) storing the LD data point in the LD column of an empty row of the Data matrix, storing the WOB data point in the WOB column of the empty row of the Data matrix, storing the RPM data point in the RPM column of the empty row of the Data matrix, storing the ROP data point in the ROP column of the empty row of the Data matrix, storing the Tor data point in the Tor column of the empty row of the Data matrix, storing the S data point in the S column of the empty row of the Data matrix, storing the F data point in the F column of the empty row of the Data matrix, thereby generating a filled data row, and increasing the Data Count by one and,
4) repeating step II)B)2) and step II)B)3) until the Data Count is at least equal to 2, thereby establishing the plurality of filled data rows;
III) training a first artificial neural network (ANN) using the plurality of filled data rows, where the first ANN has an $ANN_1$ input layer comprising an $ANN_1$ WOB input node, an $ANN_1$ LD input node, an $ANN_1$ H input node, and a $ANN_1$ RPM input node, and where the first ANN has an $ANN_1$ output layer comprising an $ANN_1$ output neuron, and where the first ANN has at least one $ANN_1$ hidden layer comprising $ANN_1$ artificial neurons, by,
A) establishing an initial set of weights and an initial bias for each $ANN_1$ hidden neuron and the $ANN_1$ output neuron, establishing an $ANN_1$ termination criteria, and selecting a first filled data row from the plurality of filled data rows,
B) setting the $ANN_1$ WOB input node equal to $K_1 WOB^A$, where $K_1$ is a real number and where $WOB^A$ is the WOB data point of the first filled data row raised to the $A^{th}$ power, C) setting the $ANN_1$ LD input node equal to $K_2LD^B$, where $K_2$ is a real number and where $LD^B$ is the LD data point of the first filled data row raised to the $B^{th}$ power, D) setting the $ANN_1$ H input node equal to $K_3H^C$, where $K_3$ is a real number and where H is equal to the S data point of the first filled data row times the F data point of the first filled data row, and where $H^C$ is H raised to the $C^{th}$ power, E) setting the $ANN_1$ RPM input node equal to $K_4RPM^D$, where $K_4$ is a real number and where $RPM^D$ is the RPM data point of the first filled data row raised to the $D^{th}$ power, F) determining a target output for the first filled data row, where the target output for the first filled data row is equal to the ROP data point of the first filled data row divided by the RPM data point of the first filled data row, G) determining an $ANN_1$ output value at the $ANN_1$ output neuron after setting the $ANN_1$ WOB input node equal to $K_1WOB^A$, setting the $ANN_1$ LD input node equal to $K_2LD^B$, setting the $ANN_1$ H input node equal to $K_3H^C$, and setting the $ANN_1$ RPM input node equal to $K_4RPM^D$, H) generating an error by comparing the $ANN_1$ output value and the target output for the first filled data row, I) modifying the initial set of weights and the initial bias for each $ANN_1$ artificial neuron based on the error and based on whether training the first ANN is a line-by-line training or a batch training, thereby generating a modified set of weights and a modified bias for the each $ANN_1$ artificial neuron, J) selecting a second filled data row from the plurality of filled data rows, where the second filled data row has not been utilized as the first filled data row, and repeating step III)B), step III)C), step III)D), step III)E), step III)F), step III)G), step III)H), and step III)I) using the second filled data row as the first filled data row, and using the modified set of weights and the modified bias for the each $ANN_1$ artificial neuron as the initial set of weights and the initial bias for the each $ANN_1$ artificial neuron, until the $ANN_1$ termination criterion is satisfied, thereby generating a trained first ANN;

IV) determining the dimensions of a WOB/RPM/H space and defining a plurality of (weight-on-bit value ($WOB_{EQN}$), revolutions-per minute value ($RPM_{EQN}$), H value ($H_{EQN}$)) points by, A) defining a $WOB_{MAX}$ value and a $WOB_{MIN}$ value in the plurality of filled data rows and defining a plurality of $WOB_{EQN}$ values, B) defining a $RPM_{MAX}$ value and a $RPM_{MIN}$ value in the plurality of filled data rows and defining a plurality of $RPM_{EQN}$ values, C) defining an $H_{MAX}$ value and an $H_{MIN}$ value in the plurality of filled data rows and defining a set of $H_{EQN}$ values, thereby determining the dimensions of the WOB/RPM/H space, D) defining the plurality of ($WOB_{EQN}$, $RPM_{EQN}$, $H_{EQN}$) points, where the plurality of ($WOB_{EQN}$, $RPM_{EQN}$, $H_{EQN}$) points is a set equal to the Cartesian product ($WOB_N \times (RPM_N \times H_N)$), where $WOB_N$ is a set consisting of the plurality of $WOB_{EQN}$ values, where $RPM_N$ is a set consisting of the plurality of $RPM_{EQN}$ values, and where $H_N$ is a set consisting of the set of $H_{EQN}$ values;

V) quantifying a least length drilled value ($LD_{EQN}$) value;

VI) generating a plurality of $DOC_{EQN}$ depth of cut equation ($DOC_{EQN}$) values by, A) selecting an first ($WOB_{EQN}$, $RPM_{EQN}$, $H_{EQN}$) point, where the first ($WOB_{EQN}$, $RPM_{EQN}$, $H_{EQN}$) point is a single point in the plurality of ($WOB_{EQN}$, $RPM_{EQN}$, $H_{EQN}$) points, B) establishing a $DOC_{EQN}$ for the first ($WOB_{EQN}$, $RPM_{EQN}$, $H_{EQN}$) point using the trained first ANN by, 1) setting the $ANN_1$ WOB input node equal to $K_1WOB_{EQN}^A$, where $WOB_{EQN}^A$ is equal to the $WOB_{EQN}$ of the first ($WOB_{EQN}$, $RPM_{EQN}$, $H_{EQN}$) point raised to the $A^{th}$ power, 2) setting the $ANN_1$ LD input node equal to $K_2LD_{EQN}^B$, where $LD_{EQN}^B$ is equal to the $LD_{EQN}$ value raised to the $B^{th}$ power, 3) setting the $ANN_1$ H input node equal to $K_3H_{EQN}^C$, where $H_{EQN}^C$ is equal to the $H_{EQN}$ of the first ($WOB_{EQN}$, $RPM_{EQN}$, $H_{EQN}$) point raised to the $C^{th}$ power, 4) setting the $ANN_1$ H input node equal to $K_4H_{EQN}^D$, where $H_{EQN}^D$ is equal to the $H_{EQN}$ of the first ($WOB_{EQN}$, $RPM_{EQN}$, $H_{EQN}$) point raised to the $D^{th}$ power, 5) determining the $ANN_1$ output value at the $ANN_1$ output neuron after setting the $ANN_1$ WOB input node equal to $K_1WOB_{EQN}^A$, setting the $ANN_1$ LD input node equal to $K_2LD_{EQN}^B$, setting the $ANN_1$ H input node equal to $K_3H_{EQN}^C$, and setting the $ANN_1$ RPM input node equal to $K_4RPM_{EQN}^D$, and setting the $DOC_{EQN}$ equal to the $ANN_1$ output value, thereby generating the $DOC_{EQN}$ for the first ($WOB_{EQN}$, $RPM_{EQN}$, $H_{EQN}$) point using the trained first ANN, C) selecting a second ($WOB_{EQN}$, $RPM_{EQN}$, $H_{EQN}$) point, where the second ($WOB_{EQN}$, $RPM_{EQN}$, $H_{EQN}$) point is another single point in the plurality of ($WOB_{EQN}$, $RPM_{EQN}$, $H_{EQN}$) points, and where the second ($WOB_{EQN}$, $RPM_{EQN}$, $H_{EQN}$) point has not been utilized as the first ($WOB_{EQN}$, $RPM_{EQN}$, $H_{EQN}$) point, and repeating step VI)B), step VI)B)1), step VI)B)2), step VI)B)3), step VI)B)4), and step VI)B)5) using the second ($WOB_{EQN}$, $RPM_{EQN}$, $H_{EQN}$) point as the first ($WOB_{EQN}$, $RPM_{EQN}$, $H_{EQN}$) point, until every ($WOB_{EQN}$, $RPM_{EQN}$, $H_{EQN}$) point in the plurality of ($WOB_{EQN}$, $RPM_{EQN}$, $H_{EQN}$) points has been utilized as the first ($WOB_{EQN}$, $RPM_{EQN}$, $H_{EQN}$) point, thereby generating the plurality of $DOC_{EQN}$ values, VII) Selecting the optimum PE parameter, where the optimum PE parameter is determined using a representative SE equation or a representative ROP equation or both, and determining the optimum PE parameter, an optimum WOB, and an optimum RPM using the plurality of $DOC_{EQN}$ values, providing the optimum WOB and the optimum RPM to an output channel; and a display in data communication with the output channel and displaying the optimum WOB and the optimum RPM, thereby providing the PE parameter among other optimum controllable parameters in the drilling operation.

9. The system of claim 8 where the optimum PE parameter is determined using the representative ROP equation and where the data processor is further programmed for:
  A) establishing a plurality of ROP values, where each ROP value in the plurality of ROP values is determined using at least the $DOC_{EQN}$ for the first ($WOB_{EQN}$, $RPM_{EQN}$, $H_{EQN}$) point and the $RPM_{EQN}$ of the first ($WOB_{EQN}$, $RPM_{EQN}$, $H_{EQN}$) point in the representative ROP equation; and
  B) providing at least the optimum WOB and the optimum RPM by,
    1) reading an optimum criterion,
    2) reviewing the plurality of ROP values and determining the optimum PE parameter based on the optimum criterion, where the optimum PE parameter is an individual ROP value in the plurality of ROP values and,
    3) determining the optimum WOB and the optimum RPM, where the optimum WOB is the $WOB_{EQN}$ of the ($WOB_{EQN}$, $RPM_{EQN}$, $H_{EQN}$) point which generated the optimum PE parameter, and where the optimum RPM is the $RPM_{EQN}$ of the ($WOB_{EQN}$, $RPM_{EQN}$, $H_{EQN}$) point which generated the optimum PE parameter, thereby determining the optimum PE parameter, the optimum WOB, and the optimum RPM using the plurality of $DOC_{EQN}$ values.

10. The system of claim 9 where the data processor is further programmed to perform the step of reading a set of H values ($H_{SET}$) quantity and determining a partial optimum of WOB by performing the steps of:
  A) establishing a ROP data matrix, where the ROP data matrix is a two-dimensional matrix, and annotating a WOB column, a RPM column, an H column, and an ROP column, where the WOB column is a first column in the ROP data matrix, and where the RPM column is a second column in the ROP data matrix, and where the H column is a third column in the ROP data matrix, and where the ROP column is a fourth column in the ROP data matrix;
  B) storing the each ROP value for the first ($WOB_{EQN}$, $RPM_{EQN}$, $H_{EQN}$) point in the ROP column of an empty row of the ROP data matrix, storing the $WOB_{EQN}$ of the first ($WOB_{EQN}$, $RPM_{EQN}$, $H_{EQN}$) point in the WOB column of the empty row of the ROP data matrix, storing the $RPM_{EQN}$ of the first ($WOB_{EQN}$, $RPM_{EQN}$, $H_{EQN}$) point in the RPM column of the empty row of the ROP data matrix, and storing the $H_{EQN}$ of the first ($WOB_{EQN}$, $RPM_{EQN}$, $H_{EQN}$) point in the H column of the empty row of the ROP data matrix, thereby generating a plurality of filled ROP data rows;
  C) generating a plurality of (value for $W_P$ ($W_P$), marker for R ($R_{MARK}$)) data points to provide the partial optimum of WOB by,
    1) establishing an initial RPM marker, where the initial RPM marker is a $RPM_{EQN}$ value in the plurality of $RPM_{EQN}$ values, and determining a $W_P$ value by
      a) identifying a plurality of $ROP_{RPM-H}$ rows and a plurality of $ROP_{RPM-H}$ parameters, where the plurality of $ROP_{RPM-H}$ rows consists of a subset of the plurality of filled ROP data rows in the ROP data matrix, and where for each $ROP_{RPM-H}$ row in the plurality of $ROP_{RPM-H}$ rows, the $RPM_{EQN}$ value stored in the RPM column of the each $ROP_{RPM-H}$ row is equal to the initial RPM marker, and the $H_{EQN}$ value stored in the H column of the each $ROP_{RPM-H}$ row is equal to the $H_{SET}$ quantity, and where the plurality of $ROP_{RPM-H}$ parameters consists of the each ROP values stored in the ROP column of the plurality of $ROP_{RPM-H}$ rows, thereby identifying the plurality of $ROP_{RPM-H}$ rows and thereby identifying the plurality of $ROP_{RPM-H}$ parameters;
      b) reviewing the plurality of $ROP_{RPM-H}$ parameters and finding an optimum $ROP_{RPM-H}$ parameter based on the optimum criterion, where the optimum $ROP_{RPM-H}$ parameter is an individual $ROP_{RPM-H}$ parameter in the plurality of $ROP_{RPM-H}$ parameters, and designating the $ROP_{RPM-H}$ row comprised of the optimum $ROP_{RPM-H}$ parameter as an optimum $ROP_{RPM-H}$ row, and locating the $W_P$ value, where the $W_P$ value is a single value stored in the WOB column of the optimum $ROP_{RPM-H}$ row;
      c) recording the $W_P$ value and the initial RPM marker as a ($W_P$, $R_{MARK}$) data point, where $W_P$ is equal to the $W_P$ value and where $R_{MARK}$ is equal to the initial RPM marker;
      d) selecting a subsequent RPM marker, where the subsequent RPM marker is another $RPM_{EQN}$ in the plurality of $RPM_{EQN}$ values, and where the subsequent RPM marker has not been utilized as the initial RPM marker in any preceding step C)1);
      e) repeating step C)1)a), step C)1)b), step C)1)c), and step C)1)d) using the subsequent RPM marker as the initial RPM marker, and continuing the repeating of step C)1)a), step C)1)b), step C)1)c), and step C)1)d) until each $RPM_{EQN}$ value in the plurality of $RPM_{EQN}$ values has been utilized as the initial RPM marker, thereby generating the plurality of ($W_P$, $R_{MARK}$) data points; and
  D) providing the plurality of ($W_P$, $R_{MARK}$) data points to the output channel, thereby determining the partial optimum of WOB.

11. The system of claim 9 where the data processor is further programmed to perform the step of reading a set of H values ($H_{SET}$) quantity and determining a partial optimum of RPM by performing the steps of:
  A) establishing a ROP data matrix, where the ROP data matrix is a two-dimensional matrix, and annotating a WOB column, a RPM column, an H column, and an ROP column, where the WOB column is a first column in the ROP data matrix, and where the RPM column is a second column in the ROP data matrix, and where the H column is a third column in the ROP data matrix, and where the ROP column is a fourth column in the ROP data matrix;
  B) storing the each ROP value for the first ($WOB_{EQN}$, $RPM_{EQN}$, $H_{EQN}$) point in the ROP column of an empty row of the ROP data matrix, storing the $WOB_{EQN}$ of the first ($WOB_{EQN}$, $RPM_{EQN}$, $H_{EQN}$) point in the WOB column of the empty row of the ROP data matrix, storing the $RPM_{EQN}$ of the first ($WOB_{EQN}$, $RPM_{EQN}$, $H_{EQN}$) point in the RPM column of the empty row of the ROP data matrix, and storing the $H_{EQN}$ of the first ($WOB_{EQN}$, $RPM_{EQN}$, $H_{EQN}$) point in the H column of the empty row of the ROP data matrix, thereby generating a plurality of filled ROP data rows;
  C) generating a plurality of (value for $W_P$ ($W_P$), marker for R ($R_{MARK}$)) data points to provide the partial optimum of WOB by, 1) establishing an initial WOB marker, where the initial WOB marker is a $WOB_{EQN}$ value in the plurality of $WOB_{EQN}$ values, and determining a $R_P$ value by,
   a) identifying a plurality of $ROP_{WOB-H}$ rows and a plurality of $ROP_{WOB-H}$ parameters, where the plurality of $ROP_{WOB-H}$ rows consists of a subset of the plurality of filled ROP data rows in the ROP data matrix, and where for each $ROP_{WOB-H}$ row in the plurality of $ROP_{WOB-H}$ rows, the $WOB_{EQN}$ value stored in the WOB column of the each $ROP_{WOB-H}$ row is equal to the initial WOB marker, and the $H_{EQN}$ value stored in the H column of the each $ROP_{WOB-H}$ row is equal to the $H_{SET}$ quantity, and where the plurality of $ROP_{WOB-H}$ parameters consists of the values stored in the ROP column of the plurality of $ROP_{WOB-H}$ rows, thereby identifying the plurality of $ROP_{WOB-H}$ rows and thereby identifying the plurality of $ROP_{WOB-H}$ parameters;
   b) reviewing the plurality of $ROP_{WOB-H}$ parameters and finding an optimum $ROP_{WOB-H}$ parameter based on the optimum criterion, where the optimum $ROP_{WOB-H}$ parameter is an individual $ROP_{WOB-H}$ parameter in the plurality of $ROP_{WOB-H}$ parameters, and designating the $ROP_{WOB-H}$ row comprised of the optimum $ROP_{WOB-H}$ parameter as an optimum $ROP_{WOB-H}$ row, and locating the $R_P$ value, where the $R_P$ value is a single value stored in the RPM column of the optimum $ROP_{WOB-H}$ row;
   c) recording the $R_P$ value and the initial WOB marker as a ($W_{MARK}$, $R_P$) data point, where $W_{MARK}$ is equal to the initial WOB marker and where $R_P$ is equal to the $R_P$ value;
   d) selecting a subsequent WOB marker, where the subsequent WOB marker is another $WOB_{EQN}$ in the plurality of $WOB_{EQN}$ values, and where the subsequent WOB marker has not been utilized as the initial WOB marker in any preceding step C)1);
   e) repeating step C)1)a), step C)1)b), step C)1)c), and step C)1)d) using the subsequent WOB marker as the initial WOB marker, and continuing the repeating of step C)1)a), step C)1)b), step C)1)c), and step C)1)d) until each $WOB_{EQN}$ value in the plurality of $WOB_{EQN}$ values has been utilized as the initial WOB marker, thereby generating the plurality of ($W_{MARK}$, $R_P$) data points; and
2) providing the plurality of ($W_{MARK}$, $R_P$) data points to the output channel, thereby determining the partial optimum of RPM.

12. The system of claim 8 where the optimum PE parameter is determined using the representative SE equation and where the data processor is further programmed for:

VIII) training a second ANN using the plurality of filled data rows, where the second ANN has an $ANN_2$ input layer comprising an $ANN_2$ WOB input node, an $ANN_2$ LD input node, an $ANN_2$ H input node, and an $ANN_2$ RPM input node, and where the second ANN has an $ANN_2$ output layer comprising an $ANN_2$ output neuron, and where the second ANN has at least one $ANN_2$ hidden layer comprising $ANN_2$ artificial neurons, by,
   A) establishing an initial set of weights and an initial bias for each $ANN_2$ artificial neuron, establishing an $ANN_2$ termination criterion, and selecting a third filled data row from the plurality of filled data rows,
   B) setting the $ANN_2$ WOB input node equal to $K_5 WOB^L$, where $K_5$ is a real number and where $WOB^L$ is the WOB data point of the third filled data row raised to the $L^{th}$ power,
   C) setting the $ANN_2$ LD input node equal to $K_6 LD^M$, where $K_6$ is a real number and where $LD^M$ is the LD data point of the third filled data row raised to the $M^{th}$ power,
   D) setting the $ANN_2$ H input node equal to $K_7 H^U$, where $K_7$ is a real number and where H is equal to the S data point of the third filled data row times the F data point of the third filled data row, and where $H^U$ is H raised to the $U^{th}$ power,
   E) setting the $ANN_2$ RPM input node equal to $K_8 RPM^V$, where $K_8$ is a real number and where $RPM^V$ is the RPM data point of the third filled data row raised to the $V^{th}$ power,
   F) determining a target output for the third filled data row, where the target output for the third filled data row is equal to the Tor data point of the third filled data row,
   G) determining an $ANN_2$ output value at the $ANN_2$ output neuron after setting the $ANN_2$ WOB input node equal to $K_5 WOB^L$, setting the $ANN_2$ LD input node equal to $K_6 LD^M$, setting the $ANN_2$ H input node equal to $K_7 H^U$, and setting the $ANN_2$ RPM input node equal to $K_8 RPM^V$,
   H) generating an error by comparing the $ANN_2$ output value and the target output for the third filled data row,
   I) modifying the initial set of weights and the initial bias for each $ANN_2$ artificial neuron based on the error and based on whether training the second ANN is an line-by-line training or a batch training, thereby generating a modified set of weights and a modified bias for the each $ANN_2$ artificial neuron,
   J) selecting a fourth filled data row from the plurality of filled data rows, where the fourth filled data row has not been utilized as the third filled data row, and repeating step VIII)B), step VIII)C), step VIII)D), step VIII)E), step VIII)F), step VIII)G), step VIII)H), and step VIII)I) using the third filled data row as the fourth filled data row, and using the modified set of weights and the modified bias for the each $ANN_2$ artificial neuron as the initial set of weights and the initial bias for the each $ANN_2$ artificial neuron, until the $ANN_2$ termination criterion is satisfied, thereby generating a trained second ANN;

IX) generating a plurality of Torque values ($Tor_{EQN}$) values and a plurality of expectsed SE values by,
   A) establishing a $Tor_{EQN}$ for the first ($WOB_{EQN}$, $RPM_{EQN}$, $H_{EQN}$) point using the trained second ANN by,
      1) setting the $ANN_2$ WOB input node equal to $K_5 WOB_{EQN}{}^L$, where $WOB_{EQN}{}^L$ is equal to the $WOB_{EQN}$ of the first ($WOB_{EQN}$, $RPM_{EQN}$, $H_{EQN}$) point raised to the $L^{th}$ power,
      2) setting the $ANN_2$ LD input node equal to $K_6 LD_{EQN}{}^M$, where $LD_{EQN}{}^M$ is equal to the $LD_{EQN}$ value raised to the $M^{th}$ power,
      3) setting the $ANN_2$ H input node equal to $K_7 H_{EQN}{}^U$, where $H_{EQN}{}^U$ is equal to the $H_{EQN}$ of the first ($WOB_{EQN}$, $RPM_{EQN}$, $H_{EQN}$) point raised to the $U^{th}$ power,
      4) setting the $ANN_2$ RPM input node equal to $K_8 RPM_{EQN}{}^V$, where $RPM_{EQN}{}^V$ is equal to the $RPM_{EQN}$ of the first ($WOB_{EQN}$, $RPM_{EQN}$, $H_{EQN}$) point raised to the $V^{th}$ power,
5) determining the $ANN_2$ output value at the $ANN_2$ output neuron after setting the $ANN_2$ WOB input node equal to $K_5 WOB_{EQN}^L$, setting the $ANN_1$ LD input node equal to $K_6 LD_{EQN}^M$, setting the $ANN_1$ H input node equal to $K_7 H_{EQN}^U$, and setting the $ANN_1$ RPM input node equal to $K_8 RPM_{EQN}^V$, and setting the $Tor_{EQN}$ equal to the $ANN_2$ output value, thereby establishing the $Tor_{EQN}$ for the first ($WOB_{EQN}$, $RPM_{EQN}$, $H_{EQN}$) point using the trained second ANN, thereby generating the plurality of $Tor_{EQN}$ values,
6) establishing an expected SE value for the first ($WOB_{EQN}$, $RPM_{EQN}$, $H_{EQN}$) point where the expected SE value for the first ($WOB_{EQN}$, $RPM_{EQN}$, $H_{EQN}$) point is determined using at least the $DOC_{EQN}$ for the first ($WOB_{EQN}$, $RPM_{EQN}$, $H_{EQN}$) point and the $Tor_{EQN}$ for the first ($WOB_{EQN}$, $RPM_{EQN}$, $H_{EQN}$) point in the representative SE equation, thereby generating a plurality of expected SE values; and X) Selecting the optimum PE parameter, where the optimum PE parameter is determined using the representative SE equation, and determining the optimum PE parameter, the optimum WOB, and the optimum RPM using the plurality of expected SE values, where the optimum WOB is the $WOB_{EQN}$ of the ($WOB_{EQN}$, $RPM_{EQN}$, $H_{EQN}$) point which generated the optimum PE parameter, and where the optimum RPM is the $RPM_{EQN}$ of the ($WOB_{EQN}$, $RPM_{EQN}$, $H_{EQN}$) point which generated the optimum PE parameter.

13. The system of claim 12 where the optimum PE parameter is an individual expected SE value in the plurality of expected SE values.

14. The system of claim 12 where the optimum PE parameter is an ROP/SE, where the ROP/SE is equal to an ROP divided by an SE, where the SE is equal to an individual expected SE value in the plurality of expected SE values, and where the ROP is equal to a DOC multiplied by an RPM, where the DOC is equal to the $DOC_{EQN}$ which generated the individual expected SE value in the plurality of expected SE values, and where the RPM is equal to the $RPM_{EQN}$ of the ($WOB_{EQN}$, $RPM_{EQN}$, $H_{EQN}$) point which generated the individual expected SE value in the plurality of expected SE values.

15. The system of claim 12 where the data processor is further programmed to perform the step of reading an set of H values ($H_{SET}$) quantity and determining a partial optimum of WOB by performing the steps of:
A) Selecting a PE parameter, where the PE parameter is an expected SE value for the first ($WOB_{EQN}$, $RPM_{EQN}$, $H_{EQN}$) point or an ROP/SE value for the first ($WOB_{EQN}$, $RPM_{EQN}$, $H_{EQN}$) point, where the ROP/SE value for the first ($WOB_{EQN}$, $RPM_{EQN}$, $H_{EQN}$) point is equal to the $DOC_{EQN}$ for the first ($WOB_{EQN}$, $RPM_{EQN}$, $H_{EQN}$) point multiplied by the $RPM_{EQN}$ for the first ($WOB_{EQN}$, $RPM_{EQN}$, $H_{EQN}$) point;
B) establishing a PE data matrix, where the PE data matrix is a two-dimensional matrix, and annotating a WOB column, a RPM column, an H column, and a PE column, where the WOB column is a first column in the PE data matrix, and where the RPM column is a second column in the PE data matrix, and where the H column is a third column in the PE data matrix, and where the PE column is a fourth column in the PE data matrix;
C) storing the PE parameter for the first ($WOB_{EQN}$, $RPM_{EQN}$, $H_{EQN}$) point in the PE column of an empty row of the PE data matrix, storing the $WOB_{EQN}$ of the first ($WOB_{EQN}$, $RPM_{EQN}$, $H_{EQN}$) point in the WOB column of the empty row of the PE data matrix, storing the $RPM_{EQN}$ of the first ($WOB_{EQN}$, $RPM_{EQN}$, $H_{EQN}$) point in the RPM column of the empty row of the PE data matrix, and storing the $H_{EQN}$ of the first ($WOB_{EQN}$, $RPM_{EQN}$, $H_{EQN}$) point in the H column of the empty row of the PE data matrix, thereby generating a plurality of filled PE data rows;
D) generating a plurality of (value for $W_P$ ($W_P$), marker for R ($R_{MARK}$)) data points to provide the partial optimum of WOB by,
1) establishing an initial RPM marker, where the initial RPM marker is a $RPM_{EQN}$ value in the plurality of $RPM_{EQN}$ values, and determining a $W_P$ value by,
a) identifying a plurality of $PE_{RPM-H}$ rows and a plurality of $PE_{RPM-H}$ parameters, where the plurality of $PE_{RPM-H}$ rows consists of a subset of the plurality of filled PE data rows in the PE data matrix, and where for each $PE_{RPM-H}$ row in the plurality of $PE_{RPM-H}$ rows, the $RPM_{EQN}$ value stored in the RPM column of the each $PE_{RPM-H}$ row is equal to the initial RPM marker, and the $H_{EQN}$ value stored in the H column of the each $PE_{RPM-H}$ row is equal to the $H_{SET}$ quantity, and where the plurality of $PE_{RPM-H}$ parameters consists of the PE parameters stored in the PE column of the plurality of $PE_{RPM-H}$ rows, thereby identifying the plurality of $PE_{RPM-H}$ rows and thereby identifying the plurality of $PE_{RPM-H}$ parameters;
b) reviewing the plurality of $PE_{RPM-H}$ parameters and finding an optimum $PE_{RPM-H}$ parameter based on the optimum criterion, where the optimum $PE_{RPM-H}$ parameter is an individual $PE_{RPM-H}$ parameter in the plurality of $PE_{RPM-H}$ parameters, and designating the $PE_{RPM-H}$ row comprised of the optimum $PE_{RPM-H}$ parameter as an optimum $PE_{RPM-H}$ row, and locating the $W_P$ value, where the $W_P$ value is a single value stored in the WOB column of the optimum $PE_{RPM-H}$ row;
c) recording the $W_P$ value and the initial RPM marker as a ($W_P$, $R_{MARK}$) data point, where $W_P$ is equal to the $W_P$ value and where $R_{MARK}$ is equal to the initial RPM marker;
d) selecting a subsequent RPM marker, where the subsequent RPM marker is another $RPM_{EQN}$ in the plurality of $RPM_{EQN}$ values, and where the subsequent RPM marker has not been utilized as the initial RPM marker in any preceding step D)1);
e) repeating step D)1)a), step D)1)b), step D)1)c), and step D)1)d) using the subsequent RPM marker as the initial RPM marker, and continuing the repeating of step D)1)a), step D)1)b), step D)1)c), and step D)1)d) until each $RPM_{EQN}$ value in the plurality of $RPM_{EQN}$ values has been utilized as the initial RPM marker, thereby generating the plurality of ($W_P$, $R_{MARK}$) data points; and
E) providing the plurality of ($W_P$, $R_{MARK}$) data points to the output channel, thereby determining the partial optimum of WOB.

16. The system of claim 12 where the data processor is further programmed to perform the step of reading a set of H values ($H_{SET}$) quantity and determining a partial optimum of RPM by performing the steps of:

A) Selecting a PE parameter, where the PE parameter is an expected SE value for the first ($WOB_{EQN}$, $RPM_{EQN}$, $H_{EQN}$) point or an ROP/SE value for the first ($WOB_{EQN}$, $RPM_{EQN}$, $H_{EQN}$) point, where the ROP/SE value for the first ($WOB_{EQN}$, $RPM_{EQN}$, $H_{EQN}$) point is equal to the $DOC_{EQN}$ for the first ($WOB_{EQN}$, $RPM_{EQN}$, $H_{EQN}$) point multiplied by the $RPM_{EQN}$ for the first ($WOB_{EQN}$, $RPM_{EQN}$, $H_{EQN}$) point;

B) establishing a PE data matrix, where the PE data matrix is a two-dimensional matrix, and annotating a WOB column, a RPM column, an H column, and a PE column, where the WOB column is a first column in the PE data matrix, and where the RPM column is a second column in the PE data matrix, and where the H column is a third column in the PE data matrix, and where the PE column is a fourth column in the PE data matrix;

C) storing the PE parameter for the first ($WOB_{EQN}$, $RPM_{EQN}$, $H_{EQN}$) point in the PE column of an empty row of the PE data matrix, storing the $WOB_{EQN}$ of the first ($WOB_{EQN}$, $RPM_{EQN}$, $H_{EQN}$) point in the WOB column of the empty row of the PE data matrix, storing the $RPM_{EQN}$ of the first ($WOB_{EQN}$, $RPM_{EQN}$, $H_{EQN}$) point in the RPM column of the empty row of the PE data matrix, and storing the $H_{EQN}$ of the first ($WOB_{EQN}$, $RPM_{EQN}$, $H_{EQN}$) point in the H column of the empty row of the PE data matrix, thereby generating a plurality of filled PE data rows;

D) generating a plurality of (marker for W ($W_{MARK}$) and value for $R_P$ ($R_P$)) data points to provide the partial optimum of WOB by, 1) establishing an initial WOB marker, where the initial WOB marker is a $WOB_{EQN}$ value in the plurality of $WOB_{EQN}$ values, and determining a $R_P$ value by, a) identifying a plurality of $PE_{WOB-H}$ rows and a plurality of $PE_{WOB-H}$ parameters, where the plurality of $PE_{WOB-H}$ rows consists of a subset of the plurality of filled PEPE data rows in the PE data matrix, and where for each $PE_{WOB-H}$ row in the plurality of $PE_{WOB-H}$ rows, the $WOB_{EQN}$ value stored in the WOB column of the each $PE_{WOB-H}$ row is equal to the initial WOB marker, and the $H_{EQN}$ value stored in the H column of the each $PE_{WOB-H}$ row is equal to the $H_{SET}$ quantity, and where the plurality of $PE_{WOB-H}$ parameters consists of the PE parameters stored in the PE column of the plurality of $PE_{WOB-H}$ rows, thereby identifying the plurality of $PE_{WOB-H}$ rows and thereby identifying the plurality of $PE_{WOB-H}$ parameters;

b) reviewing the plurality of $PE_{WOB-H}$ parameters and finding an optimum $PE_{WOB-H}$ parameter based on the optimum criterion, where the optimum $PE_{WOB-H}$ parameter is an individual $PE_{RPM-H}$ parameter in the plurality of $PE_{WOB-H}$ parameters, and designating the $PE_{WOB-H}$ row comprised of the optimum $PE_{WOB-H}$ parameter as an optimum $PE_{WOB-H}$ row, and locating the $R_P$ value, where the $R_P$ value is a single value stored in the RPM column of the optimum $ROP_{WOB-H}$ row;

c) recording the $R_P$ value and the initial WOB marker as a ($W_{MARK}$, $R_P$) data point, where $W_{MARK}$ is equal to the initial WOB marker and where $R_P$ is equal to the $R_P$ value;

d) selecting a subsequent WOB marker, where the subsequent WOB marker is another $WOB_{EQN}$ in the plurality of $WOB_{EQN}$ values, and where the subsequent WOB marker has not been utilized as the initial WOB marker in any preceding step D)1);

e) repeating step D)1)a), step D)1)b), step D)1)c), and step D)1)d) using the subsequent WOB marker as the initial WOB marker, and continuing the repeating of step D)1)a), step D)1)b), step D)1)c), and step D)1)d) until each $WOB_{EQN}$ value in the plurality of $WOB_{EQN}$ values has been utilized as the initial WOB marker, thereby generating the plurality of ($W_{MARK}$, $R_P$) data points; and E) providing the plurality of ($W_{MARK}$, $R_P$) data points to the output channel, thereby determining the partial optimum of RPM.

* * * * *